(12) United States Patent
Umeda et al.

(10) Patent No.: US 6,452,632 B1
(45) Date of Patent: Sep. 17, 2002

(54) SOLID STATE IMAGE SENSOR AND VIDEO SYSTEM USING THE SAME

(75) Inventors: Masafumi Umeda, Yokohama; Hiroshi Suu, Chigasaki, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/016,417

(22) Filed: Jan. 30, 1998

(30) Foreign Application Priority Data

Jan. 31, 1997 (JP) .............................................. 9-019398
Dec. 16, 1997 (JP) .............................................. 9-346783

(51) Int. Cl.$^7$ .............................................. H04N 5/335
(52) U.S. Cl. ...................................... 348/294; 348/222
(58) Field of Search ................................. 348/294, 302, 348/303, 304, 308, 309, 222, 311, 312, 313, 314, 220; 257/723, 724; 250/208.1; H04N 5/335

(56) References Cited

U.S. PATENT DOCUMENTS

| 4,658,287 | A | | 4/1987 | Chen |
|---|---|---|---|---|
| 4,684,991 | A | | 8/1987 | Forchheimer et al. |
| 5,452,004 | A | * | 9/1995 | Roberts ...................... 348/301 |
| 5,461,425 | A | | 10/1995 | Fowler et al. |
| 5,602,585 | A | | 2/1997 | Dickinson et al. |
| 5,631,704 | A | | 5/1997 | Dickinson et al. |
| 5,841,126 | A | * | 11/1998 | Fossum et al. ........... 250/208.1 |
| 5,883,830 | A | * | 3/1999 | Hirt et al. ............... 365/185.03 |

FOREIGN PATENT DOCUMENTS

| JP | 61-105979 | 5/1986 |
|---|---|---|
| JP | 5-95513 | 4/1993 |
| JP | 5-111010 | 4/1993 |
| JP | 5-219440 | 8/1993 |
| JP | 6-139361 | 5/1994 |
| JP | 6-303533 | 10/1994 |
| JP | 7-336600 | 12/1995 |

* cited by examiner

*Primary Examiner*—Tuan Ho
(74) *Attorney, Agent, or Firm*—Oblon, Spivak, McClelland, Maier & Neustadt, P.C.

(57) ABSTRACT

A solid state image sensor includes an area sensor section having photoelectric conversion pixels arranged in the form of a matrix, a pixel selection section for selecting a pixel of the area sensor section and reading out a video signal, an analog signal processor section for performing signal processing for the video signal, an analog-digital conversion section for converting the processed signal into a digital signal, a digital signal processor section for performing signal processing to convert the digital signal into a digital signal having a predetermined signal format, and an interface section which operates in accordance with an external command, and has the function of selecting a video signal obtained by digitizing a pixel or a signal obtained by performing processing for the luminance and color difference signals of the video signal. These sections are mounted on a single chip.

14 Claims, 60 Drawing Sheets

INTERFACE
(PC CARD, IEEE1394, OR THE LIKE)
FOR PC

ODD LINE → EVEN LINE → ODD LINE →

READ SEQUENCE FOR 8 × 8 BLOCKS

EXAMPLE OF READ SEQUENCE FOR 8 × 8 BLOCKS

ALL-PIXELS READ

EXAMPLE OF SUB-SAMPLING READ

ANOTHER EXAMPLE OF SUB-SAMPLING READ

: PIXEL TO BE READ OUT

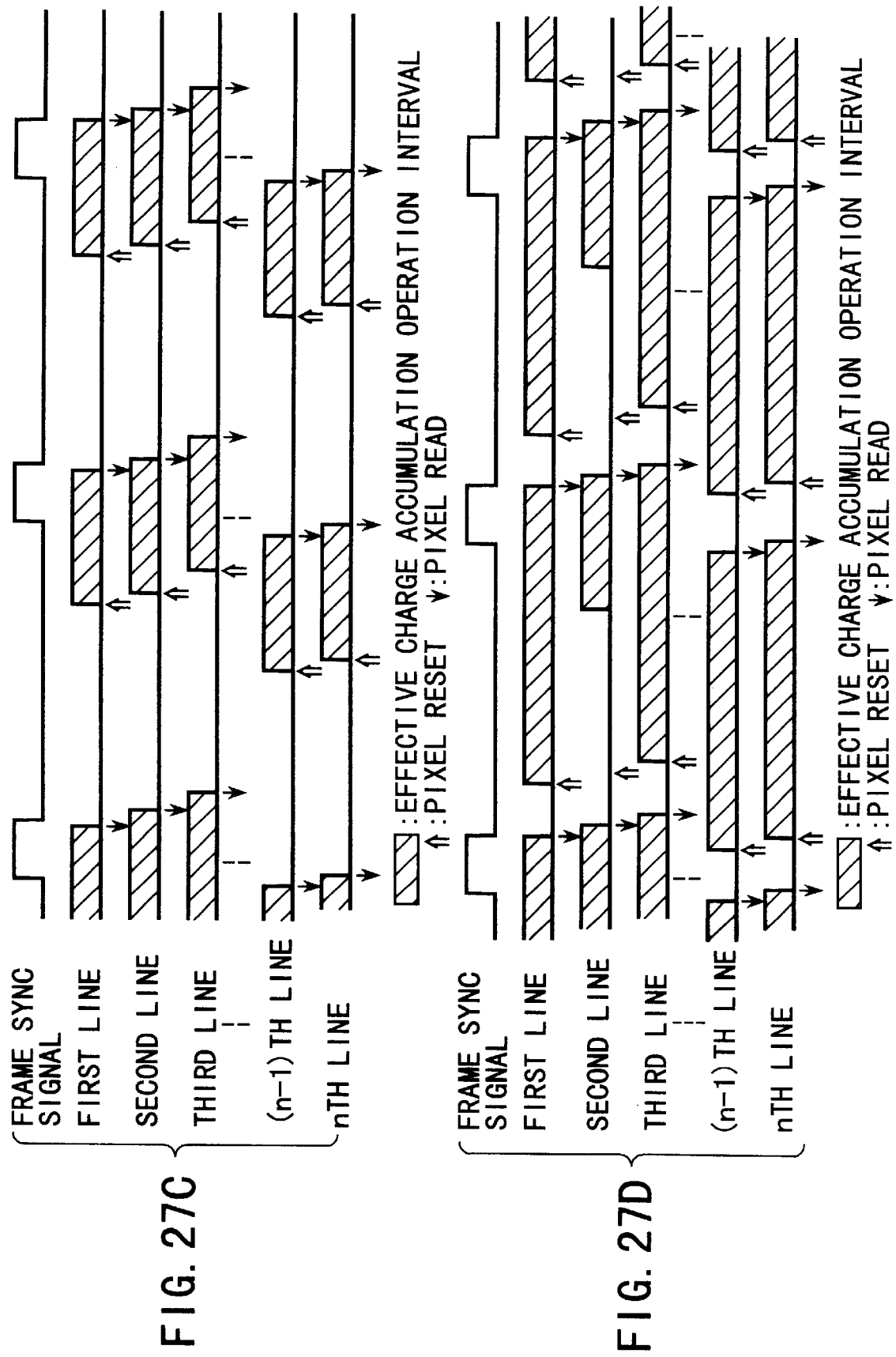

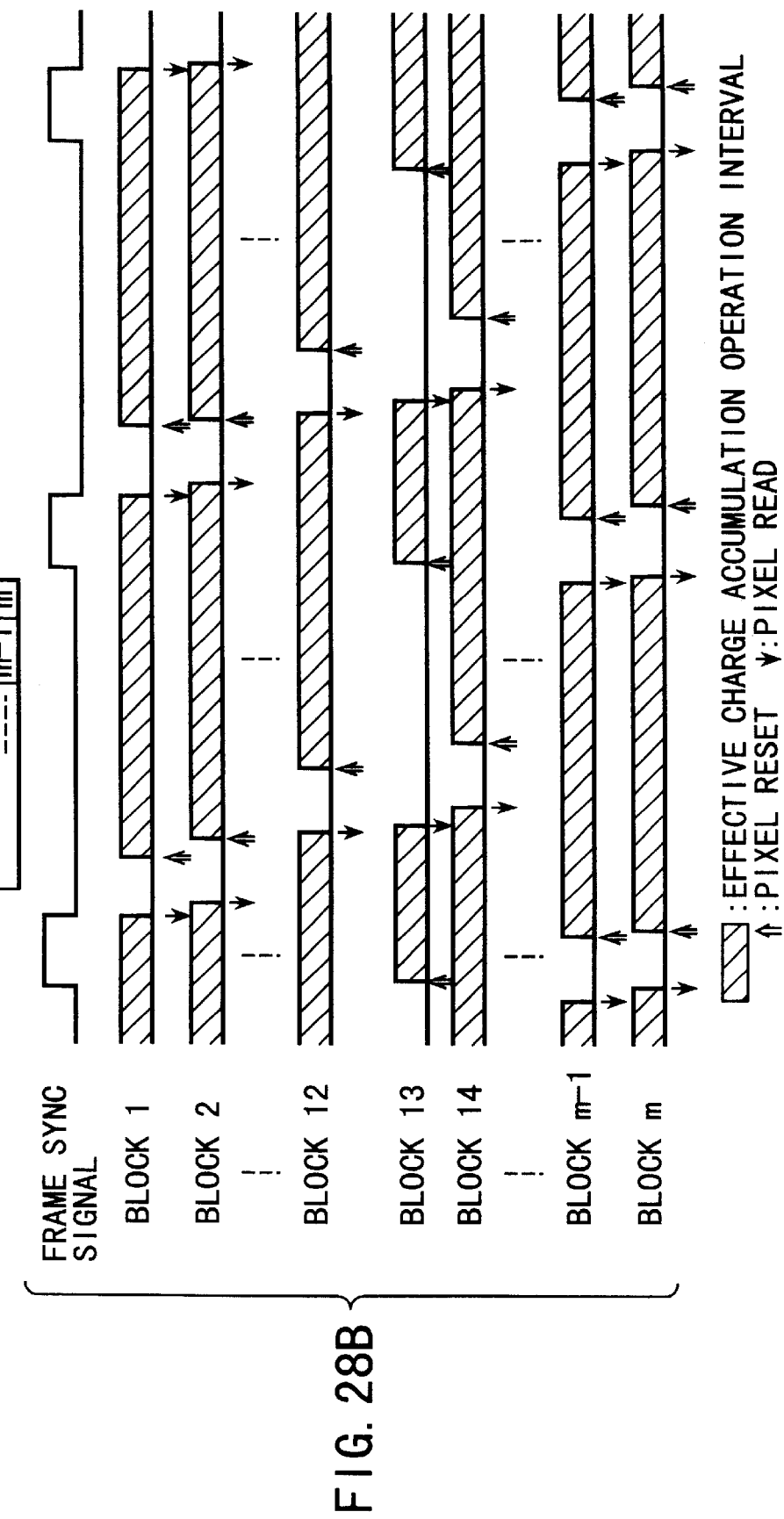

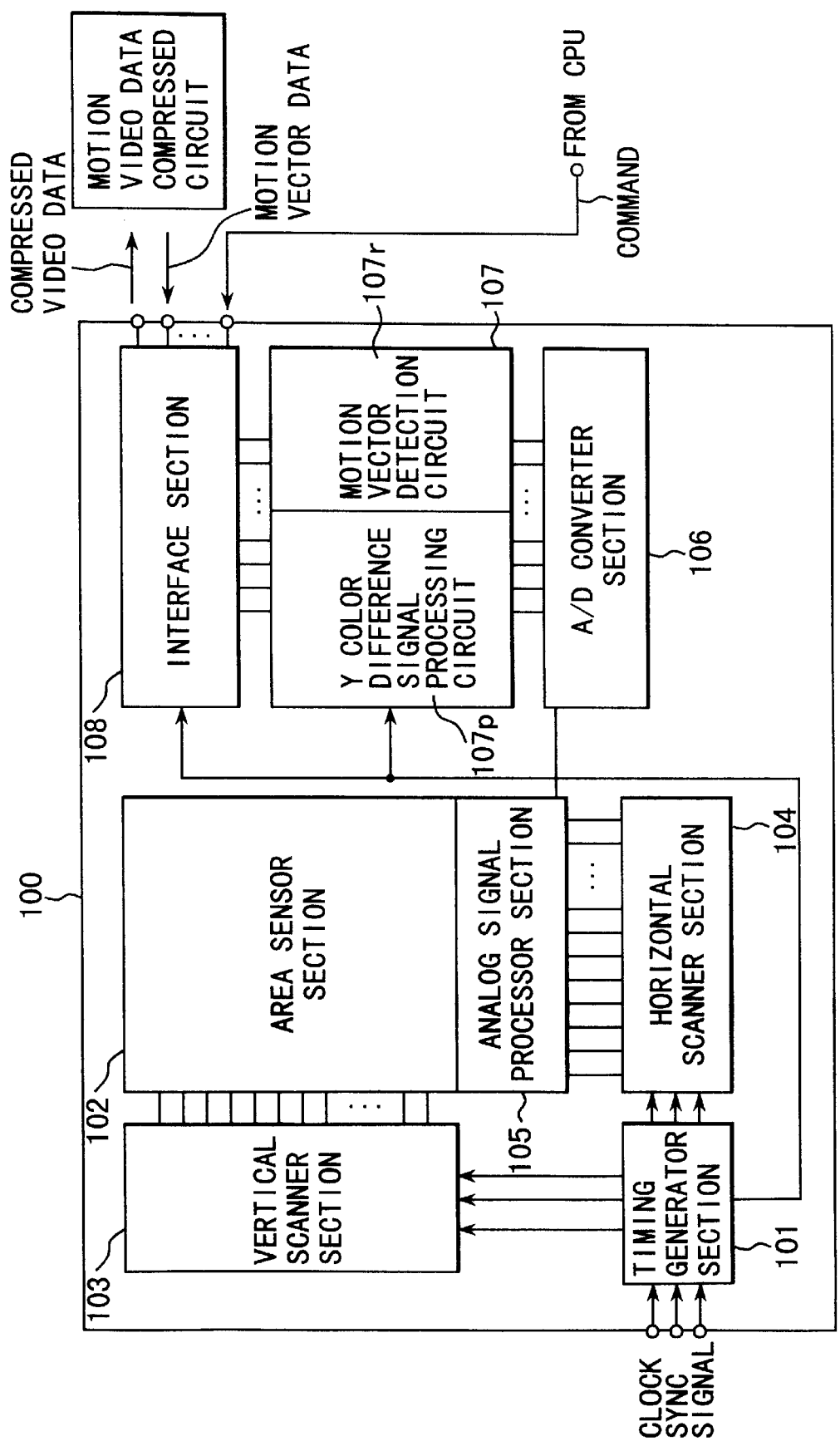
F I G. 31

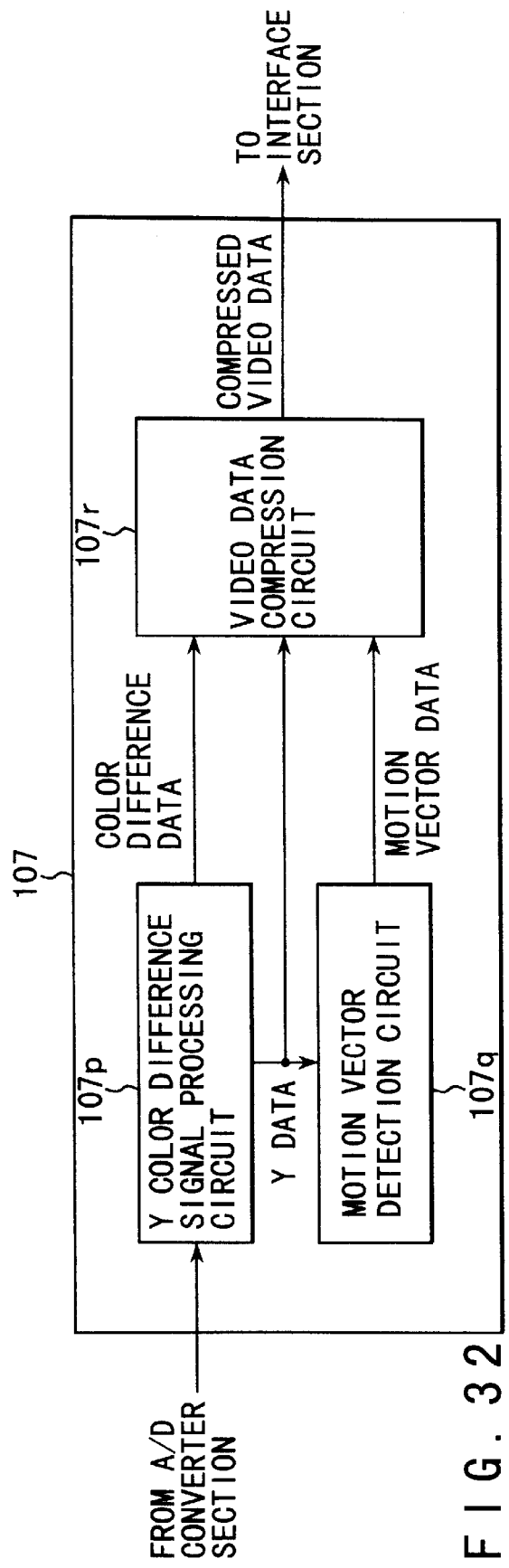
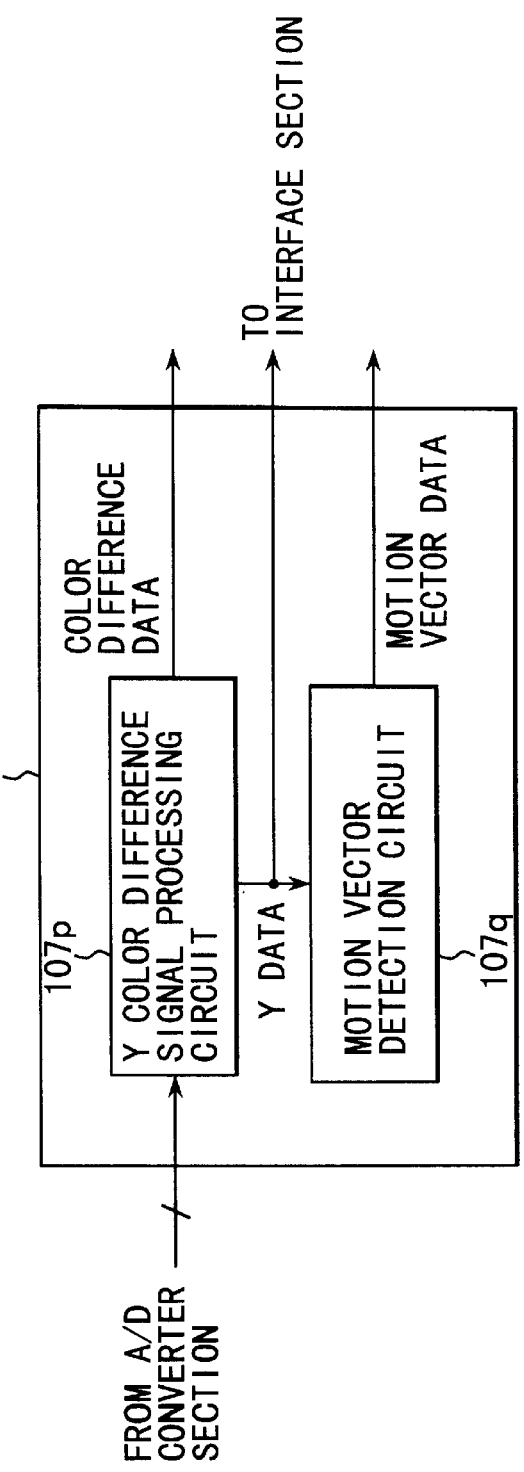
F I G. 32
F I G. 33

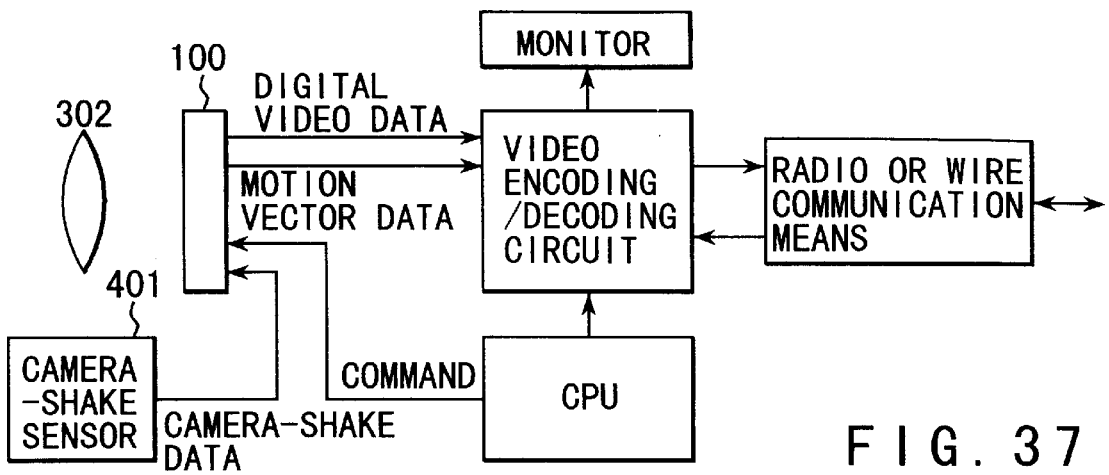
F I G. 37
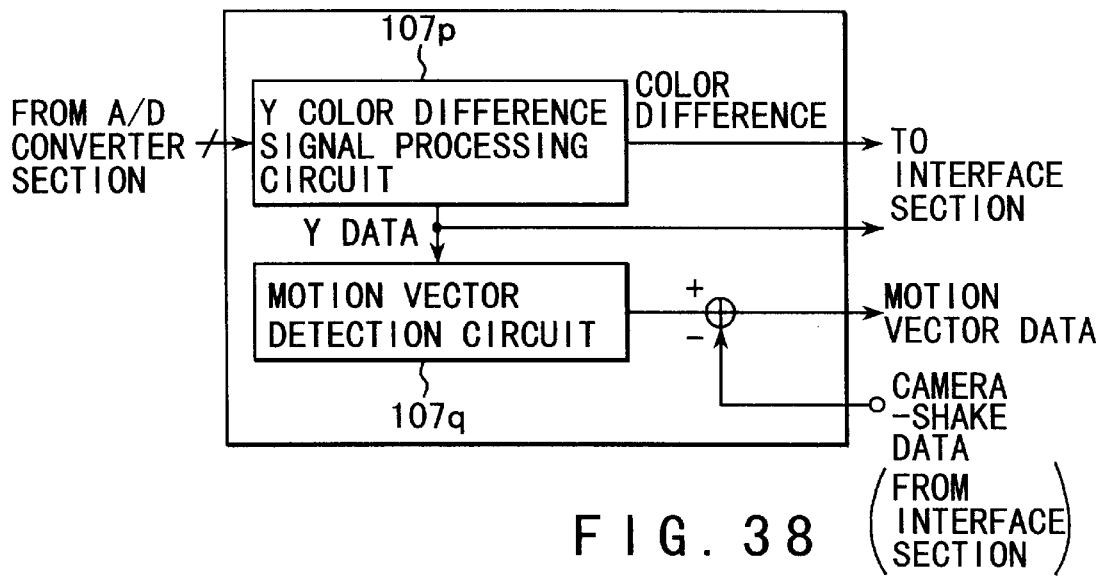
F I G. 38
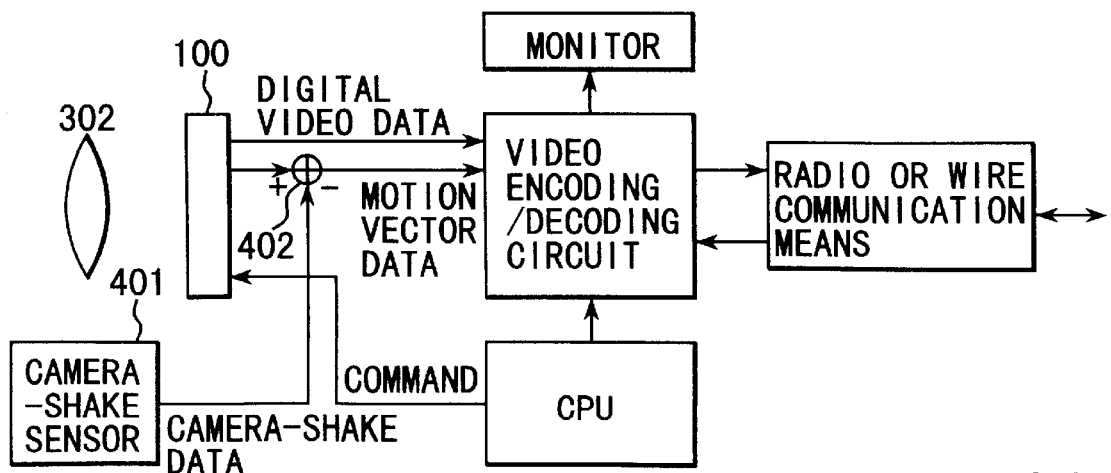
F I G. 39

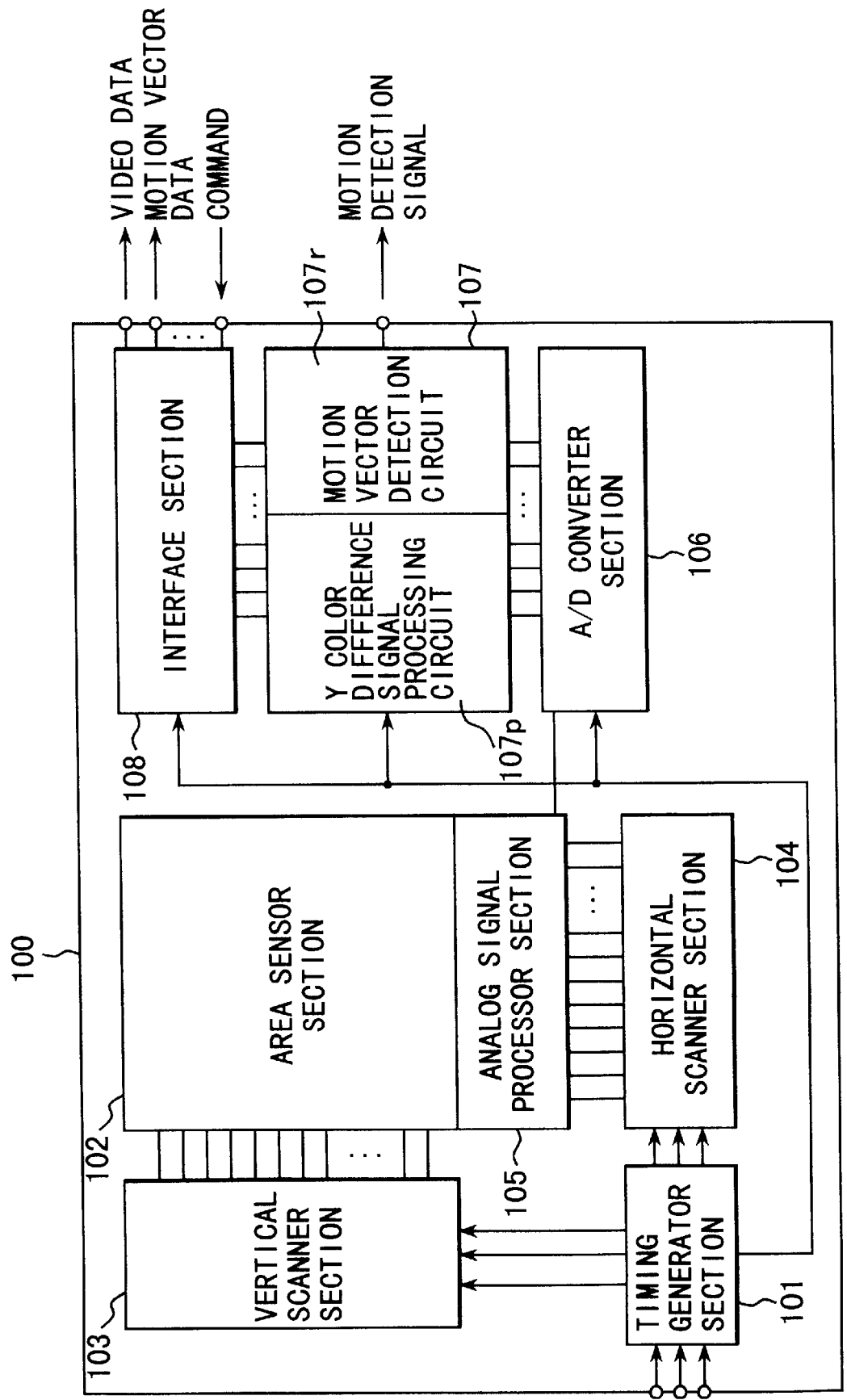
F I G. 41

FIG. 54

| D1 | D2 | D3 | D4 | D5 |
|----|----|----|----|----|

Input to output section of interface section

| D1 | D2 | D3 | D4 | D5 |
|----|----|----|----|----|

Output from interface section in embodiment in FIG. 52

| D1u | D1d | D2u | D2d | D3u | D3d | D4u | D4d | D5u | D5d |
|-----|-----|-----|-----|-----|-----|-----|-----|-----|-----|

Output from interface section in embodiment in FIG. 53

Dn: VIDEO DATA (P BITS)
Dnu: UPPER P/2 BITS OF VIDEO DATA
Dnd: LOWER P/2 BITS OF VIDEO DATA

FIG. 56

Video data terminal output:

| Db1 | Db2 | Db3 | Db4 | Db5 | Db6 |
|-----|-----|-----|-----|-----|-----|

Motion vector data terminal output:

| MV1 | MV2 | MV3 | MV4 | MV5 | MV6 |
|-----|-----|-----|-----|-----|-----|

Image sensor output

Dbn: IMAGE DATA OF UNIT BLOCK
MVn: MOTION VECTOR DATA OF Dbn

Dn: VIDEO DATA
MVn: MOTION VECTOR DATA OF Dn

A: VIDEO DATA (OUTPUT)
B: PERIOD DURING WHICH COMMAND DATA CAN BE INPUT

A: VIDEO DATA (OUTPUT)
C: COMMAND DATA (INPUT)
Z: HIGH IMPEDANCE

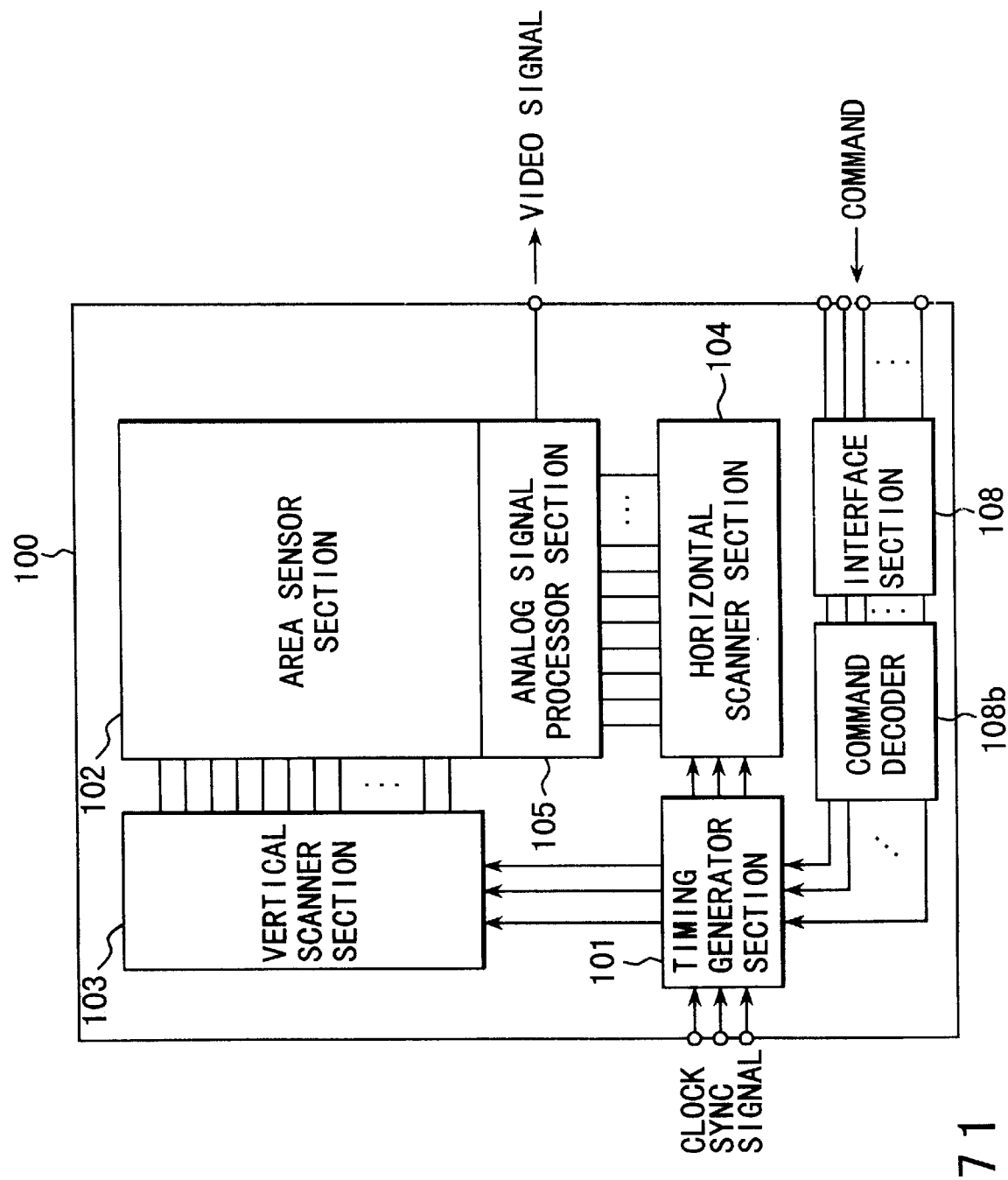
F I G. 71

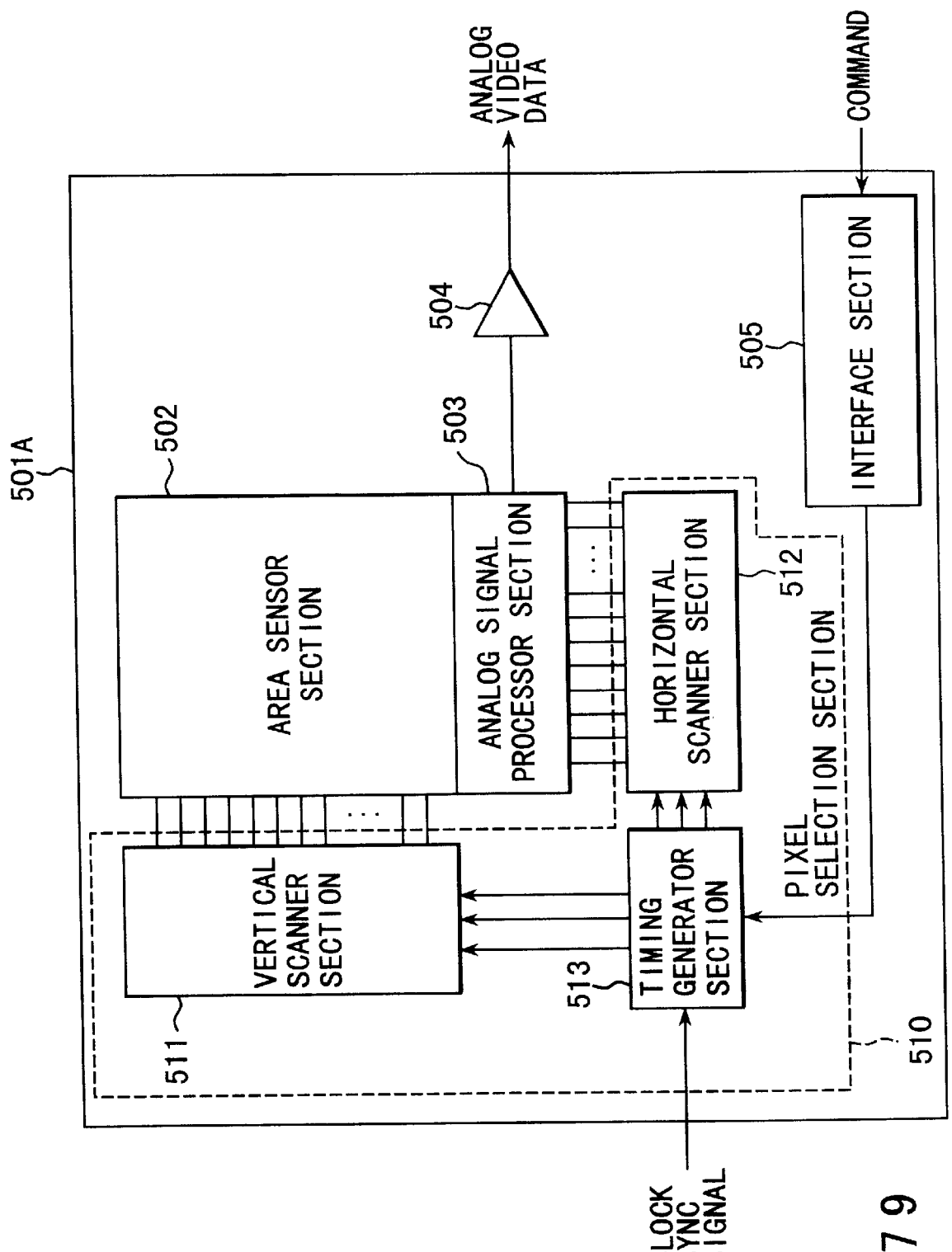
F I G. 79

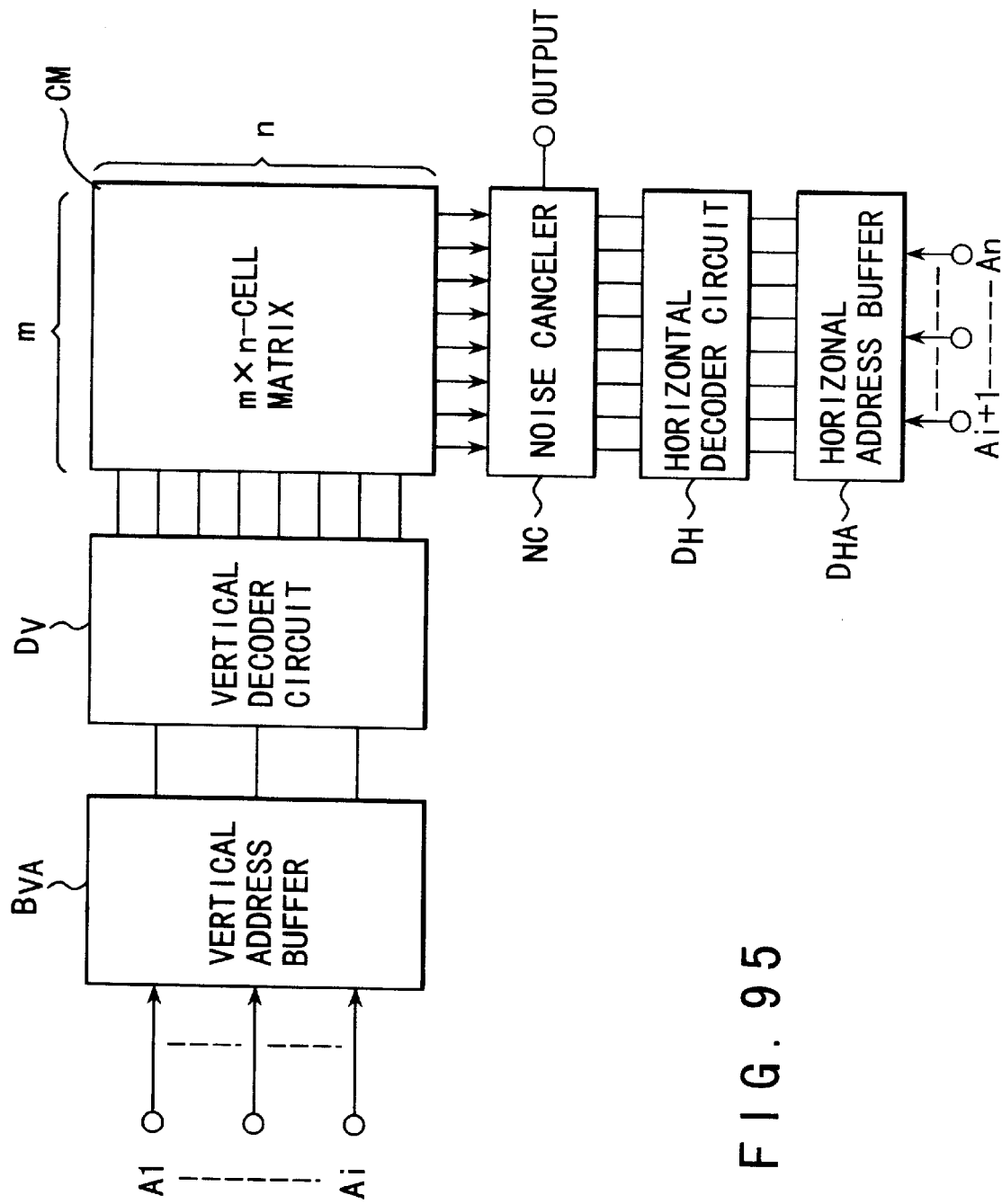
F I G. 95

SOLID STATE IMAGE SENSOR AND VIDEO SYSTEM USING THE SAME

BACKGROUND OF THE INVENTION

The present invention relates to the structure of a solid state image sensor and a system using the solid state image sensor.

Conventional video input systems using solid state image sensors have been used for video cameras which record motion video data on tapes, supervisory cameras, still video cameras which record still video data on video floppy disks and digital memory media, industrial cameras, and the like. Most of these systems use area CCD image sensors.

An area CCD image sensor includes a photoelectric converter constituted by a two-dimensional array of photoelectric elements corresponding to pixels. An optical image is formed on this photoelectric converter. Signals converted into charges by the photoelectric converter are sequentially read out as pixel signals by a vertical transfer CCD and a horizontal transfer CCD.

As another solid state image sensor, a MOS type image sensor is available. The MOS type image sensor uses no CCDs for vertical and horizontal transfer. In this sensor, pixels selected by selection lines constituted by aluminum lines are read out through read. lines, like a memory device. The MOS type image sensors were once actually used for video cameras. However, the MOS type image sensors were replaced with CCD image sensors because the MOS type image sensors cause larger noise than the CCD image sensors.

The MOS type image sensor, however, has characteristic features which the CCD image sensor does not have. For example, a CMOS type image sensor is driven by a single drive source unlike the CCD image sensor which is driven by multiple drive sources.

More specifically, to drive the CCD image sensor, a plurality of positive and negative power supply potentials, e.g., +20V, +15V, and -10V, are required. In contrast to this, the MOS type image sensor can be driven by a single power supply of, e.g., +5V; it requires only one power supply potential. The same power supply voltage as that used for other circuits making up an image sensing system, e.g., an amplification circuit and a control circuit, can be used for the MOS type image sensor. The number of power supplies can therefore be decreased.

The power consumption of the MOS type image sensor is also smaller than that of the CCD image sensor.

The MOS type image sensor has another characteristic feature which the CCD image sensor does not have. That is, a logic circuit, an analog circuit, an analog/digital conversion circuit, and the like can be easily formed on the sensor by using a single MOS circuit manufacturing process. It is a well-known fact that peripheral circuits, associated circuits, and the like can be easily formed on the MOS type image sensor. Prototypes of such sensors have been reported at academic meetings (e.g., ISSCC in 1996).

As described above, the MOS type image sensor has characteristic features which the CCD image sensor does not have. To make the most of these characteristic features, however, a circuit structure in the sensor which is suited to a system to be used and an interface for other circuit portions are required. If, for example, an appropriate interface is not used, a large number of pins are required to result in an increase in the chip area of the sensor or the size of the package. An increase in cost cannot therefore be avoided.

Video compression techniques for teleconferences, videophones, and the like have been standardized. With the widespread use of personal computers and communication services for personal computers, a desktop conference using personal computers will soon become a reality. Image compression techniques are also used for this purpose.

A video camera recorder or a portable video camera is used for an image capture section of such a video system. Outputs from these cameras are still analog video outputs. It is as a matter of course that in the future such cameras are connected to personal computers by digital direct coupling or incorporated therein. If a solid state image sensor incorporating a video processing circuit is available as an image sensor used for such purposes, the number of parts can be decreased. A reduction in cost can therefore be attained.

As described above, the MOS type image sensor as a solid state image sensor has many advantages over the CCD image sensor except for noise. With advances in noise suppression techniques, the MOS type image sensor has regained attention. When the MOS type image sensor is to be used as an image sensing device, a pixel selection function, an image compression function, a low speed shot control function, an image data conversion function, and the like may be implemented as MOS circuits on the same chip as that of the MOS type image sensor, in addition to an image sensing function. With this structure, only processing results can be used. As a result, a reduction in load can be attained in terms of design and manufacture of an actual system using the MOS type image sensor to take place of peripheral circuits for the above functions.

If, therefore, a solid state image sensor with video processing circuits is available as an image sensor, the number of parts can be reduced, and a reduction in cost can be attained.

If, however, these video processing circuits are simply implemented on the chip of the MOS type image sensor, a problem is posed in terms of operability when this chip is applied to a system. If, for example, a function is designed on the basis of the specifications required by the user, the resultant device becomes a single-function device. That is, a dedicated device, i.e., a device used for a special purpose, is obtained, resulting in poor versatility.

Considering the social background of an information-oriented society and the popularity of multimedia, an image capture function will be increasingly required in various fields. In addition, with increasing demand in space and energy savings, reductions in the size and power consumption of a function element are required. Under the circumstances, it is urgently necessary to realize a high-performance, high-versatility solid state image sensor using a MOS type image sensor which can meet these demands.

BRIEF SUMMARY OF THE INVENTION

It is an object of the present invention to provide a compact, high-performance solid state image sensor having high general versatility and using a MOS type image sensor capable of energy-saving. It is another object of the present invention to provide a video system using this solid state image sensor.

According to the first aspect of the present invention, there is provided a solid state image sensor comprising: an area sensor section in which pixels for performing photoelectric conversion are arranged two-dimensionally; a pixel selection section for selecting a pixel of the area sensor section and reading out a pixel signal from the pixel; an analog signal processor section for performing signal processing for the pixel signal read out from the pixel; an analog-digital conversion section for converting the processed signal into a digital signal; a digital signal processor section for processing to convert the digital signal into luminance and color difference signals; and an interface section which can externally output the digital video signal, operates in accordance with an external command, and has a function of selecting one of the digital signal from the analog-digital conversion section and luminance and color difference signals, wherein the area sensor section, the pixel selection section, the analog signal processor section, the analog-digital conversion section, the digital signal processor section, and the interface section are mounted on a single chip.

According to the second aspect of the present invention, there is provided a solid state image sensor comprising: an area sensor section in which pixels for performing photoelectric conversion are arranged two-dimensionally; a pixel selection section for selecting a pixel of the area sensor section and reading out a pixel signal from the pixel; an analog signal processor section for performing signal processing for the pixel signal read out from the pixel; an analog-digital conversion section for converting the processed signal into a digital signal; a digital signal processor section for performing motion video processing and still image processing; and an interface section which can externally output the digital video signal, operates in accordance with an external command, and has a function of selecting one of a motion video signal obtained by performing the motion video processing and a still image signal obtained by performing the still image processing, wherein the area sensor section, the pixel selection section, the analog signal processor section, the analog-digital conversion section, the digital signal processor section, and the interface section are mounted on a single chip.

According to the third aspect of the present invention, there is provided a solid state image sensor comprising: an area sensor section in which pixels for performing photoelectric conversion are arranged two-dimensionally; a pixel selection section for selecting a pixel of the area sensor section and reading out a pixel signal from the pixel; an analog signal processor section for performing signal processing for the pixel signal read out from the pixel to output a processed signal; an analog-digital conversion section for converting the processed signal into a digital signal; a digital signal processor section including means for performing signal processing for the digital signal to convert the digital signal into a digital video signal having a predetermined signal format, and storage means for storing the digital video signal; and an interface circuit for externally outputting the digital video signal from the storage means in accordance with an external command, wherein the area sensor section, the pixel selection section, the analog signal processor section, the analog-digital conversion section, the digital signal processor section, and the interface section are mounted on a single chip.

According to the fourth aspect of the present invention, there is provided a solid state image sensor comprising: an area sensor section in which pixels for performing photoelectric conversion are arranged two-dimensionally; a pixel selection section for selecting a pixel of the area sensor section and reading out a pixel signal from the pixel; an analog signal processor section for performing signal processing for the pixel signal read out from the pixel; an analog-digital conversion section for converting the processed signal into a digital signal; a digital signal processor section for performing signal processing to convert the digital signal into a digital video signal having a predetermined signal format; an interface section for externally outputting the digital video signal and inputting an external command; and means capable of changing a charge integration time for at least some of the pixels in accordance with an external command, wherein the area sensor section, the pixel selection section, the analog signal processor section, the analog-digital conversion section, the digital signal processor section, the interface section, and the means are mounted on a single chip.

According to the fifth aspect of the present invention, there is provided a solid state image sensor comprising: an area sensor section in which pixels for performing photoelectric conversion are arranged two-dimensionally; a pixel selection section for selecting a pixel of the area sensor section and reading out a pixel signal from the pixel; an analog signal processor section for performing signal processing for the pixel signal read out from the pixel; an analog-digital conversion section for converting the processed signal into a digital signal; a digital signal processor section for performing signal processing to convert the digital signal into luminance and color difference signals; and an interface section for externally outputting the digital video signal by alternately outputting the luminance and color difference signals, wherein the area sensor section, the pixel selection section, the analog signal processor section, the analog-digital conversion section, the digital signal processor section, and the interface section are mounted on a single chip.

According to the sixth aspect of the present invention, there is provided a solid state image sensor comprising: an area sensor section in which pixels for performing photoelectric conversion are arranged two-dimensionally; a pixel selection section for selecting a pixel of the area sensor section and reading out a pixel signal from the pixel; an analog signal processor section for performing signal processing for the pixel signal read out from the pixel; an analog-digital conversion section for converting the processed signal into a digital signal; a digital signal processor section for performing signal processing to convert the digital signal into a digital video signal having a predetermined signal format; an information section which holds information indicating characteristic of the sensor; and an interface section which externally outputs the digital video signal, can input an external command, and allows the information to be read out in accordance with the external command, wherein the area sensor section, the pixel selection section, the analog signal processor section, the analog-digital conversion section, the digital signal processor section, the information section and the interface section are mounted on a single chip.

According to the seventh aspect of the present invention, there is provided a video system comprising: a solid state image sensor including: an area sensor section in which pixels for performing photoelectric conversion are arranged two-dimensionally, a pixel selection section for selecting a pixel of the area sensor section and reading out a pixel signal from the pixel, a signal processor section for performing signal processing for the pixel signal read out from the pixel and outputting at least one of a digital video signal, an analog video signal, a status signal, and characteristic information of the solid state image sensor, and an interface section which operates in response to an external command and externally outputs at least one of a digital video signal, a status signal, and characteristic information of the solid state image sensor, wherein the area sensor section, the pixel selection section, the signal processor section, and the interface section are mounted on a single chip; and a visual processing unit for performing visual information processing by using at least one of a digital video signal, an analog video signal, a status signal, and characteristic information of said solid state image sensor which are output from said solid state image sensor.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 27A to 27D are timing charts for explaining how the electronic shutter setting is changed;

FIGS. 28A and 28B show a photoelectric surface of an area sensor and timing charts for explaining how electronic shutters are set in units of blocks;

FIG. 31 is a block diagram showing a solid state image sensor having a motion vector detection section;

FIG. 32 is a block diagram showing the digital signal processor section of the solid state image sensor in FIG. 30;

FIG. 33 is a block diagram showing the digital signal processor section of the solid state image sensor in FIG. 31;

FIG. 37 is a block diagram showing a portable information device having a camera-shake sensor and a solid state image sensor;

FIG. 38 is a block diagram showing the digital signal processor section of a solid state image sensor used in a portable information device having the structure shown in FIG. 37;

FIG. 39 is a block diagram showing another portable information device having a camera-shake sensor and a solid state image sensor;

FIG. 41 is a block diagram showing still another solid state image sensor having a motion vector detection section;

FIG. 54 is a timing chart of signals in the interface sections in FIGS. 52 and 53;

FIG. 56 is a timing chart of signals in the interface section in FIG. 55;

FIG. 71 is a block diagram showing a solid state image sensor according to still another embodiment of the present invention;

FIG. 79 is a block diagram showing a solid state image sensor according to yet another embodiment of the present invention;

FIG. 95 is a block diagram showing the overall structure of a MOS type image sensor designed to reduce noise.

DETAILED DESCRIPTION OF THE INVENTION

The embodiments of the present invention will be described in detail below with reference to the accompanying drawing.

Figure 1:
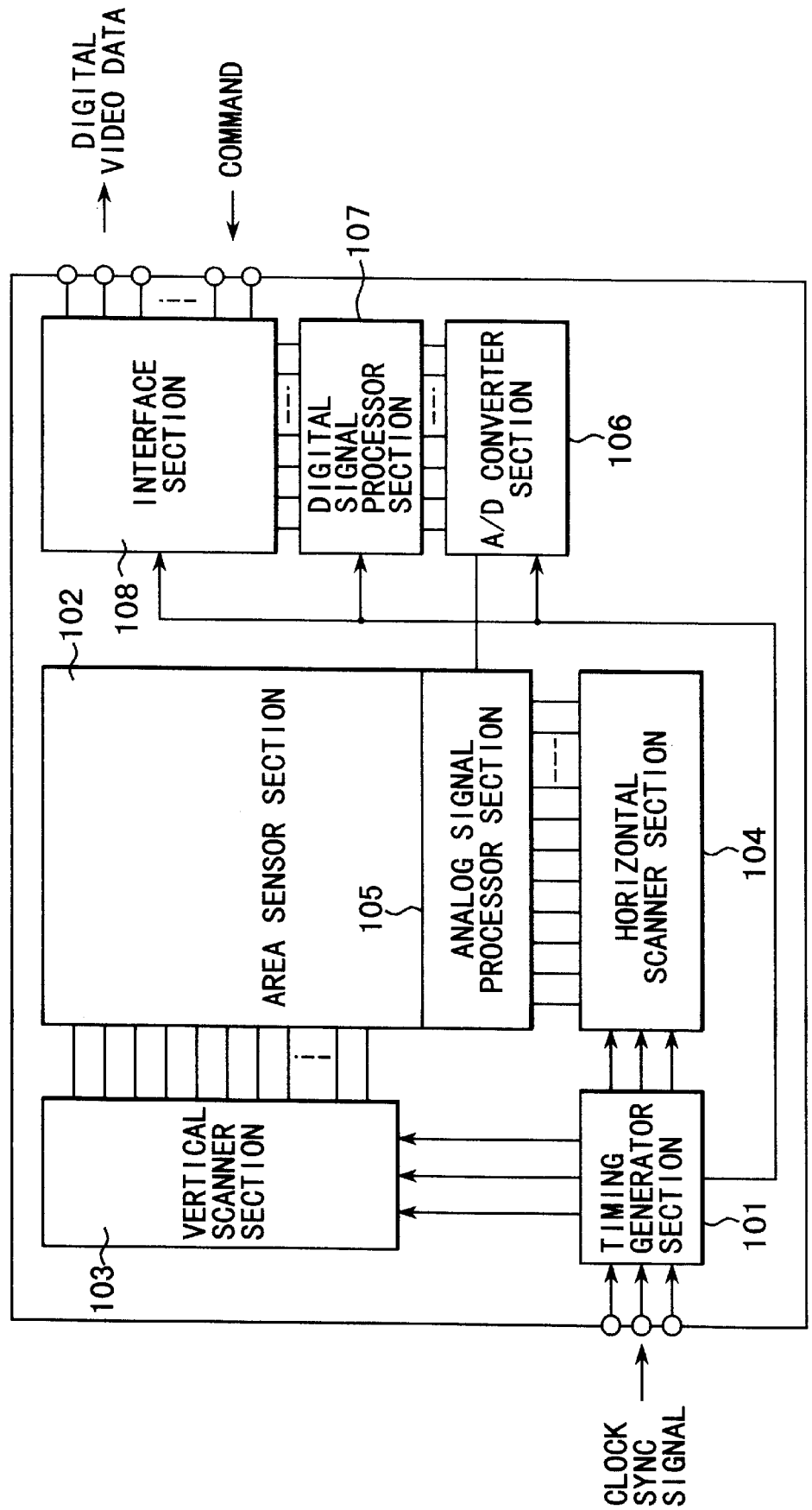
FIG. 1 is a block diagram showing the basic structure of a solid state image sensor according to an embodiment of the present invention.

FIG. 1 is a block diagram showing the schematic internal structure of an image sensor according to an embodiment of the present invention. Referring to FIG. 1, an image sensor 100 incorporates a timing generator section 101, an area sensor section 102, vertical and horizontal scanner sections 103 and 104 for selecting pixel outputs, an analog signal processor section 105, an A/D converter section 106 for performing analog/digital conversion, a digital signal processor section 107 for converting a digital signal into an output signal, and an interface section 108 for outputting digital video data to the outside and receiving command data from the outside.

For example, as the area sensor section 102, a CMOS type image sensor is used. The vertical scanner section 103 performs vertical scanning control on the CMOS type image sensor. The horizontal scanner section 104 performs horizontal scanning control on the CMOS type image sensor. These scanner sections perform predetermined scanning control on the basis of output signals from the timing generator section 101.

It is important that in this embodiment commands can be externally input to the image sensor 100, and the modes, output signal formats, and signal output timings, and the like of the image sensor 100 can be controlled in accordance with the commands. The interface section 108 is used to execute this command input operation. Upon reception of a predetermined command from the outside, the interface section 108 controls the associated constituent elements to perform control corresponding to the received command. The interface section 108 also has the function of outputting digital video data output through the digital signal processor section 107 to the outside of the image sensor 100.

The analog signal processor section 105 performs predetermined signal processing for the video signal read out from the area sensor section 102, and outputs the resultant signal to the A/D converter section 106. The A/D converter section 106 converts this video signal into a digital signal, and outputs it. The digital signal processor section 107 outputs the video data, which has undergone digital conversion and is output from the A/D converter section 106, to the interface section 108.

The timing generator section 101 generates timing signals for reading out pixel signals having undergone photoelectric conversion through the respective pixels on the basis of external signals. The vertical and horizontal scanner sections 103 and 104 read out charges having undergone photoelectric conversion in the respective pixels in accordance with these timing signals.

As an external signal, a master clock signal having a fundamental frequency, a sync signal, or both of them may be used.

Figure 2:
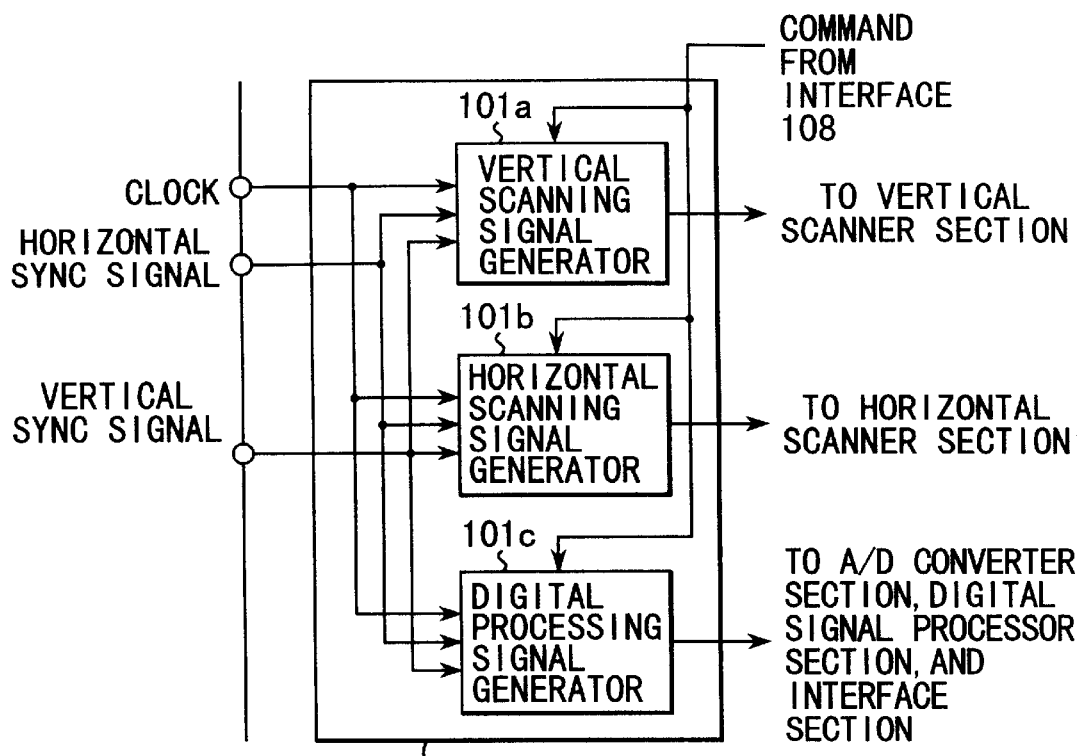
FIG. 2 is a block diagram showing the timing generator section of the image sensor in FIG. 1.
Figure 3:
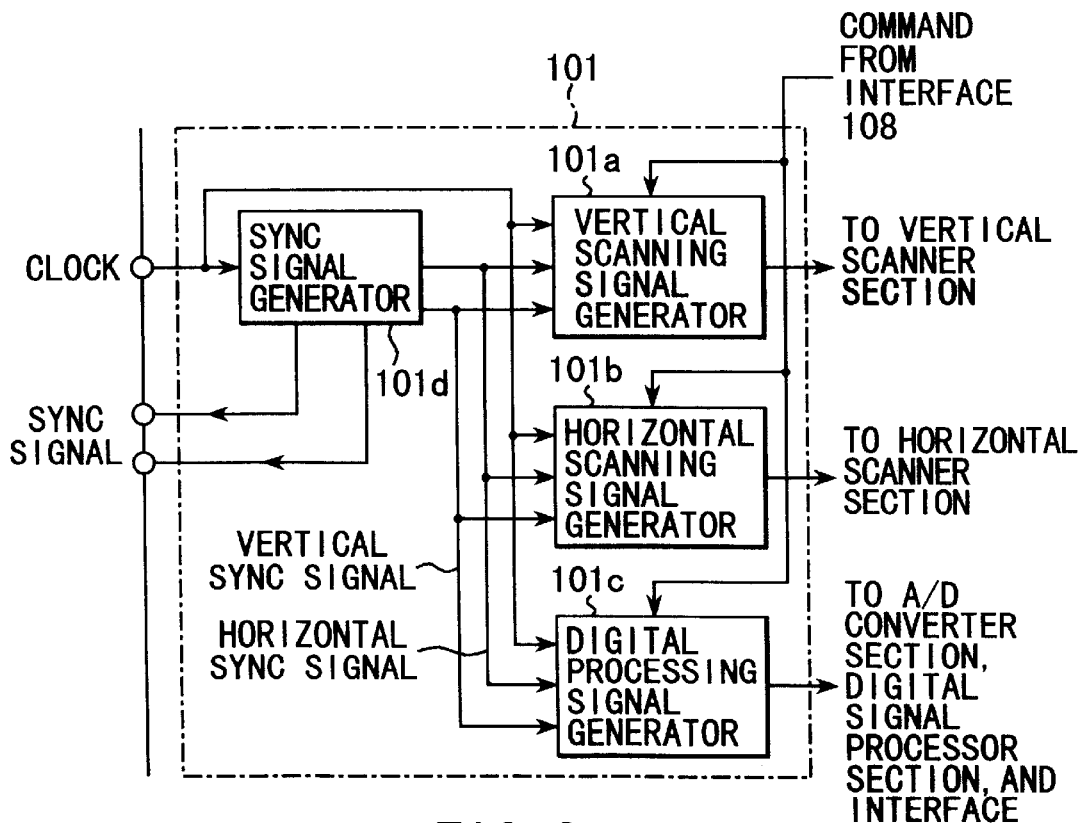
FIG. 3 is a block diagram showing another timing generator section of the image sensor of the present invention.

Each of FIGS. 2 and 3 shows a detailed structure of the timing generator section 101. The timing generator section 101 is constituted by a vertical scanning signal generator 101a, a horizontal scanning signal generator 101b, and a digital processing signal generator 101c. The vertical scanning signal generator 101a receives a clock signal, a horizontal sync signal, and a vertical sync signal, and generates a vertical scanning signal indicating a vertical scanning timing. The horizontal scanning signal generator 101b receives a clock signal, a horizontal sync signal, and a vertical sync signal, and generates a horizontal scanning signal indicating a horizontal scanning timing. The digital processing signal generator 101c receives a clock signal, a horizontal sync signal, and a vertical sync signal, and generates a signal indicating a predetermined digital processing timing.

As an external signal, a master clock signal having a fundamental frequency, a sync signal, or both of them may be used. The structure shown in FIG. 1 is designed to input the two signals. In the detailed structure shown in FIG. 2, a clock, a horizontal sync signal, and a vertical sync signals are used. With these three types of signals, the timing generator section 101 generates timing signals required for the image sensor 100, and supplies them to the respective components of the image sensor 100.

In the structure shown in FIG. 3, only a clock is supplied from the outside of the image sensor 100, and a sync signal is generated by the timing generator section 101 of the image sensor 100. The structure shown in FIG. 3 includes a sync signal generator 101d, in addition to the vertical scanning signal generator 101a, the horizontal scanning signal generator 101b, and the digital processing signal generator 101c, to internally generate a sync signal, a vertical scanning signal, a horizontal scanning signal, and the like upon reception of an external clock. The sync signal generator 101d generates vertical and horizontal sync signals on the basis of an externally input clock signal, and outputs them to the outside. These signals are also supplied to the vertical scanning signal generator 101a, the horizontal scanning signal generator 101b, and the digital processing signal generator 101c.

Figure 4:
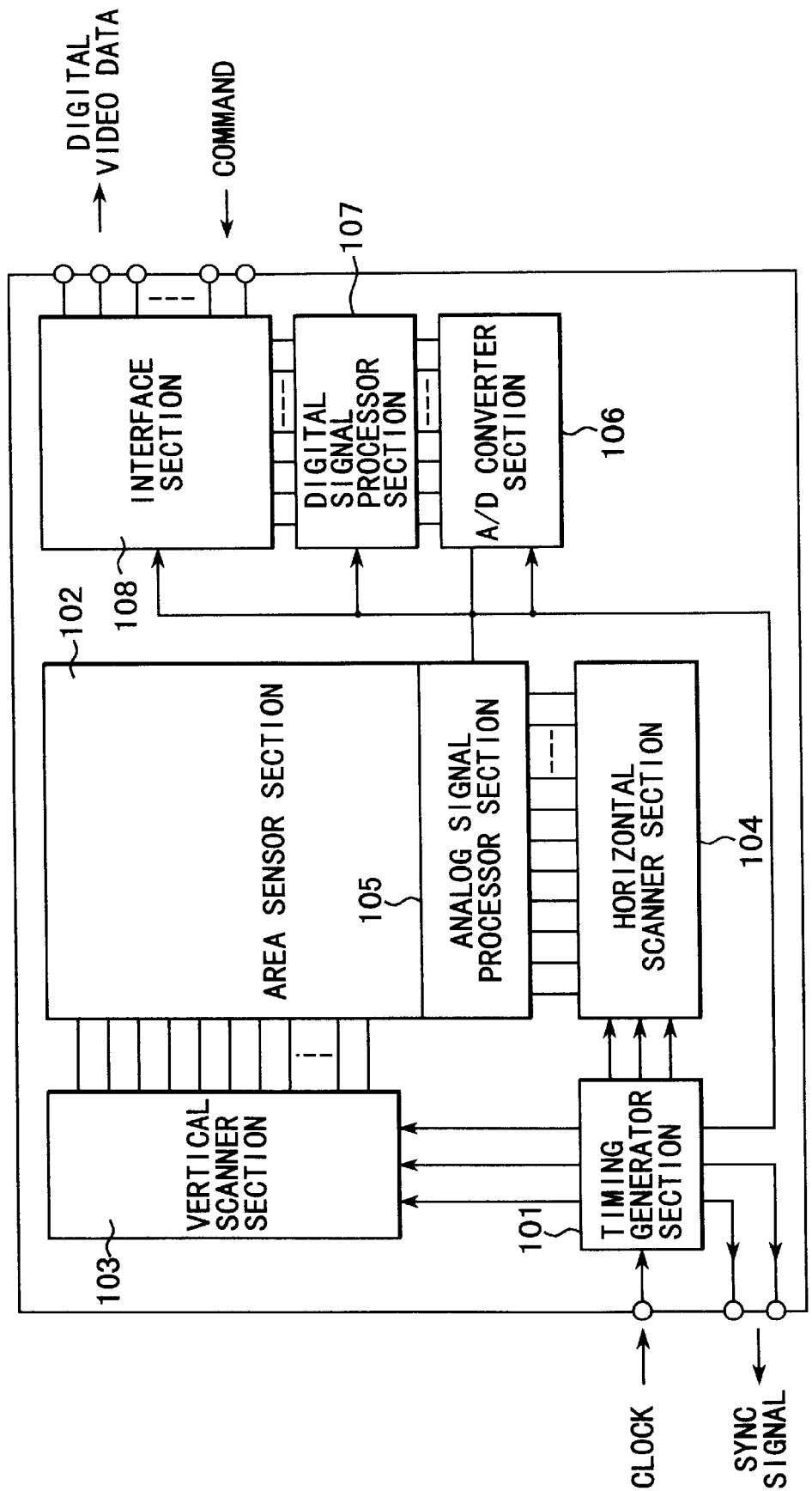
FIG. 4 is a block diagram showing a solid state image sensor including the timing generator section in FIG. 3.

In the structure shown in FIG. 3, vertical and horizontal sync signals are output from the sync signal generator 101d. This operation is performed to supply the sync signals to a system, outside the image sensor 100, which requires timing signals. FIG. 4 shows the overall structure of the image sensor 100 in this case. The structure shown in FIG. 4 is the same as that shown in FIG. 3 except for the timing generator section 101.

The analog signal processor section 105 performs noise reduction, amplification, gamma correction, and clamp processing for a video signal. The resultant signal is then converted into a digital signal by the A/D converter section 106. The digital signal processor section 107 converts the pixel array signal of the digital signal into an output signal suited for external output. For example, as this signal, a luminance signal, an RGB signal, luminance/color-difference signals (YCrCb, YUV), or the like can be conceived.

The respective signals may be output in the order based on the pixel sequential scheme of outputting the signals in units of pixels or the frame sequential scheme of outputting the signal in units of frames. Note that the pixel array signal may be output without signal processing.

In addition, signal processing may be performed on the basis of these signals. For example, still image data compression processing represented by JPEG, video compression processing such as H. 261 or H. 263 for teleconferences, MPEG 1, MPEG 2, or MPEG 4, the standard of which is under deliberation, can be implemented on the basis of these signals. Furthermore, gamma correction may be performed by the digital signal processor section 107 instead of the analog signal processor section 105.

Figure 5:
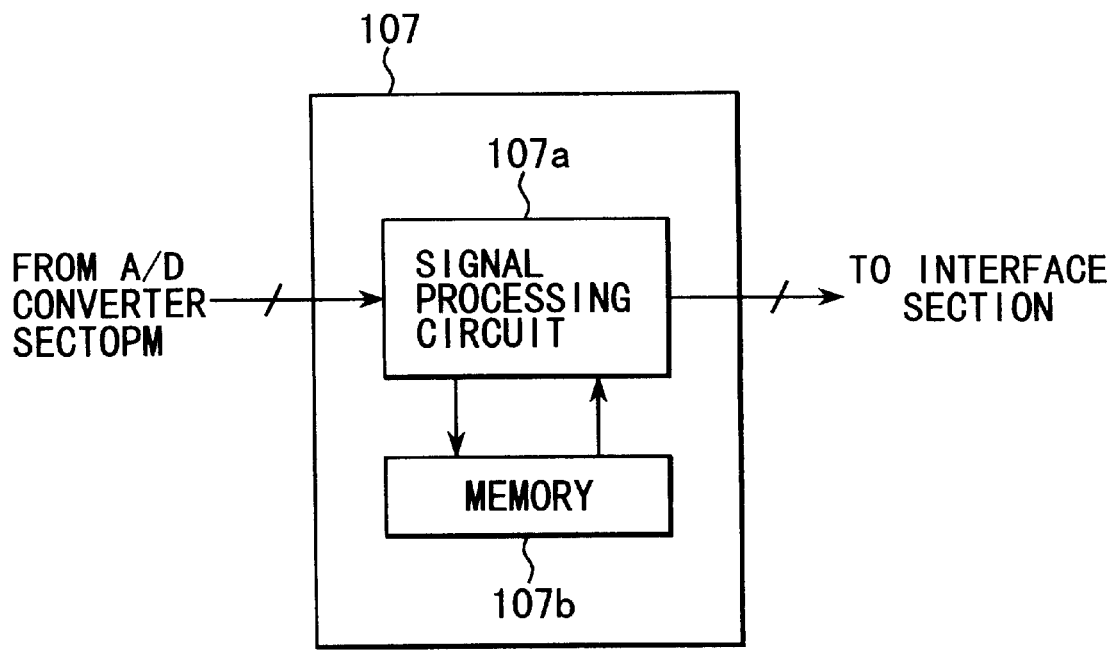
FIG. 5 is a block diagram showing a digital signal processor section in FIG. 1.

As shown in FIG. 5, this digital signal processor section 107 can include a memory 107b as well as a signal processor 107a. The memory 107b stores video data required for signal processing and corresponding to one or a plurality of lines, one or a plurality of blocks, or one or a plurality of frames. The stored video data is used for signal processing in the signal processor 107a. The data processed by the signal processor 107a is output externally from the image sensor 100 through the interface section 108. This interface section 108 also serves to load an external command into the image sensor 100.

Upon reception of an external command, the image sensor 100 of the present invention is set in a mode corresponding to the command input, and can perform processing corresponding to the command. This image sensor is characterized in this point. This characteristic feature will be described in detail below.

An embodiment in which the image sensor has a plurality of output formats, and can change output data by switching/selecting the output format in accordance with command data will be described first.

Figure 6:
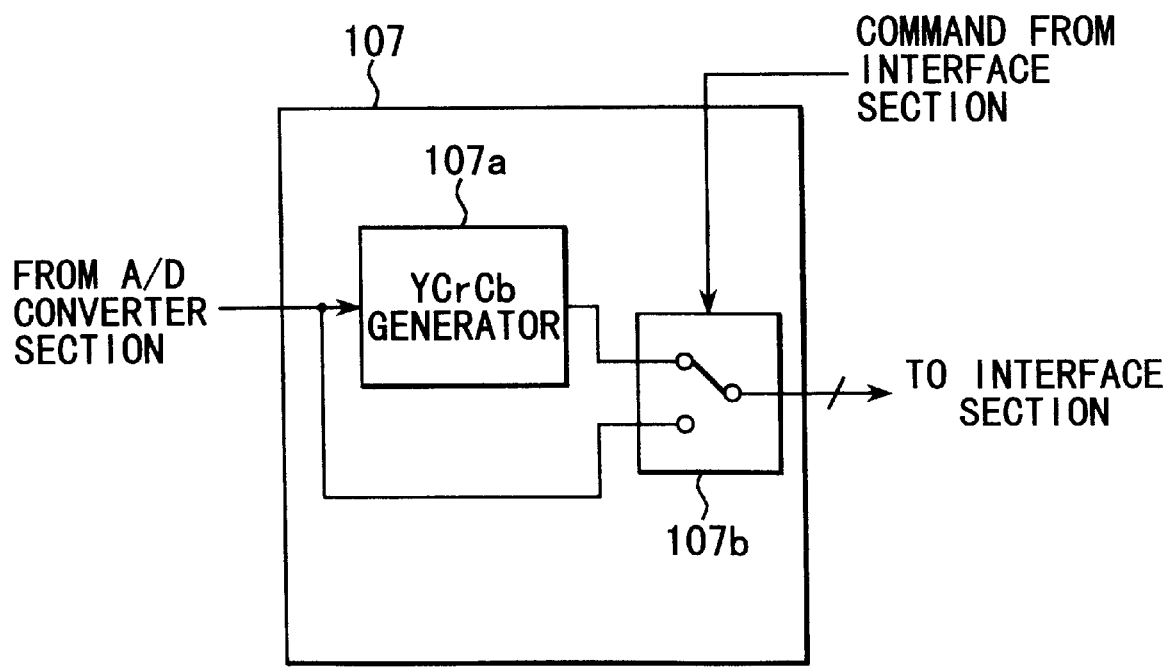
FIG. 6 is a block diagram showing another digital signal processor section in the image sensor of the present invention.

In the embodiment shown in FIG. 6, the signal processor of a digital signal processor section 107 is constituted by a luminance/color difference signal generator (YCrCb generator) 107a, and includes a switch circuit 107b. The switch circuit 107b has two switching terminals. One switching terminal is connected to the output side of the luminance/color difference signal generator 107a, and the other switching terminal is connected to the input side of the luminance/color difference signal generator 107a so that the switch circuit 107b can selectively output one of outputs from the luminance/color difference signal generator 107a and an A/D converter section 106 as an output from the digital signal processor section 107. Switching control on the switch circuit 107b is performed by causing the interface section 108 to send a switching signal to the digital signal processor section 107 in accordance with a command received by the interface section 108.

In this structure, the digital signal processor section 107 has a path through which pixel data itself is output, and a path through which pixel data is converted into a YCrCb signal by the digital circuit. The digital signal processor section 107 can switch to select one of the paths so as to output data through the path designated upon switching.

Figure 7:
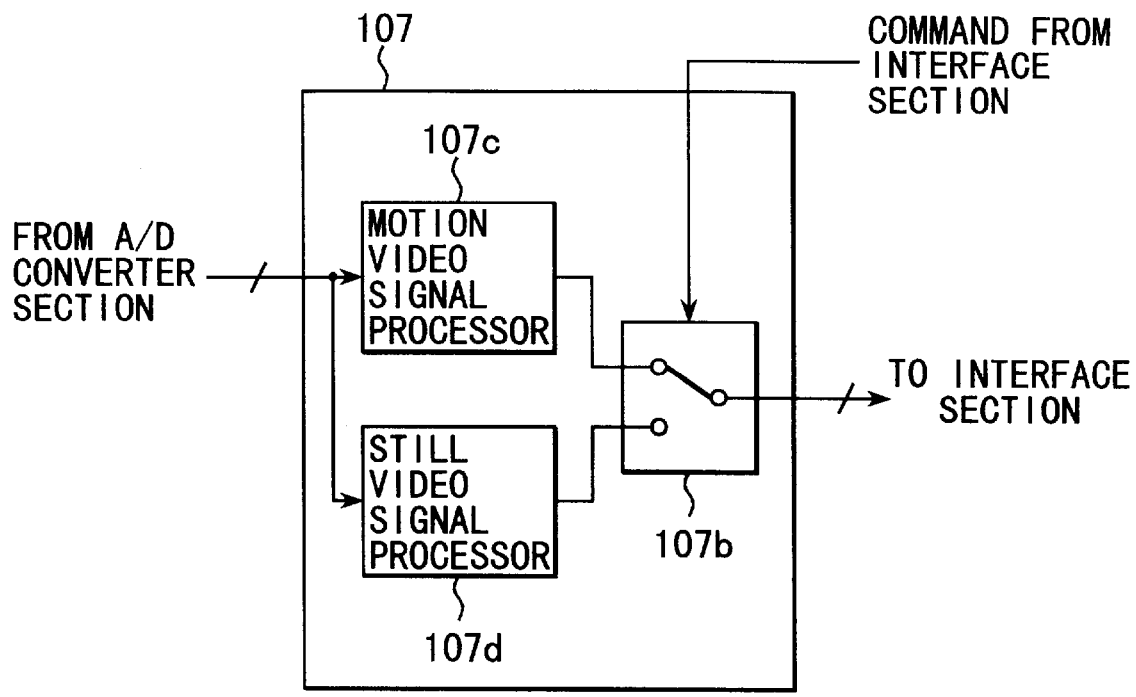
FIG. 7 is a block diagram showing still another digital signal processor section in the image sensor of the present invention.

The structure shown in FIG. 7 includes a motion video signal processor 107c for performing signal processing for a motion video signal and a still video signal processor 107d for performing signal processing for a still video signal. Outputs from these processors are switched to be selectively output by a circuit like the above switch circuit 107b. In general, motion and still video signals are processed by different signal processing methods. Since this structure switches to select one of outputs from these signal processors in accordance with a command, an image with higher quality can be obtained.

Figure 8:
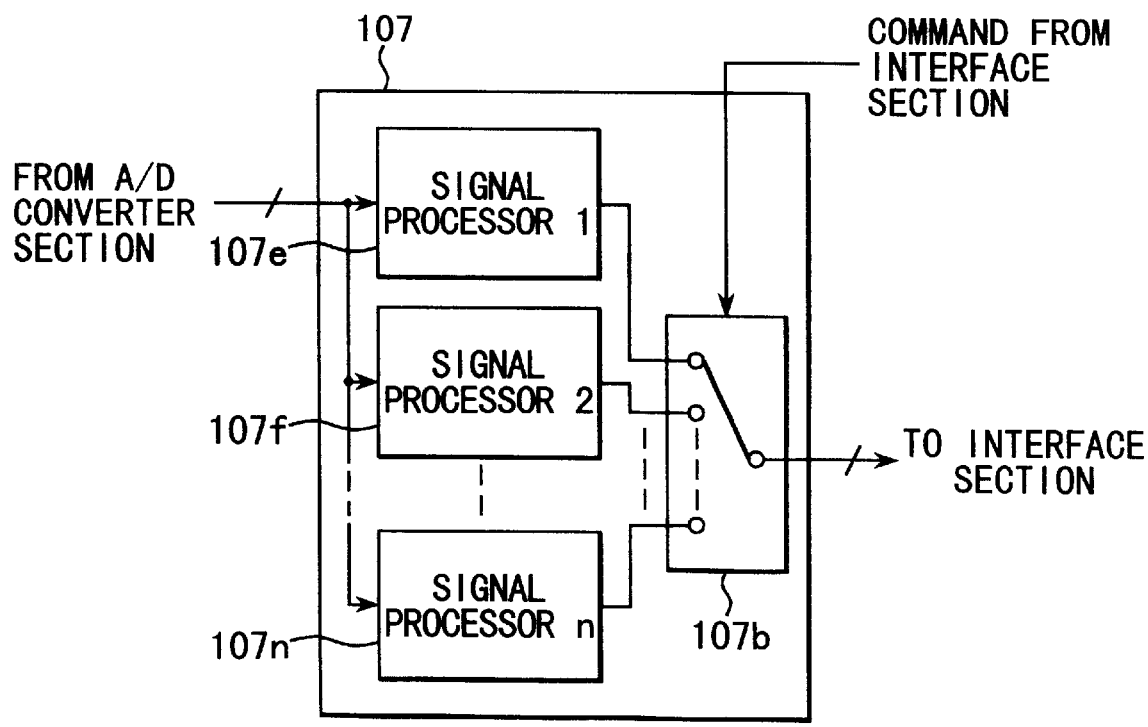
FIG. 8 is a block diagram showing still another digital signal processor section in the image sensor of the present invention.

FIG. 8 shows another digital signal processor section 107. This digital signal processor section 107 includes signal processors 107e to 107n. These signal processors are switched by a switch circuit 107b. With this structure of the digital signal processor section 107, an output format can be designated from a system by using one command, and an appropriate output can be output. In addition to the above schemes, the signal output formats of the signal processors 107e to 107n include formats used to record still image data in a computer, such as the PICT format, the GIF format, and the TIFF format.

Figure 9:
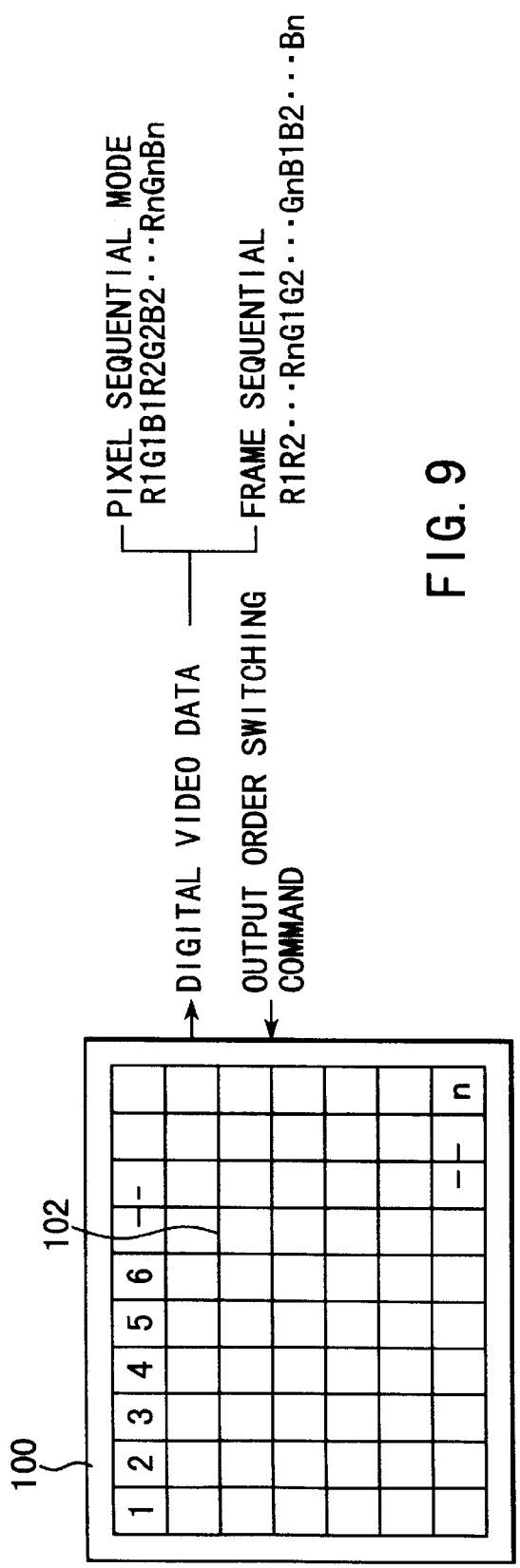
FIG. 9 is a view for explaining a plurality of read methods of reading out video signals from the solid state image sensor.

FIG. 9 shows a case in which the output order of video data captured by an area sensor section 102 is changed. The area sensor section 102 is an image sensor having an array of n pixels (n is the number of pixels of the area sensor section). In this case, when color video data are to be output, a command is used to switch between the pixel sequential scheme of reading out and outputting pixel signals in units of pixels each consisting of a combination of R (red), G (green), and B (blue) cells and the frame sequential scheme of reading out and outputting video signals in units of R, G, and B frames.

In the case shown in FIG. 9, the numbers in the area sensor section 102 are displayed in units of pixels. In this case, R, G, and B data are generated for each pixel in the image sensor by signal processing. FIG. 9 shows how the output orders based on the pixel sequential output mode and the frame sequential output mode are switched in accordance with a command.

In the above embodiment, the type of video data to be output can be selected in accordance with a command. Another embodiment in which data can be output in accordance with an external command will be described next.

An image sensor used for a general video camera which outputs video data to a TV monitor. For this reason, when the NTSC scheme is used, the image sensor outputs video data at a rate of 30 frames/second. When such an image sensor is used for a teleconference, a videophone, a desktop conference, or the like, the number of frames output per second is often smaller than 30 owing to a limitation imposed on transmission capacity. For this reason, the image sensor need not always output the currently sensed signal.

Upon reception of an output request from the outside, the image sensor outputs data. While no request is received, unnecessary circuit operations on the image sensor are stopped to reduce the power consumption.

Figure 10:
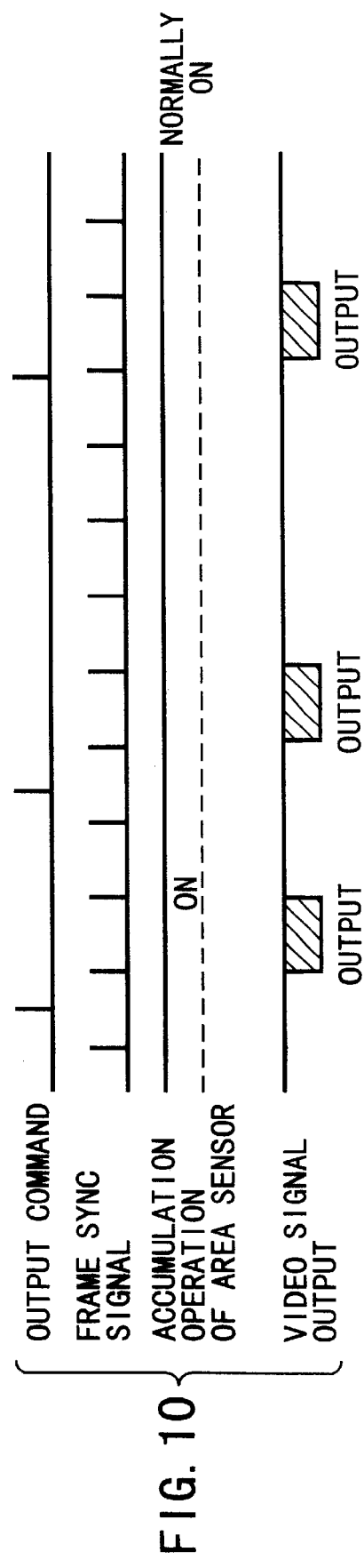
FIG. 10 is a timing chart for explaining one state in which a video signal is output in accordance with an output command.

FIG. 10 is a timing chart for a video signal output operation in this embodiment. According to this timing chart, an area sensor section 102 of an image sensor 100 always performs an effective charge integration operation. When a readout command is supplied to the area sensor section 102, signals are read out, from the head of the next frame, to the analog signal processing and the subsequent processing. That is, the signal circuit operates to output the signals.

Figure 11:
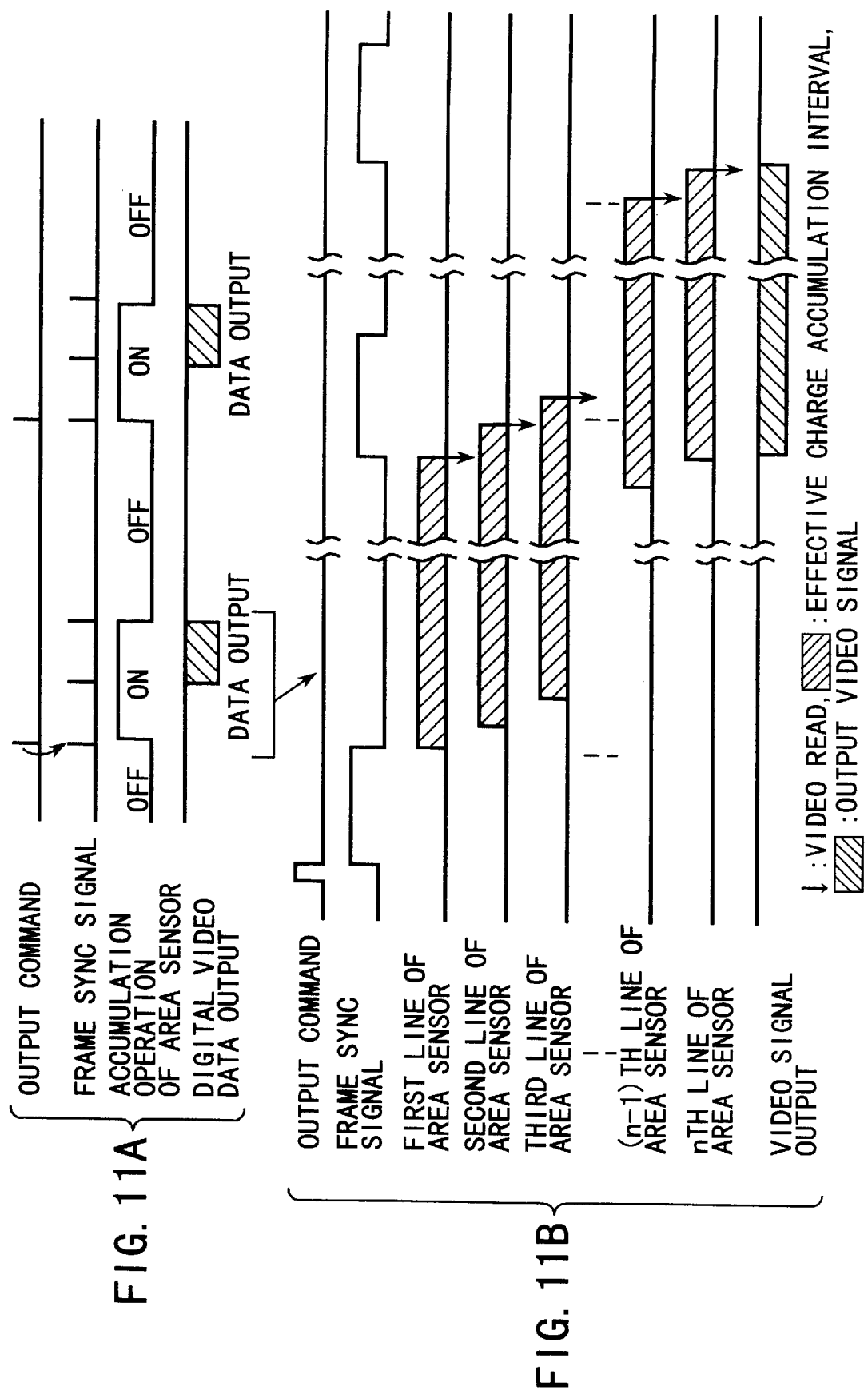
FIGS. 11A and 11B are timing charts for explaining another state in which a video signal is output in accordance with an output command.

FIGS. 11A and 11B are timing charts for a video signal output operation in still another embodiment. According to these timing charts, an area sensor section 102 performs effective charge integration for the first time when an output command is input. More specifically, a timing generator section 101 generates signals required for the respective portions in accordance with an output command. The area sensor section 102 then performs an effective charge integration operation on the basis of these signals. The readout signals are subjected to digital signal processing in a digital signal processor section 107. The resultant signals are output as video data to the outside of an image sensor 100 through an interface section 108. After the area sensor section 102 performs an effective charge integration operation for each frame interval in units of pixels, lines, arrays, or blocks, the resultant data are read out (FIGS. 11A and 11B show a case in which an integration read operation is performed in units of lines). That is, data is output at least one frame interval after an output command. Note that the effective charge integration interval is shortened while an electronic shutter is being operated.

Still another embodiment in which the output frame rates are set stepwise for an image sensor 100 in advance, and these rates are switched in accordance with an external command will be described next.

According to this embodiment, letting M be a rational number, a plurality of set values of M frames/second are prepared. These set values can be switched so that a frame rate suited to specific conditions for the system to be used or the preference of the user can be selected. That is, the set values of M are switched in accordance with a command input to the image sensor 100.

Figure 12:
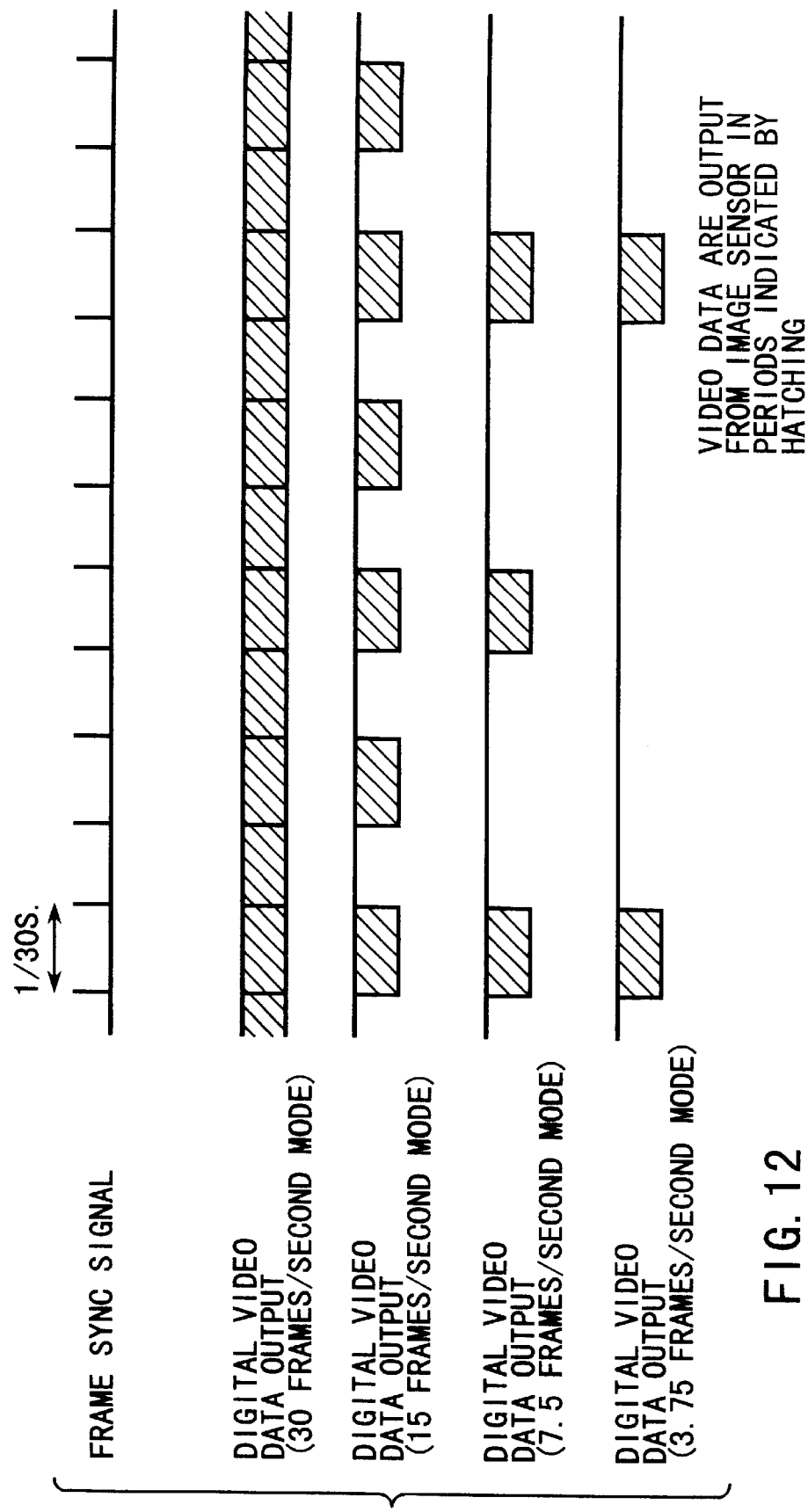
FIG. 12 is a timing chart for explaining an example of how the video signal output rates are switched in accordance with a command.

In this case, a timing generator section 101 has the function of implementing a plurality of read methods. The timing generator section 101 can select one of the methods and change the output rate in accordance with the above command. If, for example, a reference frame rate, i.e., N frames/second, and frame rates obtained by multiplying the reference rate by 1/n are set, like "30 frames/second", "15 frames/second", "7.5 frames/second", and 3.75 frames/second", are set, as shown in FIG. 12, the circuit structure can be simplified. In this case, N=30 and n=2.

For example, the following methods are available as frame rate selection methods.

Figure 13:
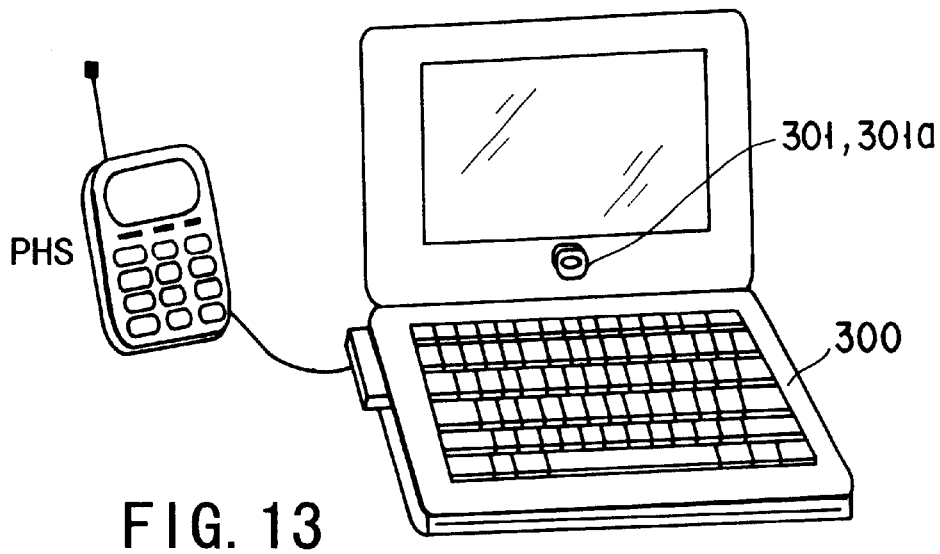
FIG. 13 is a perspective view of a personal computer incorporating the solid state image sensor of the present invention.
Figure 14:
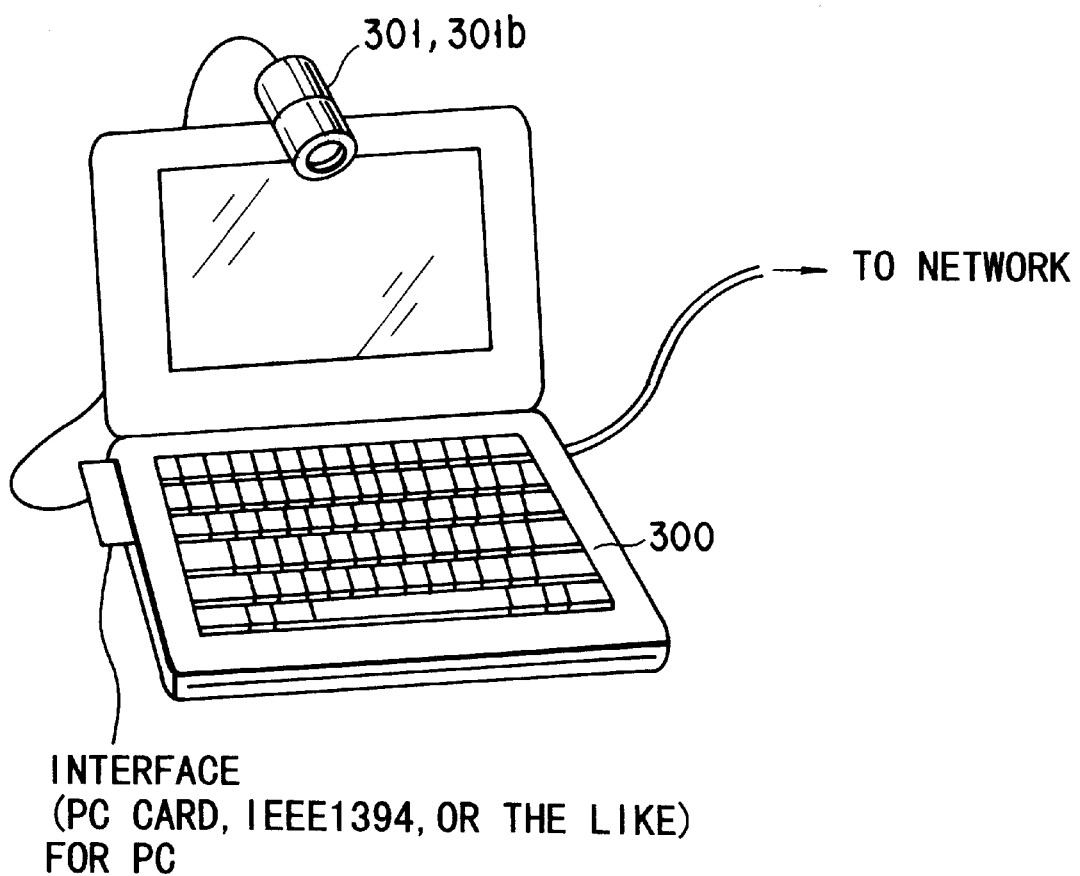
FIG. 14 is a perspective view of a personal computer to which the solid state image sensor of the present invention is connected.

For example, a method of checking the data transfer rate of a transmission line in a start-up operation, and causing software to select a frame rate is used in a camera 301 using the image sensor 100 of the present invention, as shown in FIG. 13, i.e., a structure in which a personal computer built-in camera 301a is mounted in a personal computer 300, and a cellar phone is connected to the personal computer 300 through an IF (interface), or in a camera 301 using the image sensor 100 of the present invention, as shown in FIG. 14, i.e., a system in which a camera 301a for a personal computer is connected to a personal computer 300 through an IF (interface), and the personal computer 300 is connected to a network line through the built-in communication interface to hold a desktop conference with a terminal in a remote place.

Figure 15:
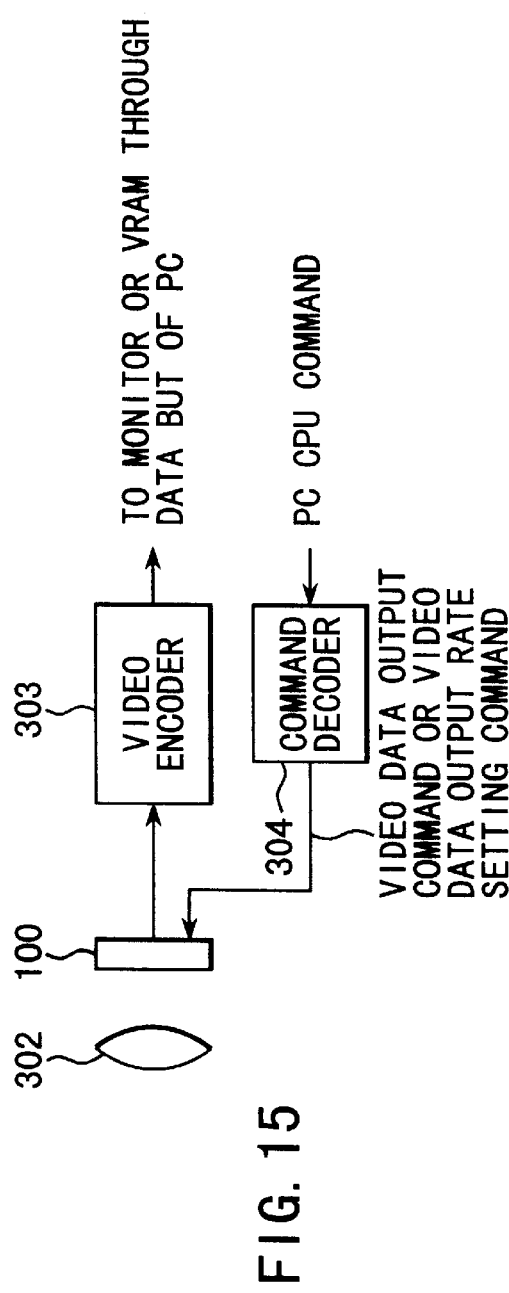
FIG. 15 is a block diagram for explaining the connection state between the solid state image sensor and the personal computer.

FIG. 15 shows a structure of the camera 301. The camera 301 is constituted by the image sensor 100 of the present invention, a lens system (optical system) 302 for forming an optical image on the image sensor 100, a video encoder 303 for encoding the image output from the image sensor 100, and a command decoder 304 for decoding an external command, and supplying the resultant data to the image sensor 100.

Figure 16:
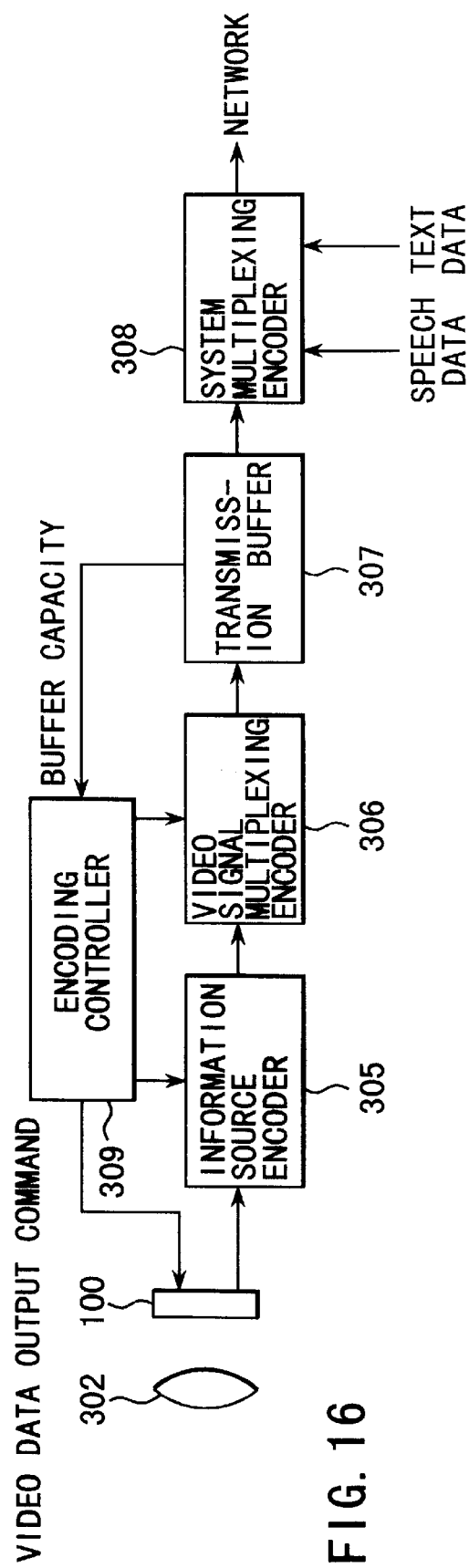
FIG. 16 is a block diagram showing a video encoding apparatus using a solid state image sensor.

A structure of the camera 301 in FIG. 16 is constituted by a lens system (optical system) 302 for forming an optical image on the image sensor 100, an information source encoder 305 for encoding the image output from the image sensor 100, a video signal multiplexing encoder 306 for formatting the video data output from the information source encoder 305, a transmission buffer 307 for temporarily holding an output from the video signal multiplexing encoder 306 to transmit it, a system multiplexing encoder 308 for multiplexing the data temporarily held in the transmission buffer 307 and transmitting the resultant data to the transmission path, and an encoding controller 309 for controlling the information source encoder 305, the image sensor 100, and the video signal multiplexing encoder 306 to control video signal read and transfer operations in accordance with the capacity of the transmission buffer 307.

Assume that the camera 301 connected to the personal computer 300 is the personal computer built-in camera 301a in FIG. 13 or the personal computer optional camera 301b in FIG. 14. In this case, upon reception of a frame rate selection command, the command decoder 304 decodes the command to switch to the camera 301 side to select a frame rate corresponding to the command. It suffices therefore if the controller (the CPU (processor) or the like) of the personal computer 300 outputs an output rate setting command to the image sensor 100.

Assume that the camera 301 has the structure shown in FIG. 16. In this case, since this structure is a combination of an image sensing section, a video encoder, and a transmission section, the system using the camera 301 may monitor the data share of the encoded data in the transmission buffer 307 to obtain a reference for a command in the hardware of the video encoder, as shown in FIG. 16.

For example, the above structure is designed such that the data space occupation in the transmission buffer 307 in FIG. 16 becomes smaller than a predetermined value, an output command is output. Alternatively, in the structure shown in FIGS. 15 or 16, signal processing may be performed for the standard of a video transmission system (e.g., H. 263 or H. 261) by software or hardware to allow the user to determine whether to give priority to the frame rate or image quality. The software or hardware then transmits a command on the basis of this determination.

Figure 17:
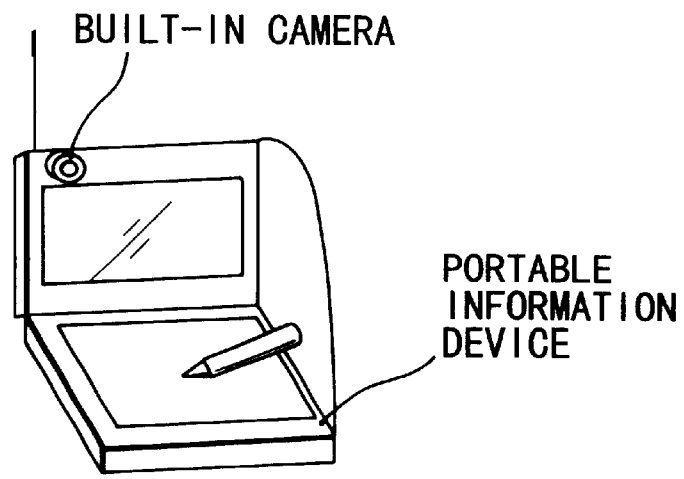
FIG. 17 is a perspective view of a portable information device incorporating the solid state image sensor of the present invention.
Figure 18:
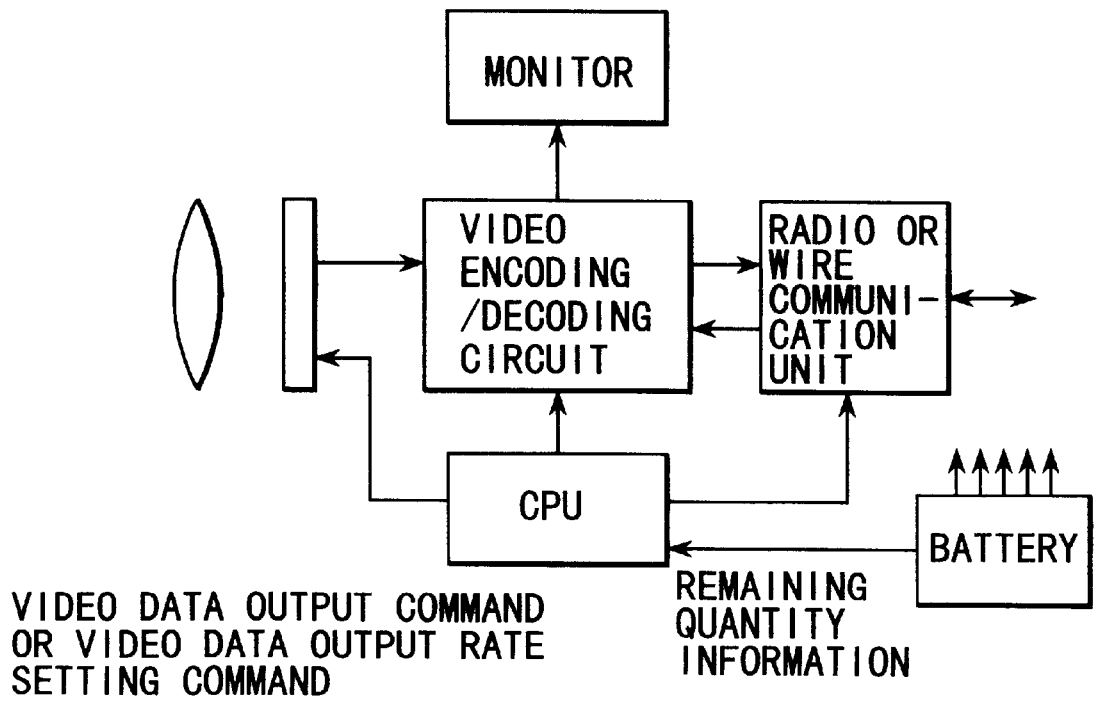
FIG. 18 is a block diagram showing the portable information device using the solid state image sensor.

Compact, lightweight, portable terminals such as handhold personal computers have recently become popular. For example, in a structure in which a communication means and the image sensor 100 are incorporated into a portable information device, as shown in FIG. 17, interruptions of communications due to battery exhaustion can be avoided to allow the user to complete necessary communication by using a control scheme in which the CPU detects the remaining quantity of a battery BT serving as a power supply for the portable information device so as to determine the output frame rate, as shown in FIG. 18. With this scheme, even if the remaining quantity becomes small, the operation time can be prolonged. If the CPU determines upon checking the battery of the device that the remaining quantity is small, the CPU controls to decrease the output frame rate so as to reduce the power consumption. With this control, a necessary operation can be ensured at the expense of quality.

In the system shown in FIGS. 13, 14, or 17, a power save mode may be set. In this case, the frame rate of the image sensor is decreased by activating this save mode.

An embodiment in which the pixel output order can be changed or pixels to be read out can be selected in accordance with an external command will be described next.

For example, an image sensor 100 of the present invention uses a CMOS type image sensor as an area sensor. This CMOS type image sensor can be designed to selectively activate horizontal and vertical scanning lines to allow arbitrary pixels to be read out, unlike a CCD image sensor.

In a system for outputting video data to a TV or a personal computer monitor, data are generally read out in units of lines. For example, in a system using data compression by block encoding, frame video data having an n×m pixel configuration are generally processed in units of blocks each consisting of 8×8 pixels or 16×16 pixels. To cope with these read methods, a plurality of read schemes or read schemes and a plurality of corresponding processing circuits may be incorporated into a timing generator section 101, a digital signal processor section 107, or both of them. In this case, the above processing can be easily coped with by switching these schemes in accordance with an external command.

This case will be described next.

Figure 19A:
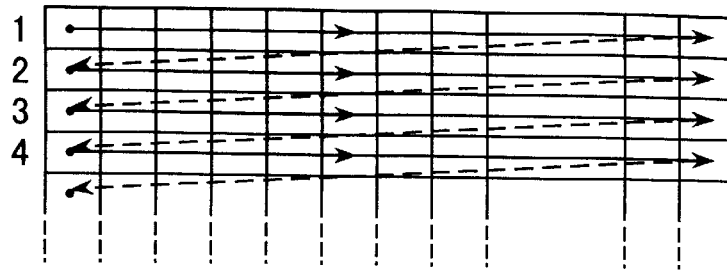
FIGS. 19A and 19B are views for explaining pixel read sequences in the solid state image sensor.
Figure 19B:
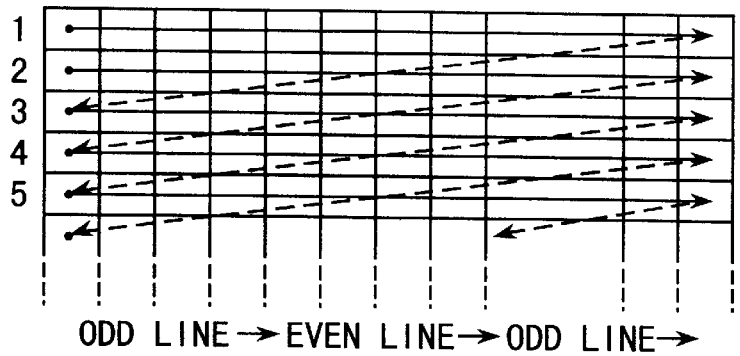

For example, FIGS. 19A and 19B show image read orders set when video data are to be output to a monitor. FIG. 19A shows noninterlaced scanning. FIG. 19B shows interlaced scanning.

Figure 20A:
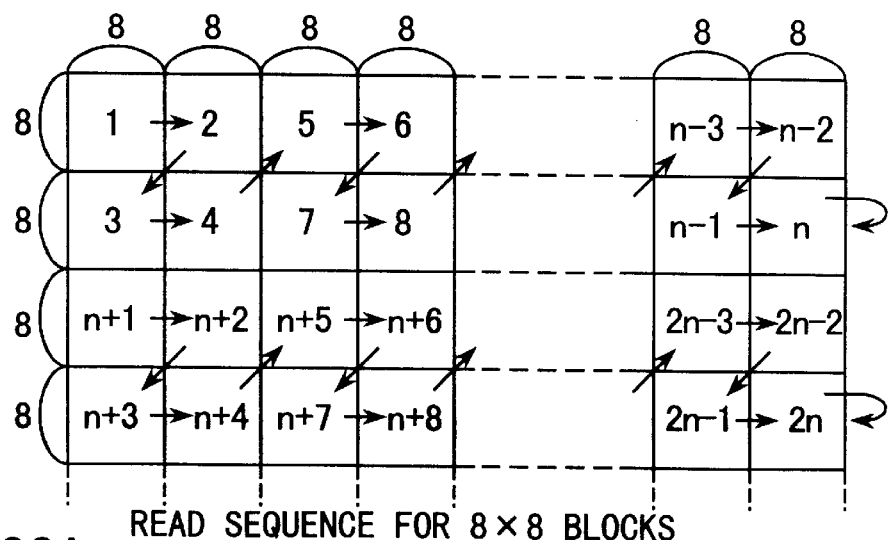
FIGS. 20A and 20B are views for explaining another pixel read sequence in the solid state image sensor.
Figure 20B:
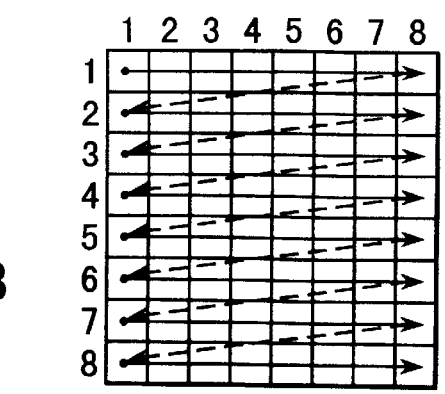
Figure 21:
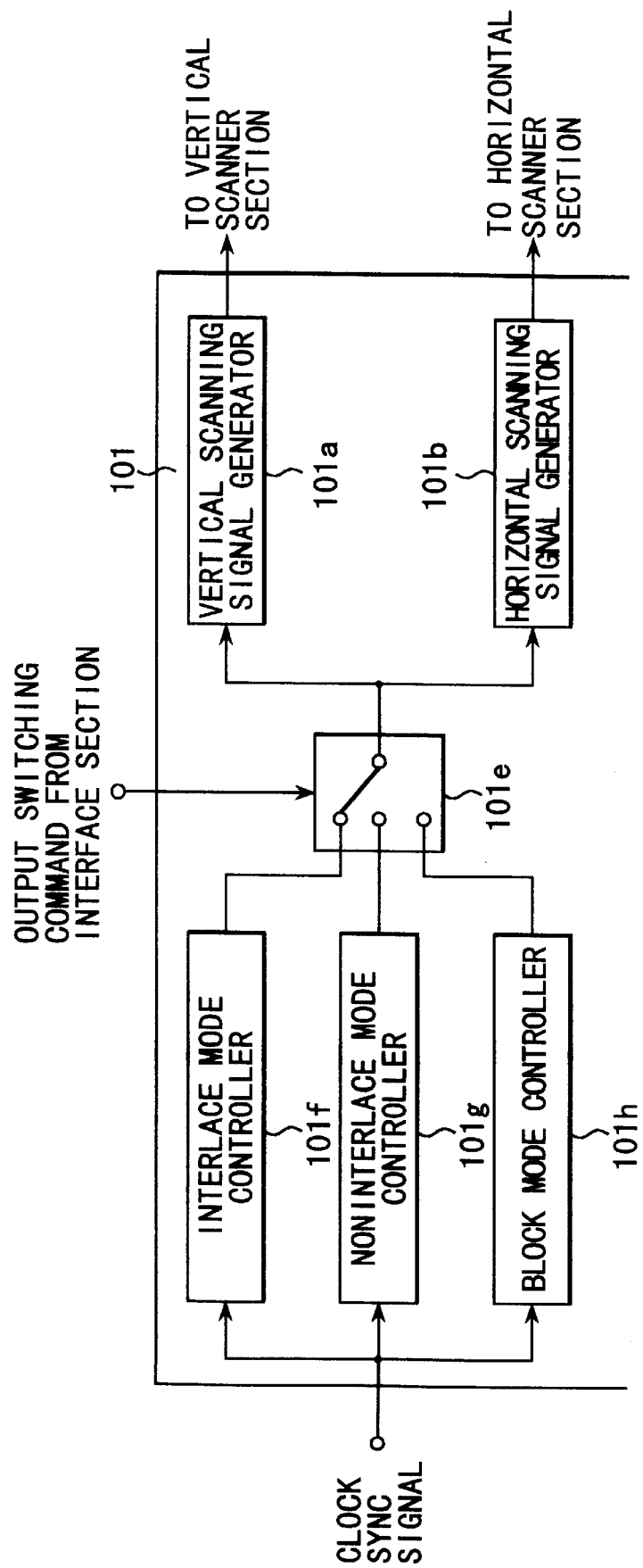
FIG. 21 is a block diagram showing a timing generator section for changing the pixel read sequence.

FIGS. 20A and 20B show the read order set when the H. 263 standard is used. According to this standard, a block consisting of four 8×8-pixel blocks is defined as a macroblock, and pixel signals or signals converted into luminance components and color components are read out in units of macroblocks in the GOB (Group of Blocks) order. The timing generator section 101 has a structure like the one shown in FIG. 21 to cope with this operation. More specifically, the timing generator section 101 includes a vertical scanning signal generator 101a, a horizontal scanning signal generator 101b, an interlace mode controller 101f, a noninterlace mode controller 101g, a block mode controller 101h, and a switch circuit 101e for selectively switching these controllers 101f, 101g, and 101h in accordance with a command. The timing generator section 101 switches the modes in accordance with an output switching command to change the signal to be output to the scanner section of the area sensor section 102, thereby changing the output order.

When the timing generator section 101 is designed to select one of the read schemes in this manner, a single image sensor can cope with the above methods.

The image sensor 100 of the present invention can selectively output pixels. Therefore, the image sensor 100 can easily sub-sample at intervals of a predetermined number of pixels or read out only part of an image. These embodiments will be described next.

Figures 22A, 22B, 22C:
FIGS. 22A, 22B, and 22C are views for explaining pixel sub-sampling read schemes.

FIGS. 22A to 22C show the former embodiment, i.e., the embodiment in which sub-sampling is performed at intervals of a predetermined number of pixels. Referring to FIGS. 22A to 22C, each pixel is constituted by three color cells, i.e., G, R and B cells. FIG. 22A shows an all-pixels read scheme of reading out all the cells of an entire frame. FIG. 22B shows a sub-sampling read scheme of reading out video data from alternate two adjacent horizontal lines at intervals of two pixels on each horizontal line to be read out. FIG. 22C shows another sub-sampling read scheme of reading out video data from alternate cells.

Figure 23:
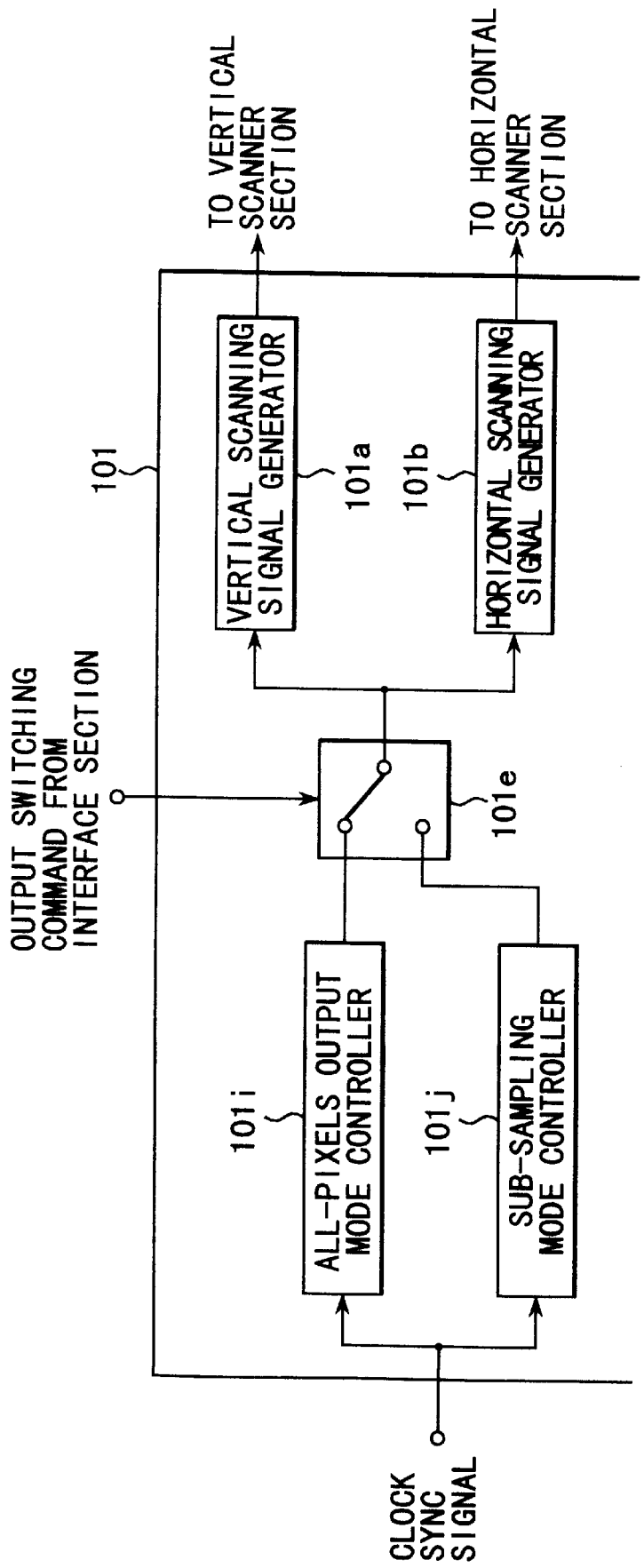
FIG. 23 is a block diagram showing a timing generator section capable of pixel sub-sampling reads.

In a sub-sampling system that sub-samples at intervals of a predetermined number of pixels, a small resolution (the resolution in this case indicates the number of pixels) can be set in the motion video capture mode, a large resolution can be set in the still image capture mode, and the resolution can be changed in accordance with the transmission capacity set in a desktop conference. In this case, it suffices if a timing generator section 101 is designed as shown in FIG. 23, and switching is performed in accordance with an output switching command. More specifically, the timing generator section 101 includes a vertical scanning signal generator 101a, a horizontal scanning signal generator 101b, a switch circuit 101e, an all-pixels output mode controller 101i, and a sub-sampling mode controller 101j.

The all-pixels output mode controller 101i generates a timing signal for reading out all pixels on the basis of a clock sync signal. The sub-sampling mode controller 101j generates a timing signal for a read operation in the sub-sampling mode on the basis of a clock sync signal. The switch circuit 101e switches and supplies these timing signals to the vertical scanning signal generator 101a and the horizontal scanning signal generator 101b. The switch circuit 101e selects and extracts one of outputs from the mode controllers 101i and 101j in accordance with the switching command supplied from the interface section 108. Upon reception of an external command, the interface section 108 generates a switching command in accordance with the command, and supplies it to the switch circuit 101e. When an image read operation is to be performed, all pixels are generally read out, as shown in FIG. 22A.

The embodiment shown in FIG. 22B exemplifies the Bayer pattern structure, in which the video data of the hatched cells of the cells of the respective colors orderly arranged in the vertical and horizontal directions are read out, thereby obtaining an image having a size ½ that of the original image. In addition, since the order of colors to be read need not be changed, the structure of the digital signal processor section 107 need not be changed.

FIG. 22C shows a sub-sampling scheme of reading out only green (G) pixels. A black-and-white image consists of only gradation data, and the gradation data can be reproduced by the luminance signal of the image. For this reason, in this case, green pixels closest to the luminance signal are used to obtain a black-and-white image.

According to this scheme, for example, green pixels closest to the luminance signal are used to capture a black-and-white image.

Figure 24:
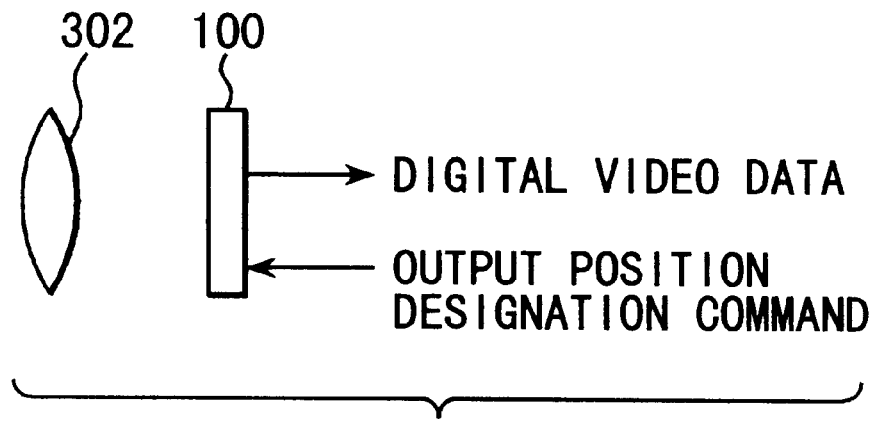
FIG. 24 is a view for explaining a solid state image sensor which allows pixels to be selectively read out.

An embodiment in which only part of video data is output will be described next. In outputting "only partial video data", which is the video data of only a partial frame area of a sensed image, motion video data can be efficiently encoded by exclusively outputting a moving portion or a portion to be seen in detail. In this case, as shown in FIG. 24, an output position designation command is newly prepared for an image sensor 100 of the present invention which is to be used as the image sensing section of a camera. In this image sensor, when a given point in the image sensing area of an area sensor section 102 is designated by this command, the video data of a specific area around the point is output.

Figure 25A:
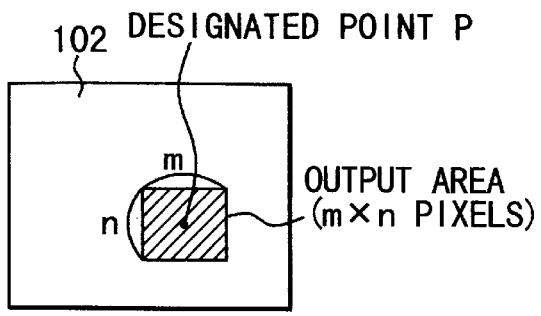
FIGS. 25A to 25F are views for explaining selective pixel read.
Figure 25B:
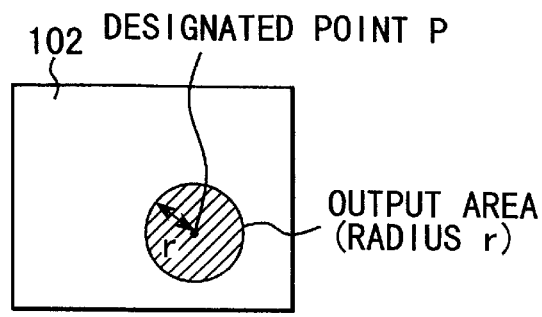
Figure 25C:
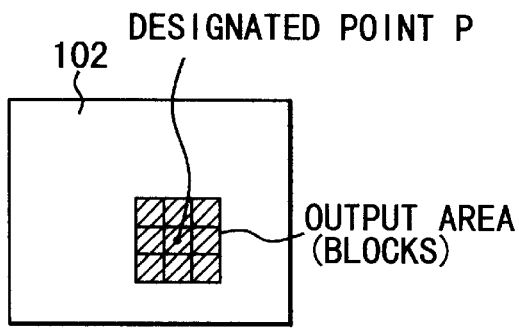
Figure 25D:
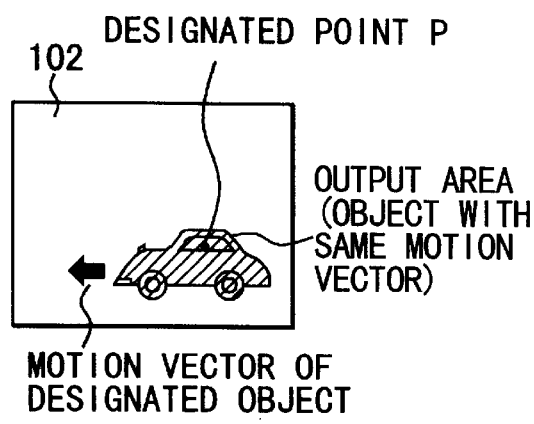
Figure 25E:
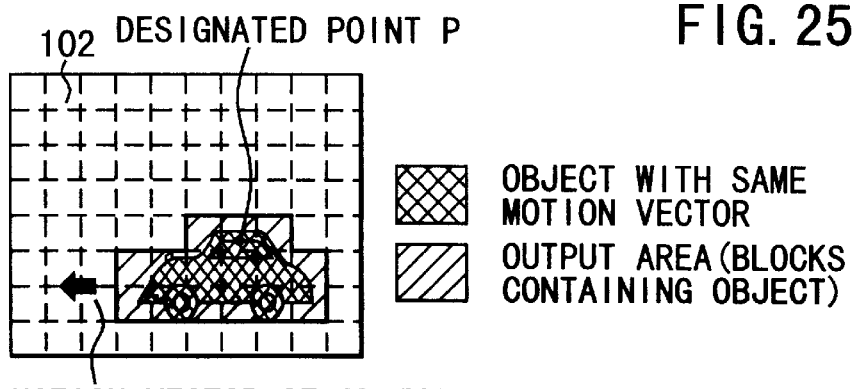
Figure 25F:
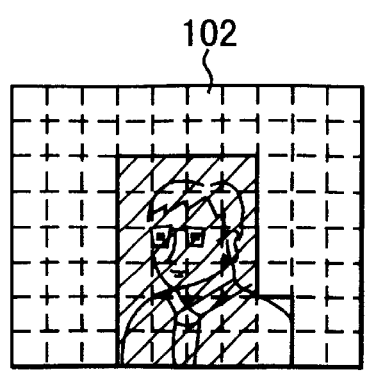

In this case, the area around the point is a predetermined range centered on the designated point P, as shown in FIGS. 25A and 25B, one or a plurality of blocks including the designated point P, as shown in FIG. 25C, or a range with the same characteristics. In this case, the range with the same characteristics indicates a range obtained around the point by edge recognition, an object (FIG. 25D) or block (FIG. 25E) having the same motion vector value as that of the point or a motion vector value similar to that of the point, an object or block having a luminance signal value or hue similar to that of the point, or an object or block which satisfies a combination of the above conditions. Alternatively, a block may be designated by a command, instead of a point, to output the video data of only the designated block, as shown in FIG. 25F.

Figure 26:
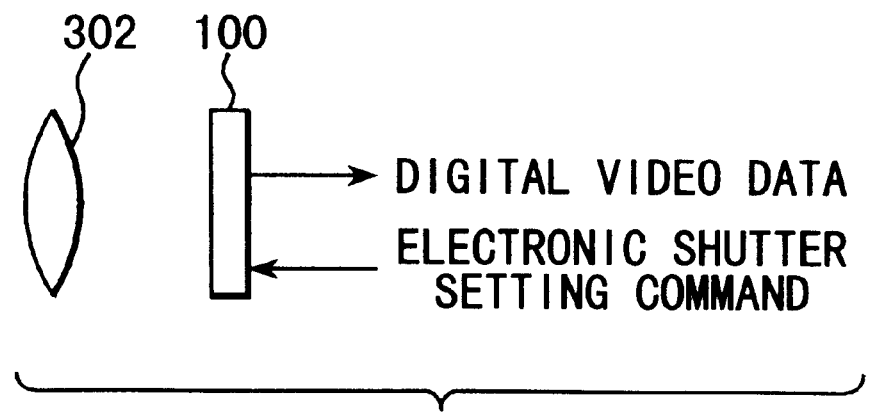
FIG. 26 is a view for explaining how an electronic shutter is set by using a command.

An embodiment in which the electronic shutter setting in an image sensor 100 can be changed in accordance with an external command will be described next. As shown in FIG. 26, the image sensor of this embodiment has the function of receiving an electronic shutter setting command, and incorporates a function means for recognizing an electronic shutter setting command and performing an operation corresponding to the command. With this structure, an electronic shutter setting operation can be performed in accordance with an external command.

This embodiment will be described in detail below with reference to FIGS. 27A to 27D.

In a CCD image sensor, the charge integration times for all pixels are the same. In contrast to this, in the image sensor 100 used in the present invention, when, for example, a CMOS type image sensor is used as an area sensor, since this area sensor reads out video data in units of pixels, lines, or blocks, the starts and ends of the charge integration times differ in units of pixels, lines, or blocks. In this case, video data are read out in units of lines.

Figure 27A:
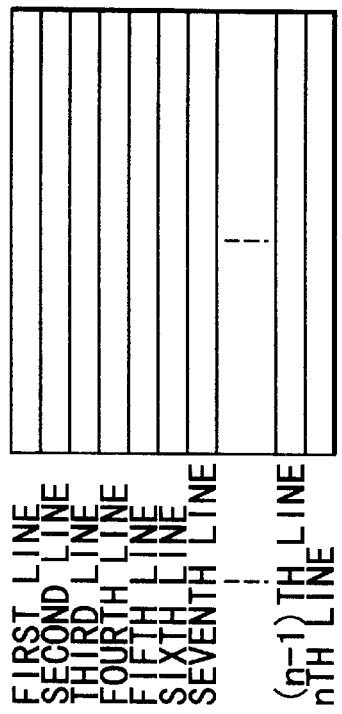
Figure 27B:
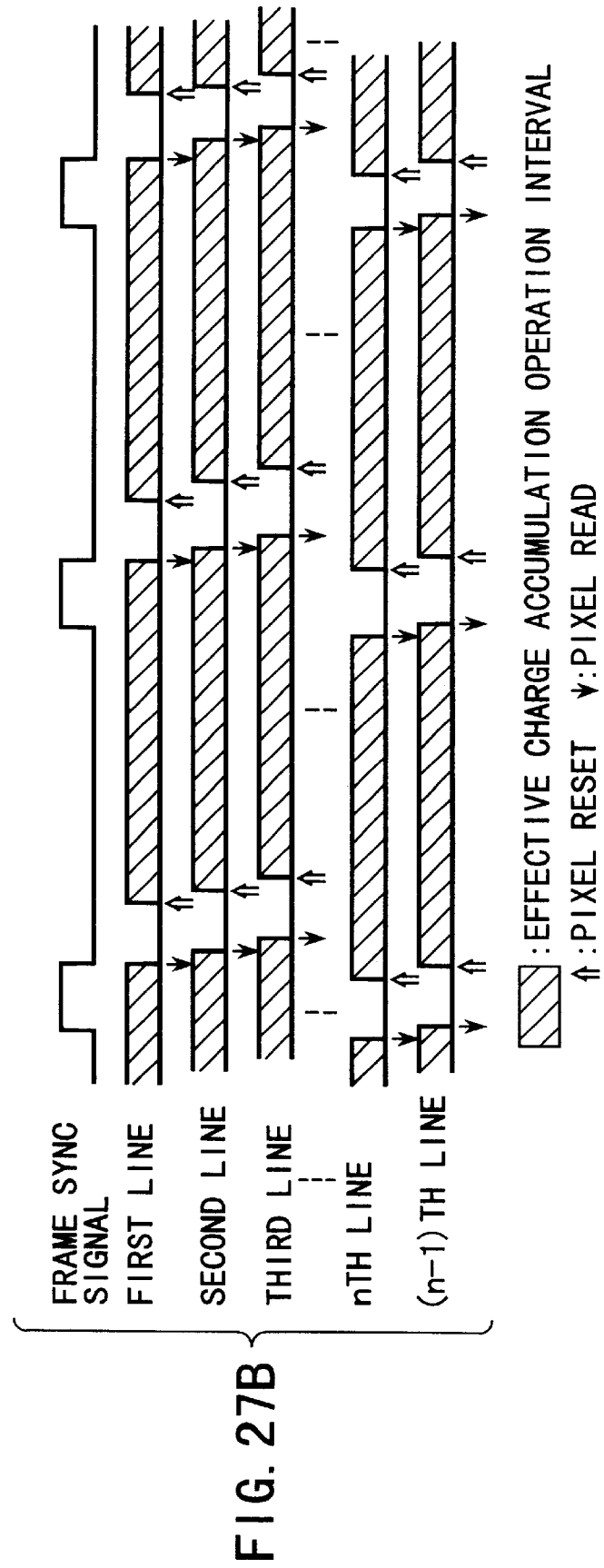

Assume that the pixels of each frame are line-sequentially read out, as shown in FIG. 27A. In this case, as shown in FIG. 27B, first of all, the ineffective charges accumulated in pixels are reset, and an effective charge integration operation is started. Pixels are read out after a lapse of a predetermined period of time, and the image-sensed signal is then subjected to signal processing on the next stage. Although the timings of effective charge integration intervals differ in units of lines, the lengths of the respective intervals are the same.

When the electronic shutter is to be operated, the effective charge integration interval can be shortened by delaying the pixel reset timing at which ineffective charges are reset, as shown in FIG. 27C. This operation is performed when the modes of the timing generator section 101 are switched in accordance with an electronic shutter command.

In addition, effective charge integration operation setting can be performed in units of lines or blocks in accordance with a command. FIG. 27D shows a case in which the effective charge integration interval for the second line is set to differ from that for the remaining lines. FIG. 28 is a timing chart for an image sensor in which the area sensor section 102 is divided into blocks to read out video data in units of blocks. In this case, the effective charge integration interval for "block 13", which is the 13th block, of "block 1" to "block m", is set to be different from that for the remaining blocks.

By allowing electronic shutter setting in this manner, each object can be image-picked up conveniently. Assume that the object has a light-emitting portion. In this case, if the electronic shutter setting, i.e., the effective charge integration interval, is set in accordance with this light-emitting portion, the remaining portion becomes dark.

If, however, the effective charge integration interval for pixels, lines, or blocks corresponding to the light-emitting portion is set to be shorter than that for the remaining portions, an excellent image can be obtained.

Figure 29:
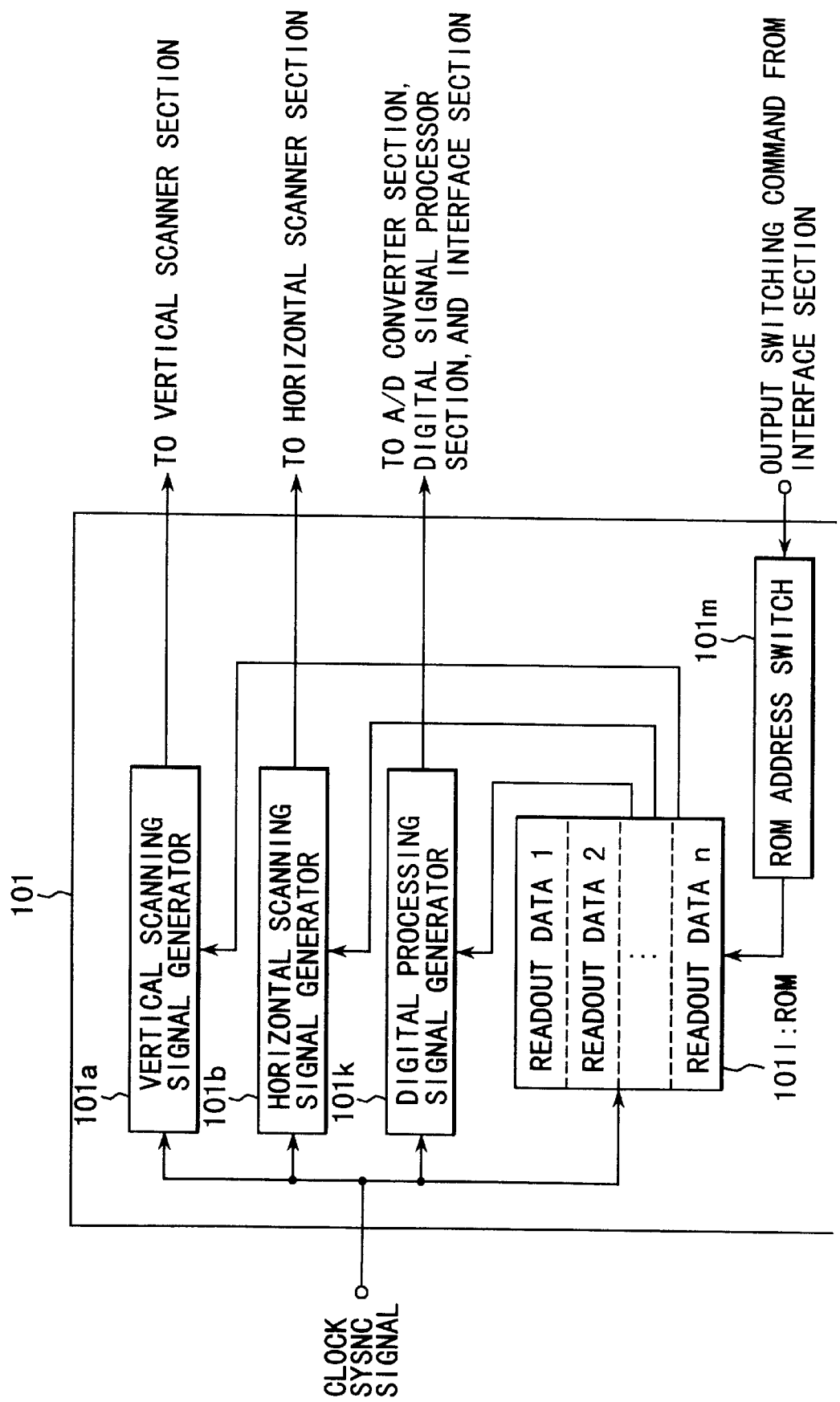
FIG. 29 is a block diagram showing a timing generator section.

In another embodiment of the above method of switching the modes of the timing generator section 101, a ROM 101l is arranged in the timing generator section 101, as shown in FIG. 29. The information to be read out from the ROM 101l is changed by switching the addresses of the ROM 101l using a ROM address switch 101m capable of switching the addresses in accordance with a command. The signal to be output from a signal generator 101k for generating a signal for digital processing is changed in accordance with the readout information. With the use of the ROM, the chip area can be reduced, leading to a reduction in cost.

The structure of the timing generator section 101 in the image sensor 100 of the present invention has been described above. An embodiment in which an image sensor incorporates a vector detection circuit for detecting the motion vector in motion video data will be described next.

Figure 30:
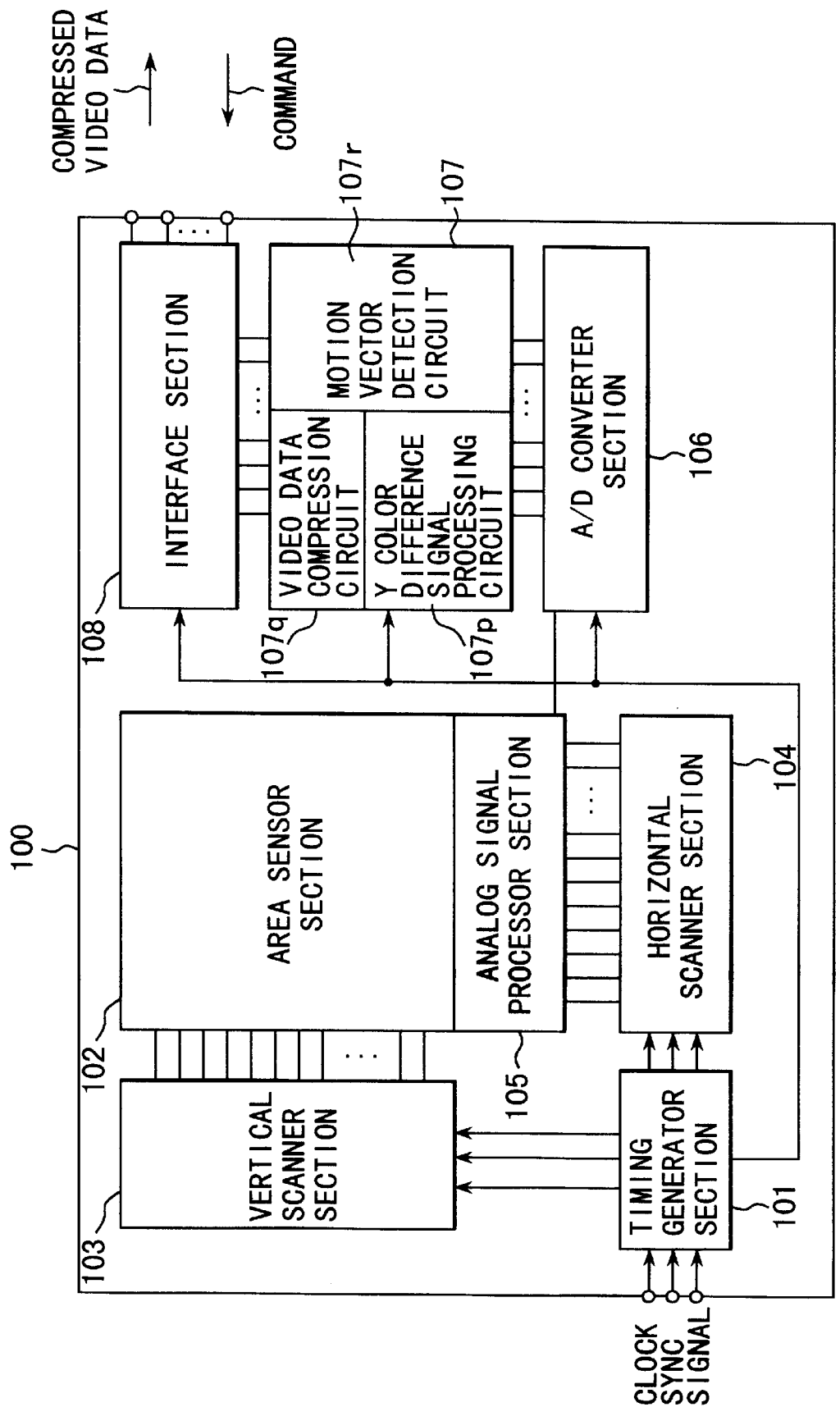
FIG. 30 is a block diagram showing a solid state image sensor including a motion video data compression circuit and a motion vector detection section.

In this embodiment, the image sensor 100 incorporates a video data compression circuit 107q for compressing motion video data, as shown in FIG. 30, or a video data compression circuit 400 for compressing motion video data follows the image sensor 100, as shown in FIG. 31. The image sensor incorporates a motion vector detection circuit 107r.

The motion vector detection circuit 107r is a circuit for detecting the motion vector in an image. The luminance signal (Y data) generated by the digital signal processor section 107 is input to the motion vector detection circuit 107r to be used for processing. As a luminance signal, an output from a Y color difference signal processing circuit 107p for obtaining Y data and color difference data from the video data output from an A/D converter section 106 is used.

In the image sensor 100 shown in FIG. 30, the digital signal processor section 107 has a structure like the one shown in FIG. 32. In the image sensor shown in FIG. 31, the digital signal processor section 107 has a structure like the one shown in FIG. 33, which is constituted by the Y color difference signal processing circuit 107p and the motion vector detection circuit 107r. Filters of one color of the color filters formed on the respective pixels of the area sensor section 102 may be used in place of luminance signals.

In a single-plate image sensor, one color filter is generally formed on each pixel (more specifically, each of the cells constituting each pixel), and a plurality of (three or four in general) such color filters are used to obtain a color image.

These color filters are arranged into repetitive patterns in a mosaic or stripe form, as a whole, on the respective cells arranged in the form of a matrix. By selecting one of the colors of the filters, the motion vector can be calculated. This structure simplifies the circuit.

Figure 34:
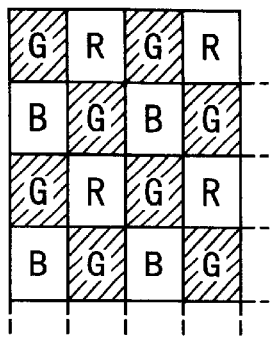
FIG. 34 is a view showing the pixel structure of the area sensor section of the solid state image sensor having the motion vector detection section.
Figure 35:
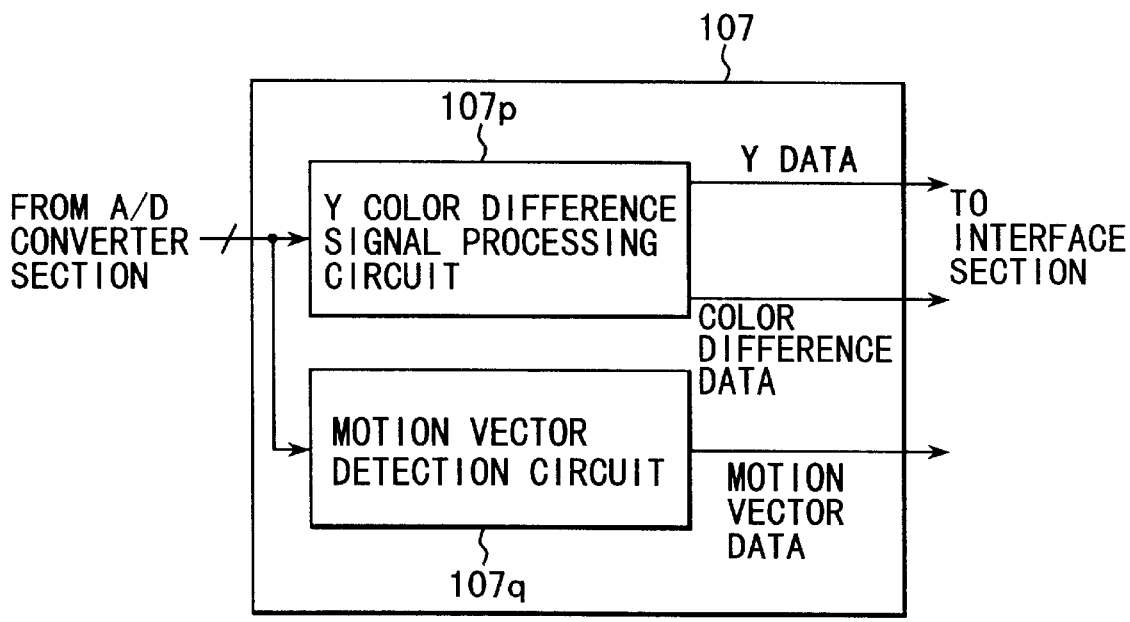
FIG. 35 is a block diagram showing another digital signal processor section of the solid state image sensor.

For example, in the image sensor 100 having the area sensor section 102 with a Bayer pattern structure like the one shown in FIG. 34, G pixel outputs closest to the luminance signal are used in place of the luminance signal. FIG. 35 is a block diagram showing the structure of the digital signal processor section 107 in FIG. 33 which is used in this case. More specifically, upon reception of G pixel video data from the A/D converter section 106, the Y color difference signal processing circuit 107p generates Y data and color difference data, and outputs them to an interface section 108. A motion vector detection circuit 107q detects the motion vector by using the G pixel video data from the A/D converter section 106, and outputs the vector as motion vector data to the interface section 108.

When the video data compression circuit 400 is externally connected to the image sensor 100, as shown in FIG. 31, the motion vector detected by the digital signal processor section 107 in the image sensor 100 is encoded and sent to the video data compression circuit 400 on the next stage through the interface section 108. As this motion vector data, a motion vector standard itself, e.g., H. 261, H. 263, MPEG 1, MPEG 2, or MPEG 4, the standard of which is under deliberation, can be conceived. According to the standard itself, a large circuit size and high-speed processing are required. For this reason, auxiliary data indicating an approximate motion vector or direction, or the presence/absence of motion, may be supplied to the video data compression circuit 400. This operation is also effective. This can effectively reduce the circuit size of the video data compression circuit 400 on the next stage or obviate the need for high-speed processing.

When the camera using the image sensor 100 of the present invention is mounted on the above portable information device (see FIG. 17), the user may use the device while holding it with his/her hand. In this case, the influence of camera-shake must be considered. The following structure is effective for such a case.

Figure 36:
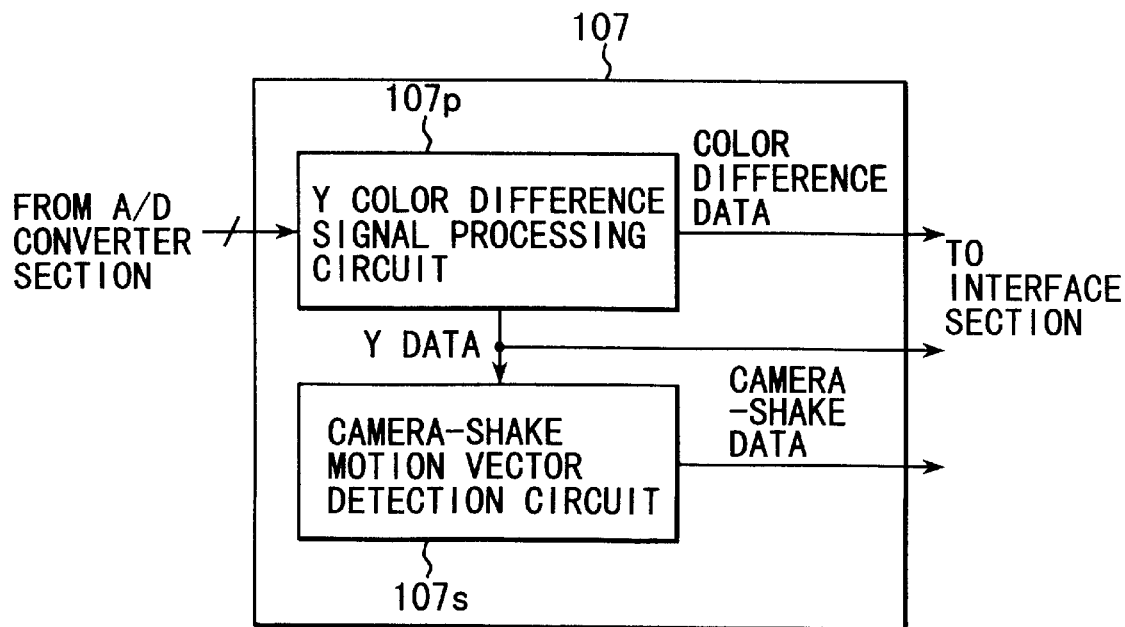
FIG. 36 is a block diagram showing still another digital signal processor section of the solid state image sensor.

FIG. 36 shows an embodiment in which the motion vector based on camera-shake is calculated in the image sensor 100, and the calculated vector is output as data to the video data compression circuit on the next stage. The video data having undergone digital conversion in an A/D converter section 106 is subjected to signal processing in a Y color difference signal processing circuit 107p to obtain a luminance signal (Y data) and color difference data. This embodiment also includes a camera-shake motion vector detection circuit 107s to detect camera-shake on the basis of the Y data. This circuit also converts the detected camera-shake into a motion vector, and outputs it as camera-shake data.

Referring to FIG. 37, a portable information device incorporates a sensor 401 for detecting the camera-shake amount and outputting the detected amount as data. The data detected by this camera-shake sensor 401 is input to an image sensor 100 of the present invention, which incorporates a video data compression circuit, and the input data is used as camera-shake correction data for the calculation of the motion vector. The image sensor 100 is mounted as a camera in the portable information device.

In this case, a digital signal processor section 107 in the image sensor 100 has a structure like the one shown in FIG. 38. More specifically, the digital signal processor section 107 is constituted by a Y color difference signal processing circuit 107p for obtaining color difference data and Y data from video data, a motion vector detection circuit 107q for detecting the motion vector from the Y data, and an adder 107t for correcting motion vector data as an output from the motion vector detection circuit 107q by adding (subtracting) camera-shake data to (from) the motion vector data, and outputting the resultant data. An output from the camera-shake sensor 401 is supplied to the adder 107t of the digital signal processor section 107 through an interface section 108.

FIG. 39 shows a structure which a portable information device should have when the motion vector effective for motion video data compression (motion video data compression in a video data compression circuit 400 to be externally connected) on the next stage is to be calculated from the data obtained by a camera-shake sensor 401 and the motion vector data output from an image sensor 100 of the present invention. In this case, since motion video data compression is performed on the stage next to the image sensor 100, an adder 402 is connected to the motion vector data output terminal of the image sensor 100 to add (subtract) the data of the camera-shake amount detected by the camera-shake sensor 401 and motion vector data as one output from the image sensor 100 so as to obtain motion vector data having undergone camera-shake amount correction. This motion vector data is supplied to the video data compression circuit 400 to be compressed.

Figure 40:
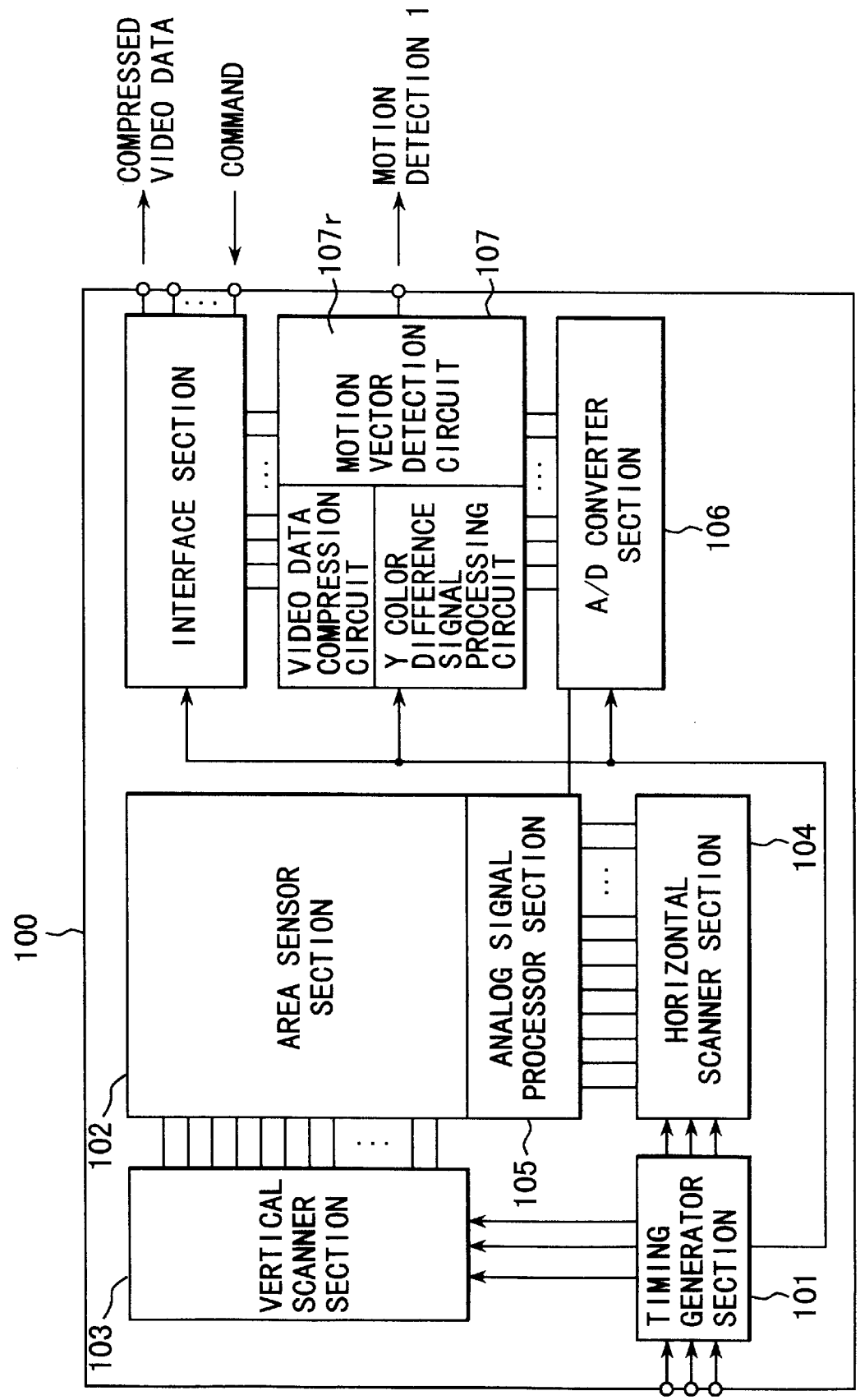
FIG. 40 is a block diagram showing still another solid state image sensor having a motion vector detection section.

FIGS. 40 and 41 show an embodiment in which a motion detection signal can be output from the outside of a motion vector detection circuit 107q of a digital signal processor section 107 of an image sensor 100. The motion vector detection circuit 107q outputs a motion detection signal upon detection of the motion vector. Since the motion detection signal obtained by the digital signal processor section 107 can be used outside the image sensor 100, when motion is detected within the image sensing range, the system can be notified of this detection by using the detection signal.

Assume that this structure is used for a supervisory camera system. In this case, when motion is detected, the corresponding video data can be recorded on a recording medium, or an alarm can be generated. That is, a useful system can be formed. In addition, when a system is formed by using a personal computer, an interrupt may be generated in the personal computer in accordance with a motion detection signal. As a motion detection signal, a status signal (to be described later) may be output to the outside.

Figure 42:
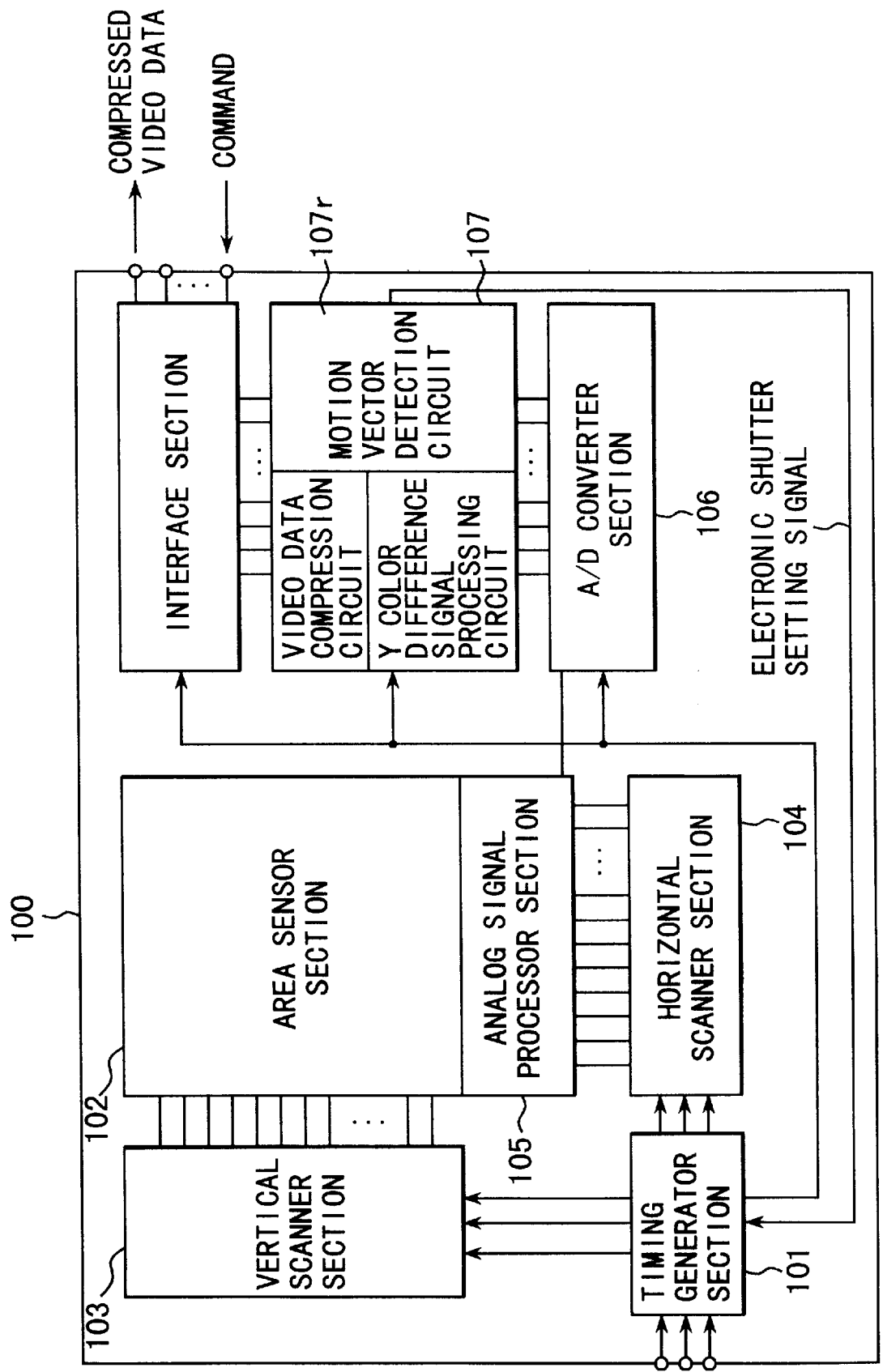
FIG. 42 is a block diagram showing still another solid state image sensor having a motion vector detection section.
Figure 43:
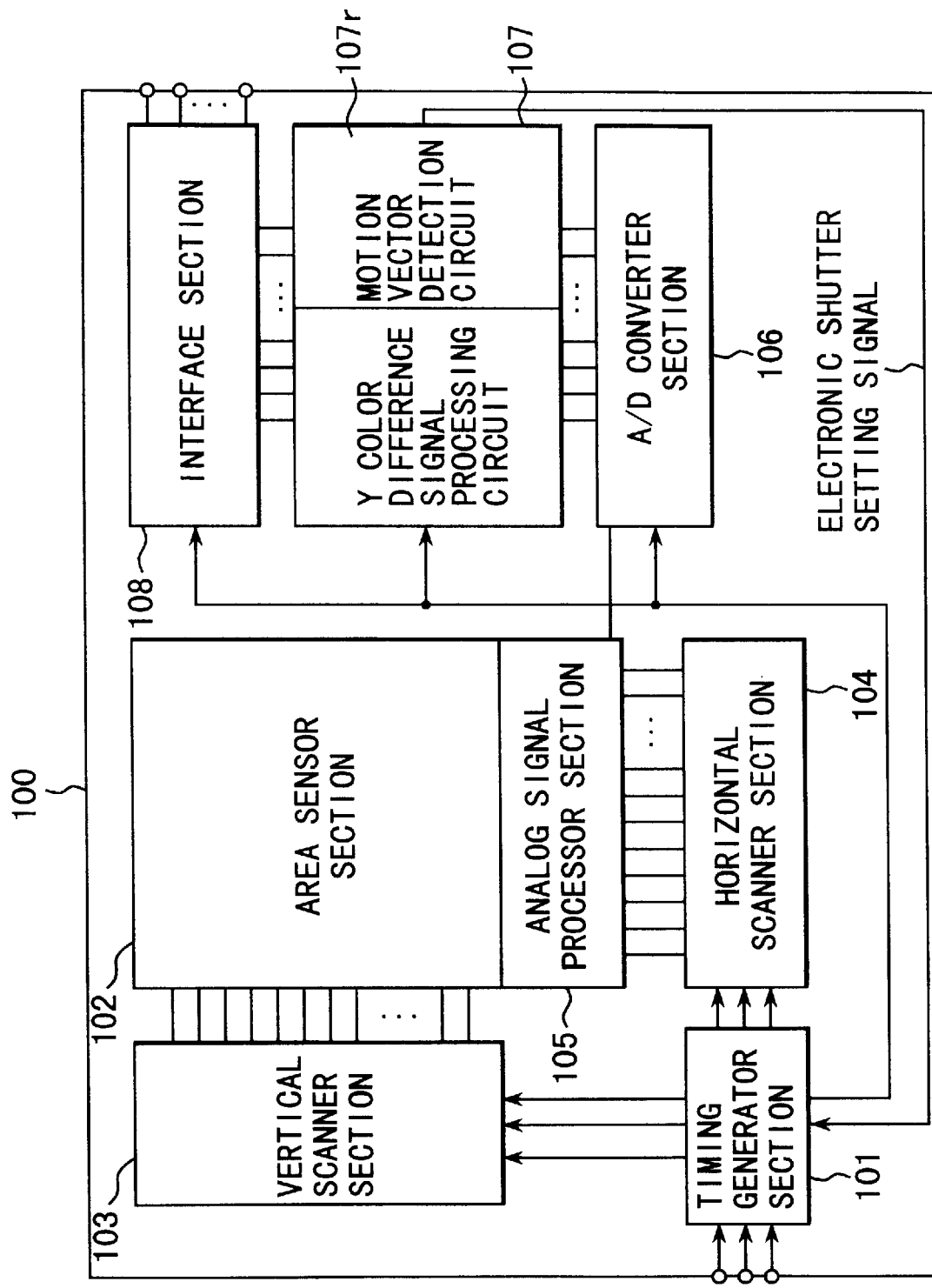
FIG. 43 is a block diagram showing still another solid state image sensor having a motion vector detection section.

FIGS. 42 and 43 show a case in which the effective charge integration interval for a pixel in motion, detected by a motion vector detection circuit 107q of a digital signal processor section 107, or a block including such pixel in motion is changed. The above motion vector signal obtained by the motion vector detection circuit 107q is fed back, as an electronic shutter signal, to a timing generator section 101. The timing generator section 101 corrects various signals supplied to a vertical scanner section 103 and a horizontal scanner section 104 in accordance with this motion vector, thereby controlling the read operation of an area sensor section 102. That is, the timing generator section 101 controls the electronic shutter.

As the effective charge integration interval for a portion in motion is shortened, the image blur decreases. As in this case, when the electronic shutter setting is changed in accordance with the magnitude of the motion vector, the image quality improves.

Assume that no motion detection circuit is arranged in an image sensor 100, but a video data compression circuit including a motion vector detection section is externally connected to the image sensor 100. In this case, the electronic shutter setting of the image sensor 100 may be changed in accordance with this motion vector detection result as a command input.

The structure obtained by adding the motion vector detection circuit to the digital signal processor section 107 of the image sensor 100 of the present invention and its application examples have been described above. An interface section 108 of an image sensor 100 of the present invention will be described next.

Figure 44:
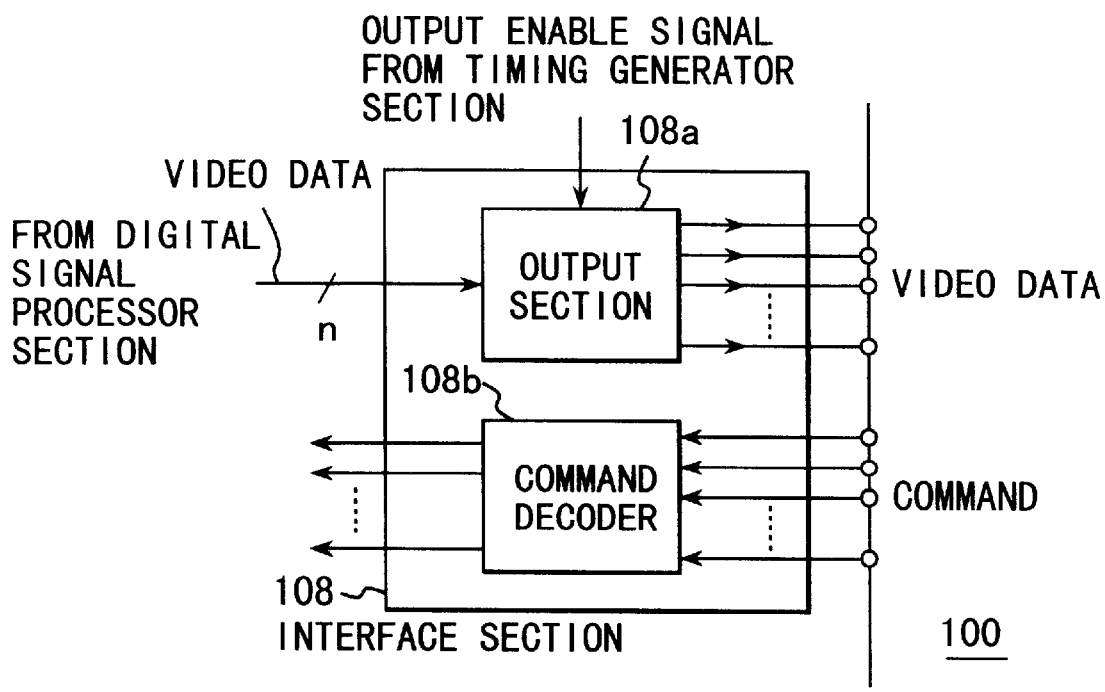
FIG. 44 is a block diagram showing the interface section of a solid state image sensor.

FIG. 44 shows the structure of the interface section 108 having digital video data signal lines independently of command signal lines. The video data signal lines are exclusively used for output operation. These lines are connected to the output side of an output section 108a for performing output control on signals from a digital signal processor section 107. The command signal lines are exclusively used for input operation. These lines are used to input external commands to a command decoder 108b.

This structure requires a large number of signal lines, but allows easy connection to the outside. In addition, the internal structure of the image sensor 100 is not complicated. Video data is output in accordance with an output enable signal generated on the basis of a signal for activating the image sensor 100.

Figure 45:
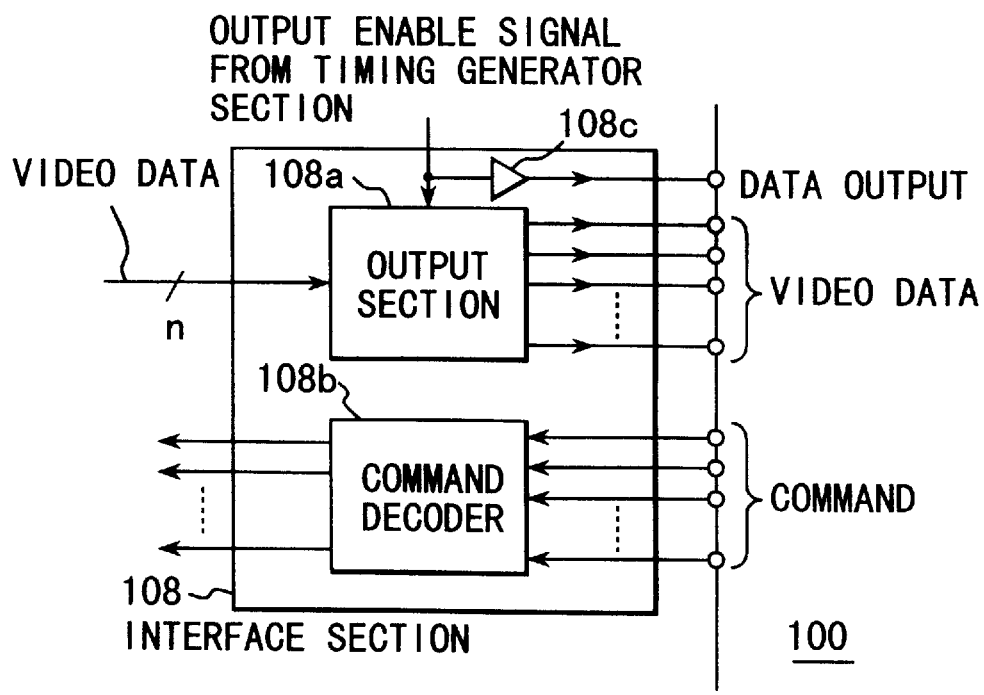
FIG. 45 is a block diagram showing another interface section of a solid state image sensor.
Figure 46:
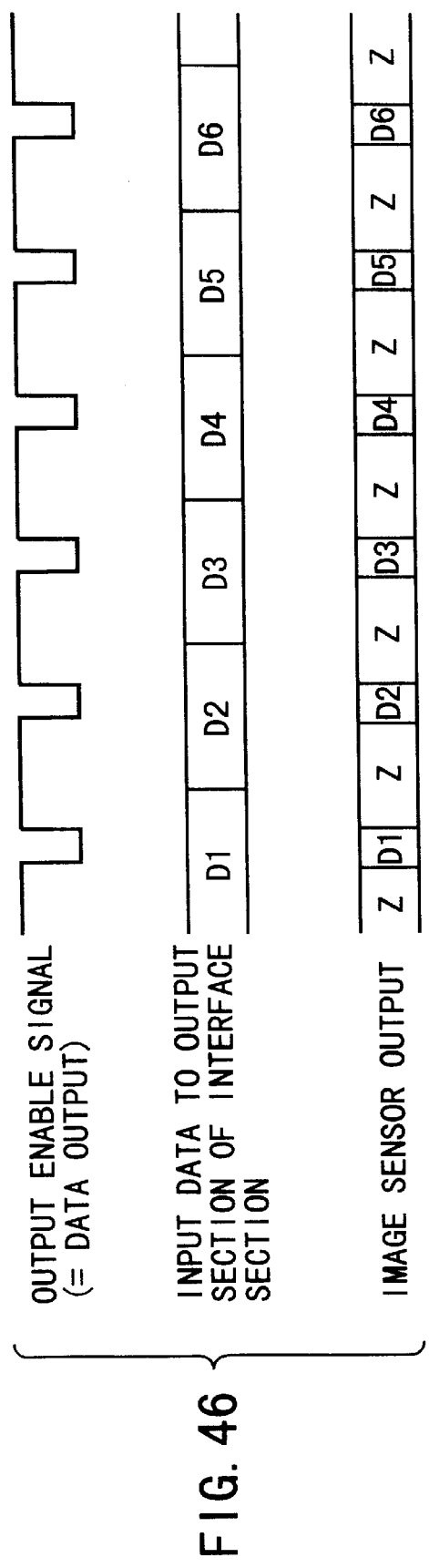
FIG. 46 is a timing chart of signals in the interface section in FIG. 45.

FIG. 45 shows a structure in which an output enable signal is output to the output terminal of the image sensor 100 through a buffer 108c. With this structure, the circuit on the next stage, which receives video data from the image sensor 100, has a simple structure because the output data reception timing is clear. FIG. 46 shows the data output timing of the image sensor in this case.

Figure 47:
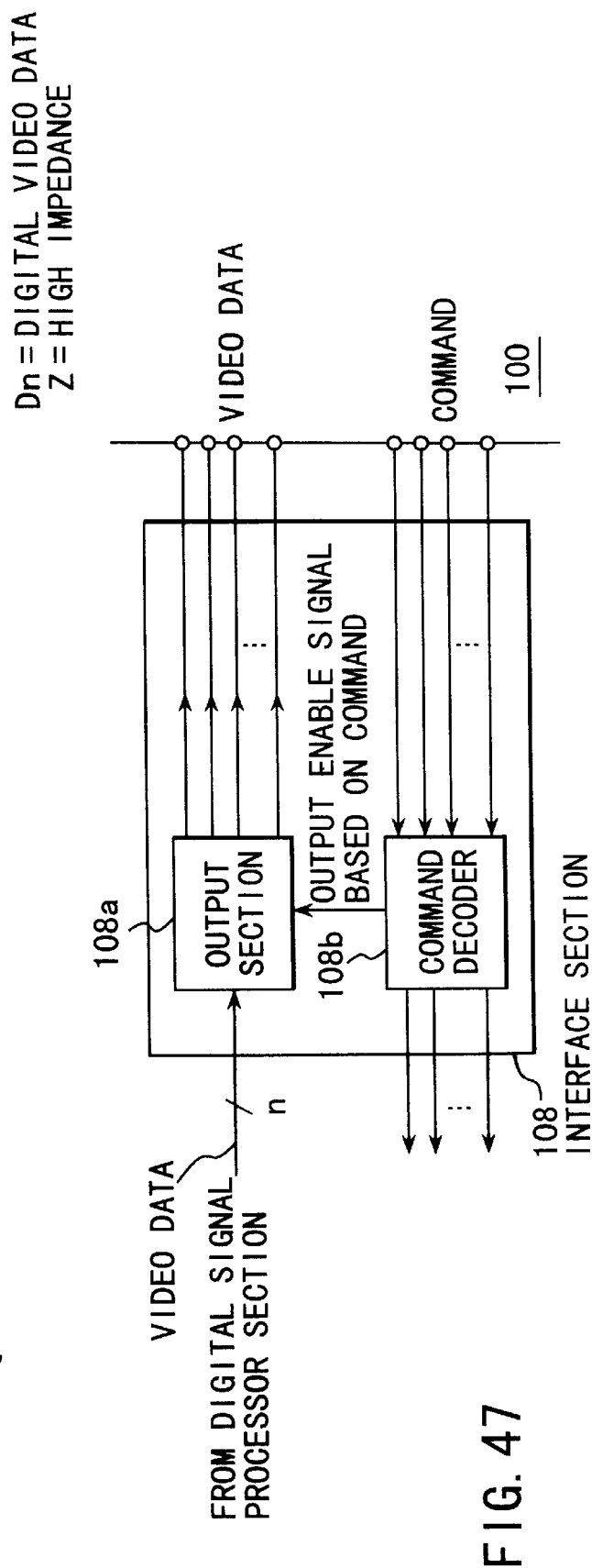
FIG. 47 is a block diagram showing still another interface section of a solid state image sensor.

Alternatively, the image sensor may have a temporary storage function so that video data can be output in accordance with a data request from the system side. FIG. 47 shows a structure in which the command decoder 108b supplies an output enable signal to the output section 108a in accordance with an external command, and the output section 108a outputs video data upon reception of an enable signal from the command decoder 108b.

Figure 48:
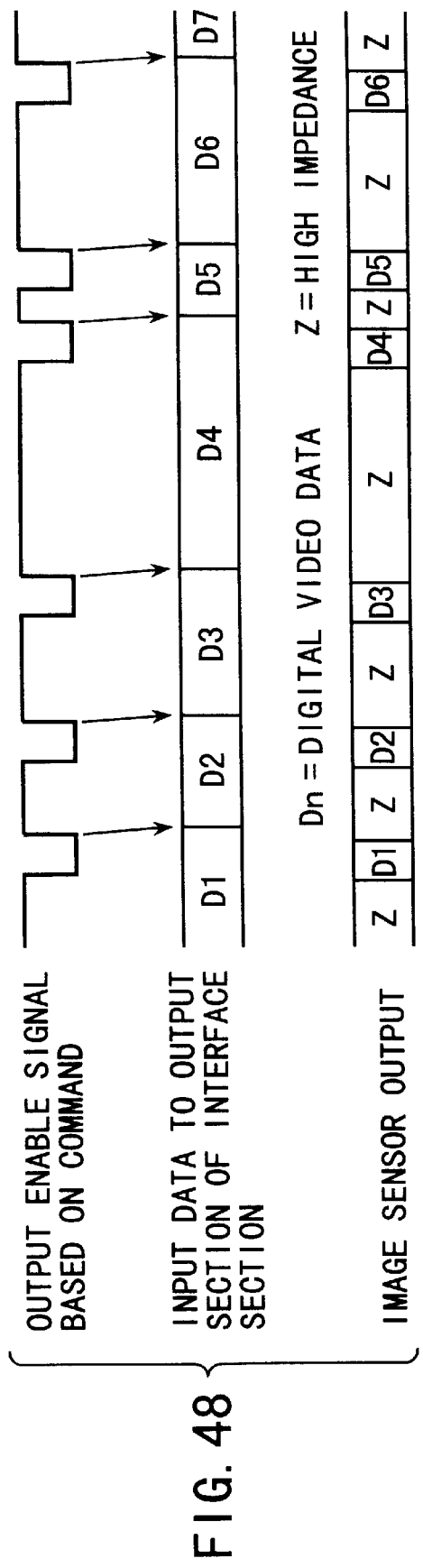
FIG. 48 is a timing chart of signals in the interface section in FIG. 47.

In the case shown in FIG. 47, data is output in accordance with an output enable signal based on a command. FIG. 48 shows the operation timing of this structure. In this case, since the system can read out data without any consideration for the timing on the image sensor side, the circuit structure following the image sensor can be simplified.

Figure 49:
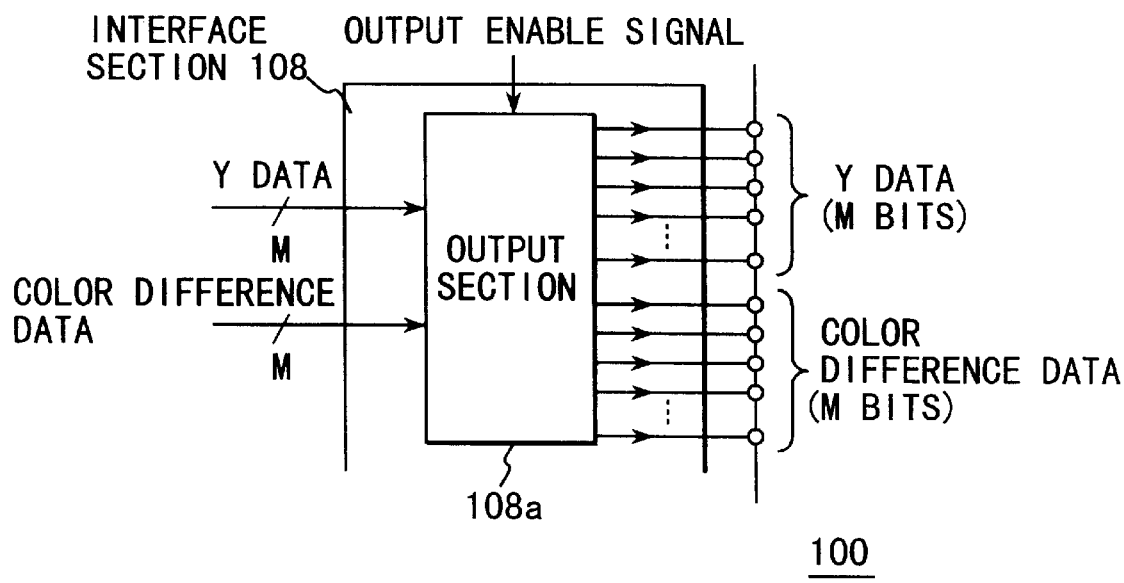
FIG. 49 is a block diagram showing still another interface section of a solid state image sensor.

Still another embodiment will be described below with reference to FIGS. 49 and 50.

Assume that an image sensor 100 reads data in units of pixels. In this case, the image sensor may use either a scheme of reading out one pixel of video data by one read operation, and a scheme of reading out one pixel by a plurality of read operations. In the former scheme, for example, an output section 108a has read data pins for luminance signals independently of read data pins for color signals to read out and output luminance signals and color signals independently of each other, as shown in FIG. 49.

Figure 51:
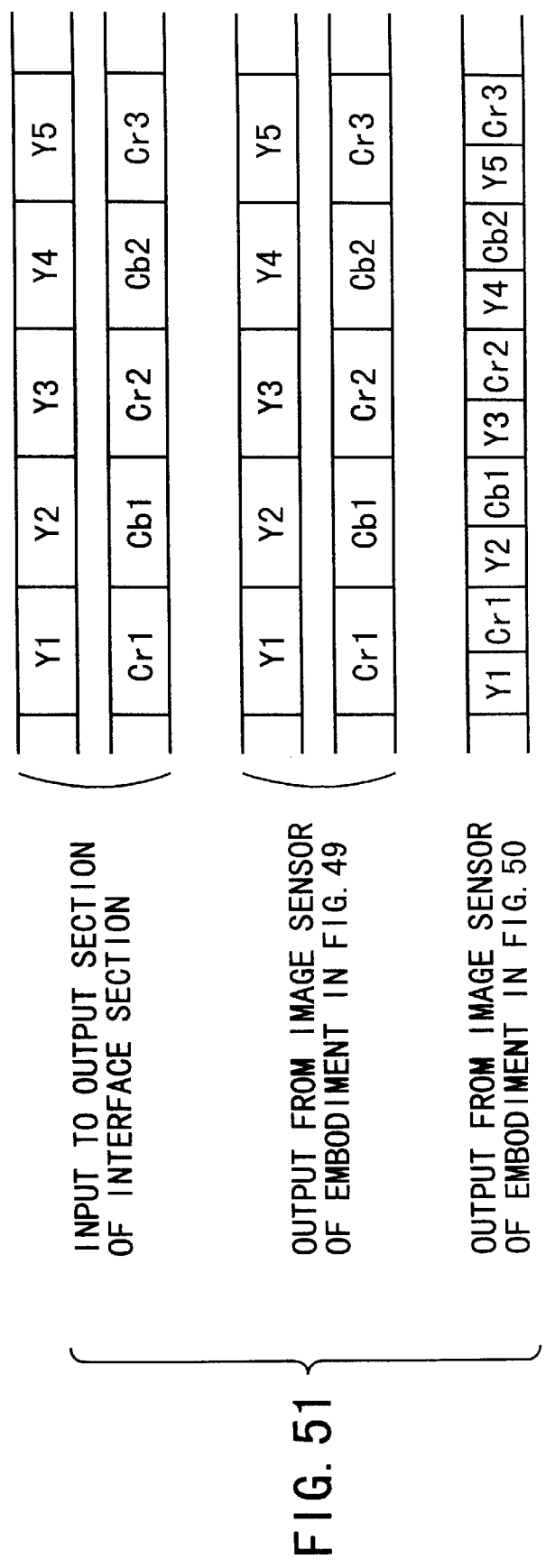
FIG. 51 is a timing chart of signals in the interface sections in FIGS. 49 and 50.
Figure 50:
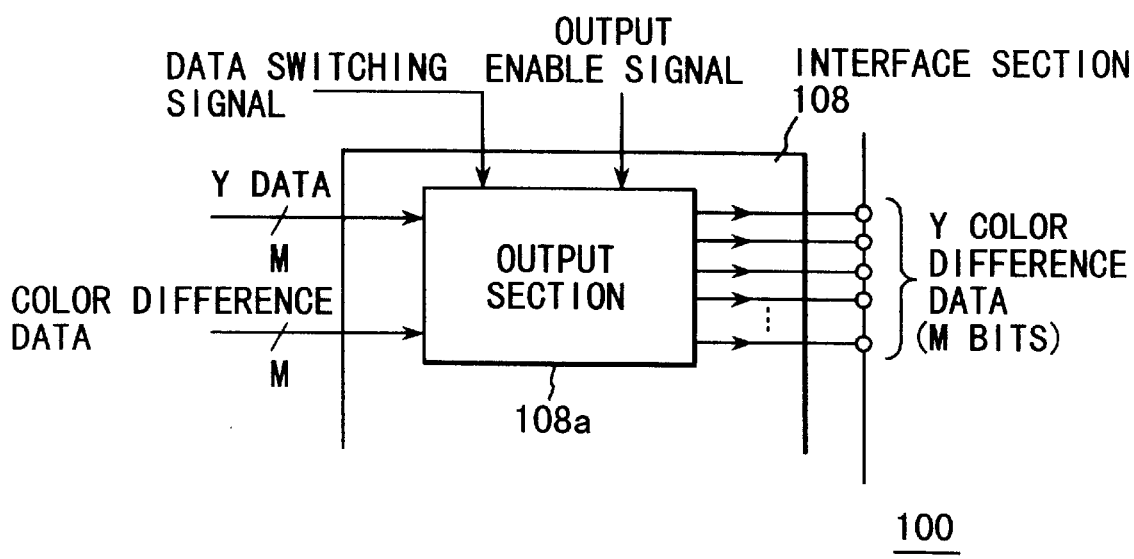
FIG. 50 is a block diagram showing still another interface section of a solid state image sensor.

In the latter scheme, the output section 108a alternately reads out luminance signals and color signals in units of pixels, as shown in FIG. 50. FIG. 51 shows the timing in this case.

The data bits of one pixel can be read out by a plurality of read operations.

Figure 52:
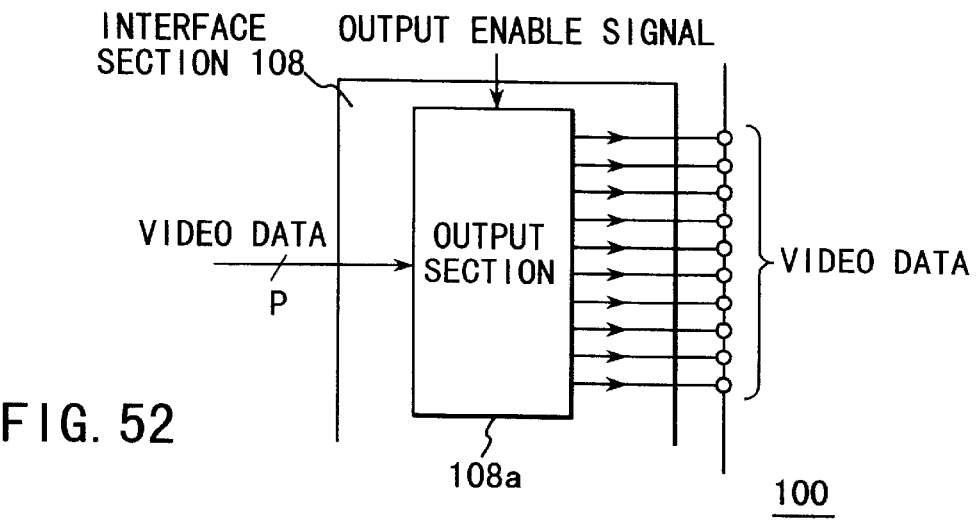
FIG. 52 is a block diagram showing still another interface section of a solid state image sensor.
Figure 53:
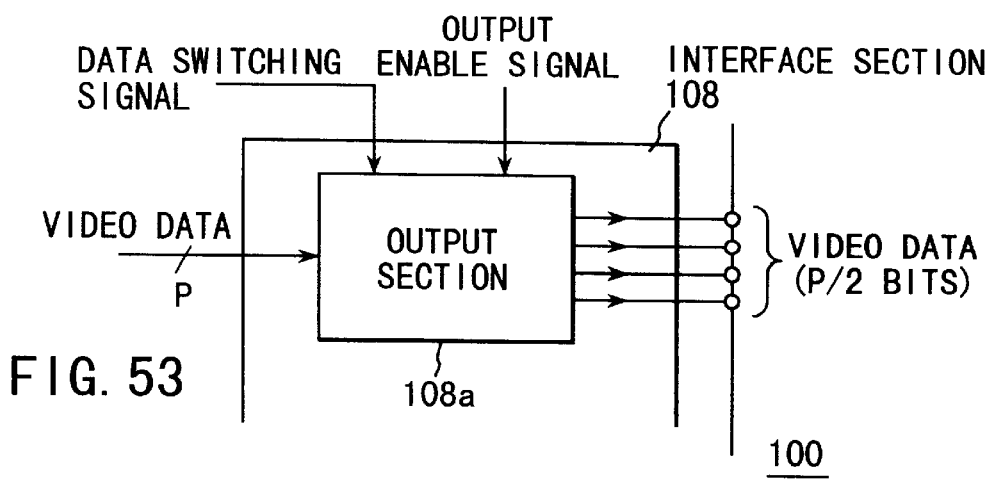
FIG. 53 is a block diagram showing still another interface section of a solid state image sensor.

Assume that the video data with a resolution of p bits is to be read out through p signal lines, as shown in FIG. 52. In this case, the video data is divided into upper p/2 bits and lower p/2 bits to be read out by two read operations. With this operation, the number of data signal lines of the image sensor 100 can be halved, as shown in FIG. 53. FIG. 54 shows the timing of this read operation.

In the above read operation, if bits having larger influences on the circuit on the subsequent stage are preferentially output, the circuit on the subsequent stage can be simplified. For example, such bits include the MSB (Most Significant Bit). As is apparent, when p bits are to be read out by q read operations, the number of signal lines can be reduced to p/q.

Still another embodiment will be described below with reference to FIG. 55.

In this embodiment, an image sensor 100 incorporates a circuit for calculating the motion vector. In this case, an output section 108a has input and output terminals respectively used for video data and motion vector data so that motion vector data can be output from the image sensor through signal lines independently of video data.

Figure 55:
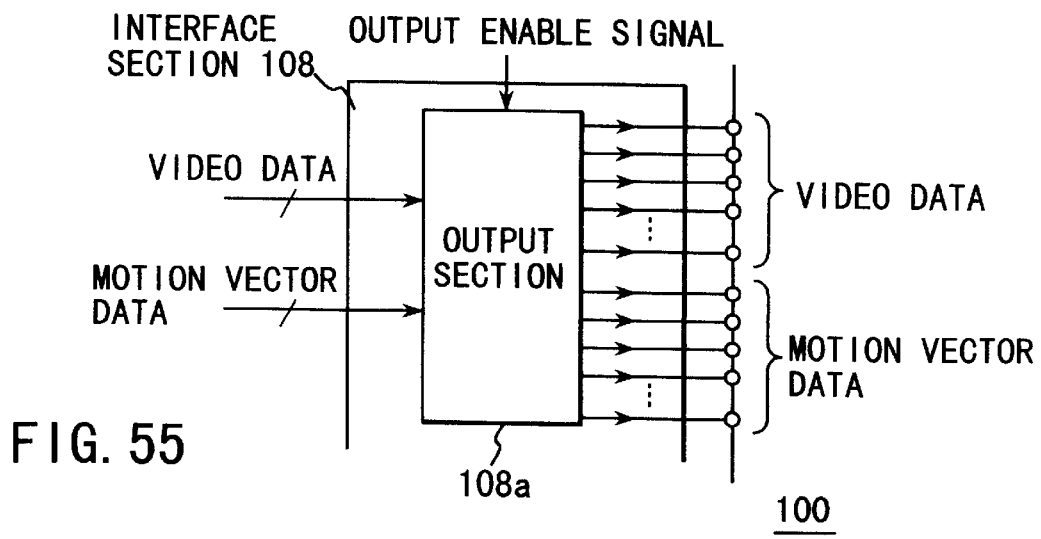
FIG. 55 is a block diagram showing still another interface section of a solid state image sensor.

The image sensor of the embodiment shown in FIG. 55 operates in accordance with the output timing in FIG. 56. More specifically, motion vector data are output in units of blocks in synchronism with the video data of the corresponding blocks. As these motion vector data, for example, motion vector data complying with H. 261, H. 263, MPEG 1, MPEG 2, or MPEG 4 are output.

Figure 57:
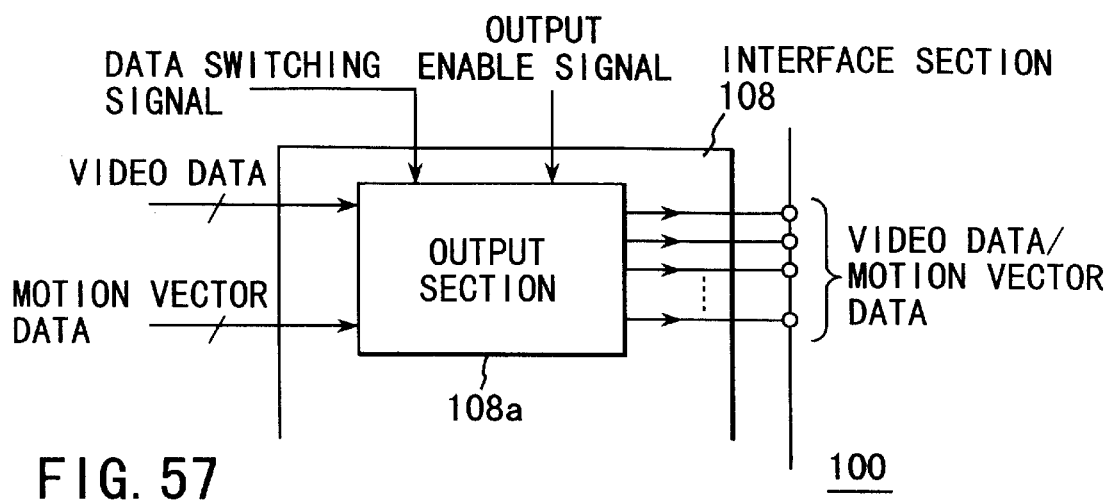
FIG. 57 is a block diagram showing still another interface section of a solid state image sensor.

FIG. 57 shows a case in which video data and motion vector data are output through common signal lines. With the use of the common signal lines, the number of signal lines of an image sensor can be decreased. More specifically, video data and motion vector data can be input to an output section 108a of an interface section 108, and these data can be output to the output lines in accordance with data switching signals. Since the data are switched in accordance with such a data switching signal, two types of signals can be output through the common signal lines.

Figure 58:
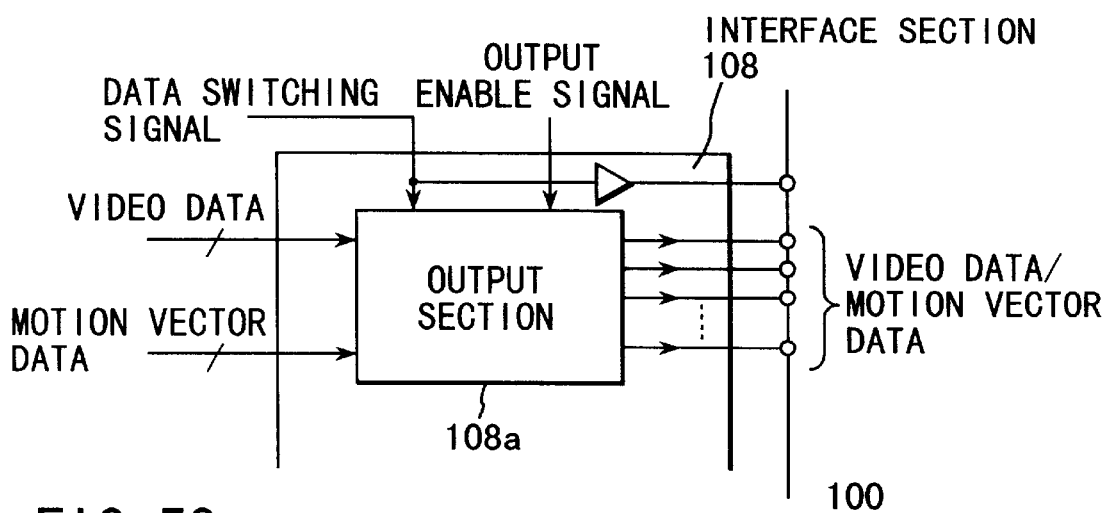
FIG. 58 is a block diagram showing still another interface section of a solid state image sensor.
Figure 59:
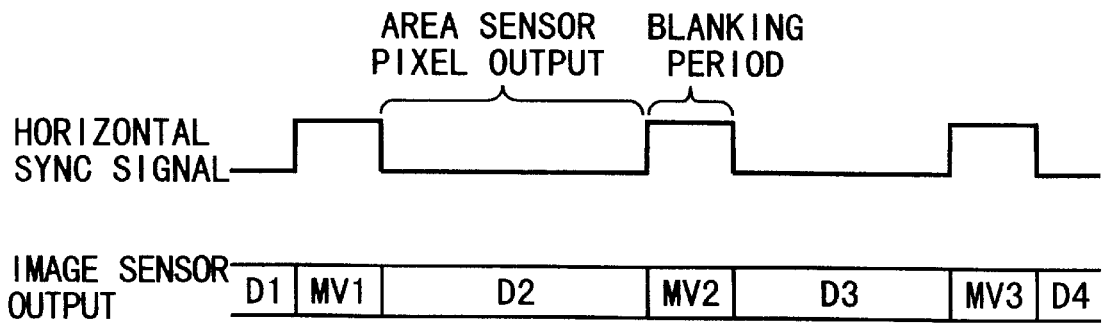
FIG. 59 is a timing chart of signals in the interface section in FIG. 57 or 58.
Figure 60:
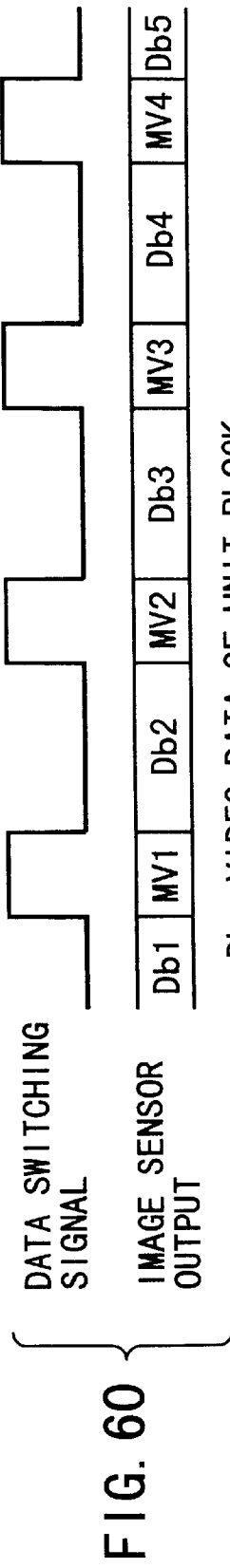
FIG. 60 is another timing chart of signals in the interface section in FIGS. 57 or 58.

FIG. 58 shows an embodiment in which the function of outputting a signal to a discrimination line is added to the embodiment shown in FIG. 57. According to this embodiment, a data switching signal is extracted from an interface section 108 through a buffer, and this signal is supplied to a terminal of an image sensor 100, thereby realizing the same function as that of the above embodiment. FIGS. 59 and 60 show the operation timings in this embodiment. FIG. 59 shows the timing at which video data and motion vector data are switched in accordance with a sync signal. In this case, video data is output in a non-blanking period in synchronism with a horizontal sync signal, and the motion vector data of the video data is output in the succeeding blanking period.

FIG. 60 shows the timing at which video data are output in units of blocks, and the motion vector data of the corresponding blocks are output after the respective video data such that they are output alternately. In the case shown in FIG. 58, the sync signal in FIG. 59 or the data switching signal in FIG. 60 may be output through the discrimination line.

In the structure in FIG. 57, an external data discrimination signal (not shown) must be used. In the cases shown in FIGS. 59 and 60, the motion vector data are respectively set after the corresponding video data. However, the motion vector data may be set before or in the corresponding video data.

Figure 61:
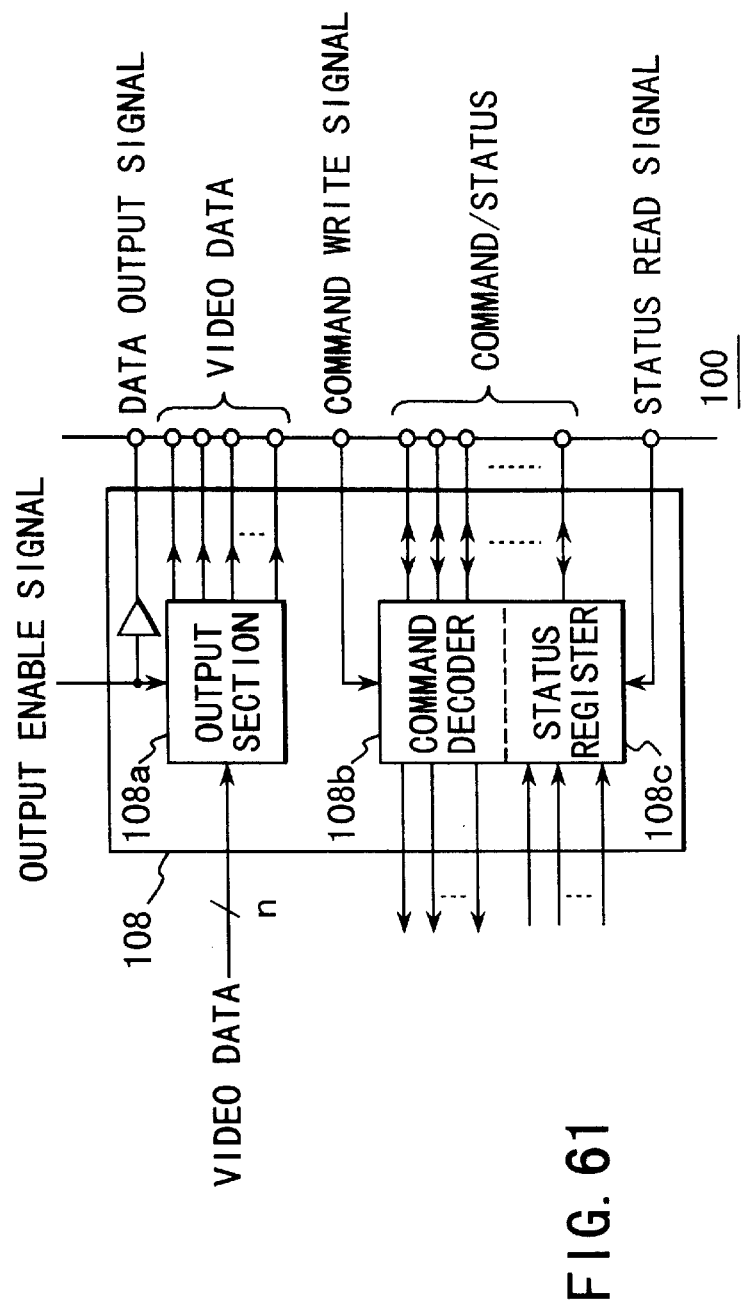
FIG. 61 is a block diagram showing still another interface section of a solid state image sensor.

In the embodiment shown in FIG. 61, command pins as command input terminals arranged on an image sensor 100 constitute an input/output system, and an interface section 108 in the image sensor 100 includes a command decoder 108b and a status register 108c. The contents of the status register 108c can be read out in accordance with a status read signal. Upon reception of an external status read signal, the interface section 108 reads out the stored data from the status register 108c. Data indicating the frame rate, the read order, the signal processing method set in the image sensor 100, the compression/non-compression mode, the number of output pixels, the output format, and the like which can be changed in accordance with commands are stored in the status register 108c. These data can be read out from the outside.

With this structure, the state of the image sensor 100 can be checked on the system side using the image sensor 100.

Figure 62:
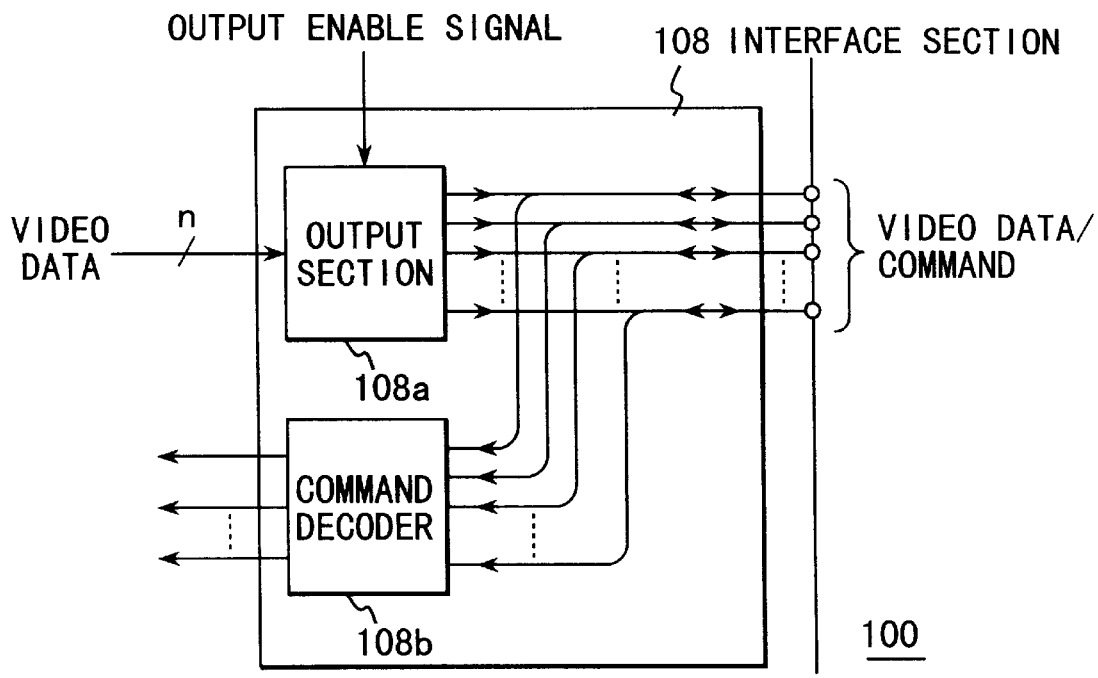
FIG. 62 is a block diagram showing still another interface section of a solid state image sensor.

FIG. 62 shows a case in which the same signal lines are used both as output video data signal lines and command signal lines in an interface section 108. With the use of these common lines, the number of signal lines of an image sensor 100 can be decreased, leading to a reduction in cost. For the use of such common lines, the signal lines serve as input/output lines.

Figure 63:
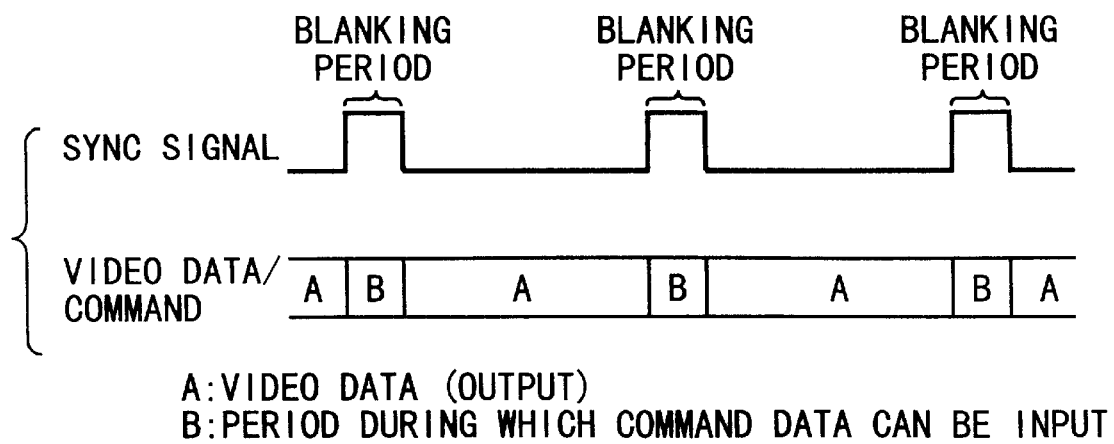
FIG. 63 is a timing chart of signals in the interface section in FIG. 62.

As a means for discriminating input/output of data, a means for writing command data in the image sensor at intervals of video data outputs may be used. For example, as indicated by the timing chart of FIG. 63, a command B can be input in a blanking period of a sync signal.

Figure 64:
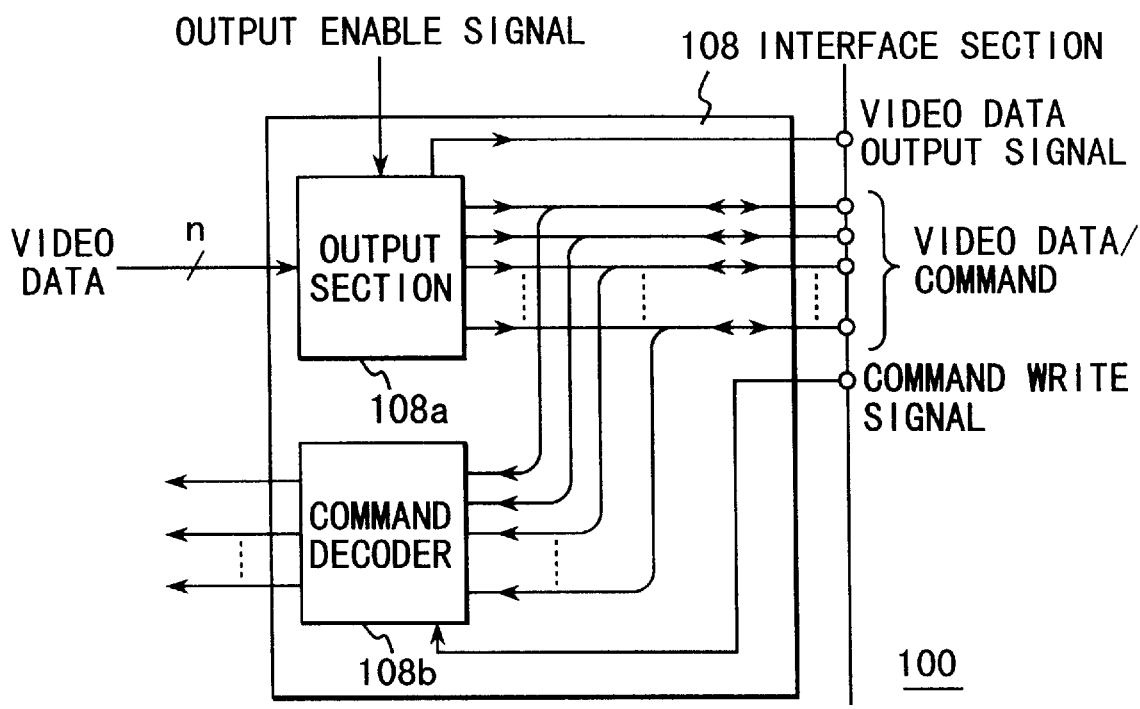
FIG. 64 is a block diagram showing still another interface section of a solid state image sensor.
Figure 65:
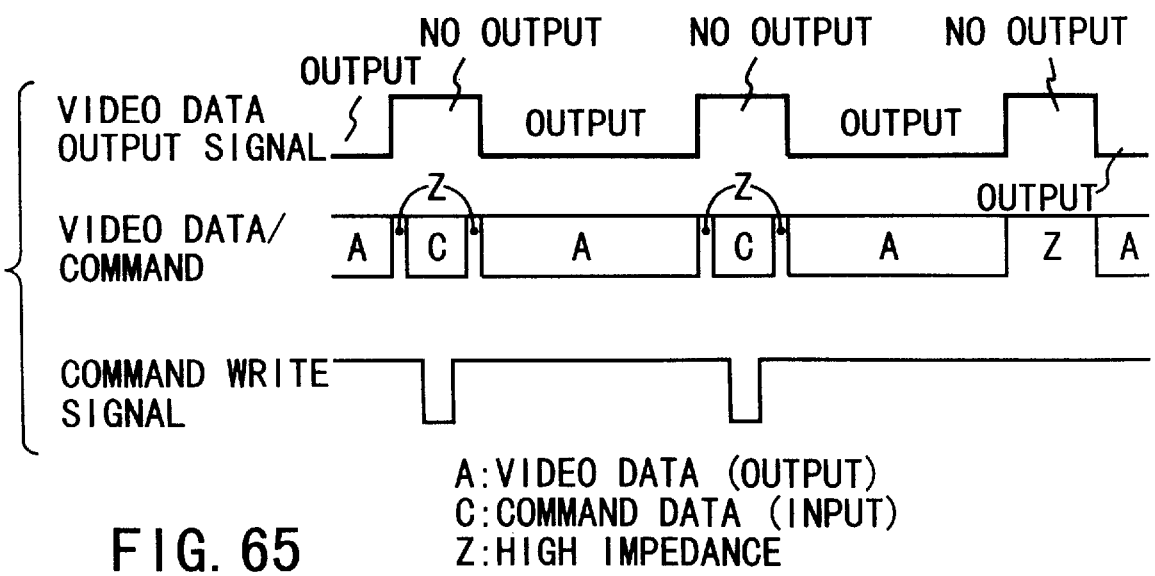
FIG. 65 is a timing chart of signals in the interface section in FIG. 64.

FIG. 64 shows an image sensor 100 having an interface section 108 to which a signal line for discriminating the output of data is added. FIG. 65 shows the operating timing of the image sensor 100. According to this embodiment, the image sensor 100 includes a command write signal terminal, and a command write signal is input from the command write signal terminal to a command decoder 108b of the interface section 108 incorporated in the image sensor 100. Upon reception of this command write signal, the command decoder 108b recognizes the input of the command. This structure is employed to reliably transfer a command input to the interface section 108 when the image sensor 100 is designed to output video data and input commands through common terminals.

According to this structure, while video data is output, a signal indicating the output state is output from the image sensor 100. While no video data is output, command data can be written in the image sensor 100. That is, a system using the image sensor 100 checks a signal indicating the output state, and writes a command in the image sensor 100 while no video data is output.

Figure 66:
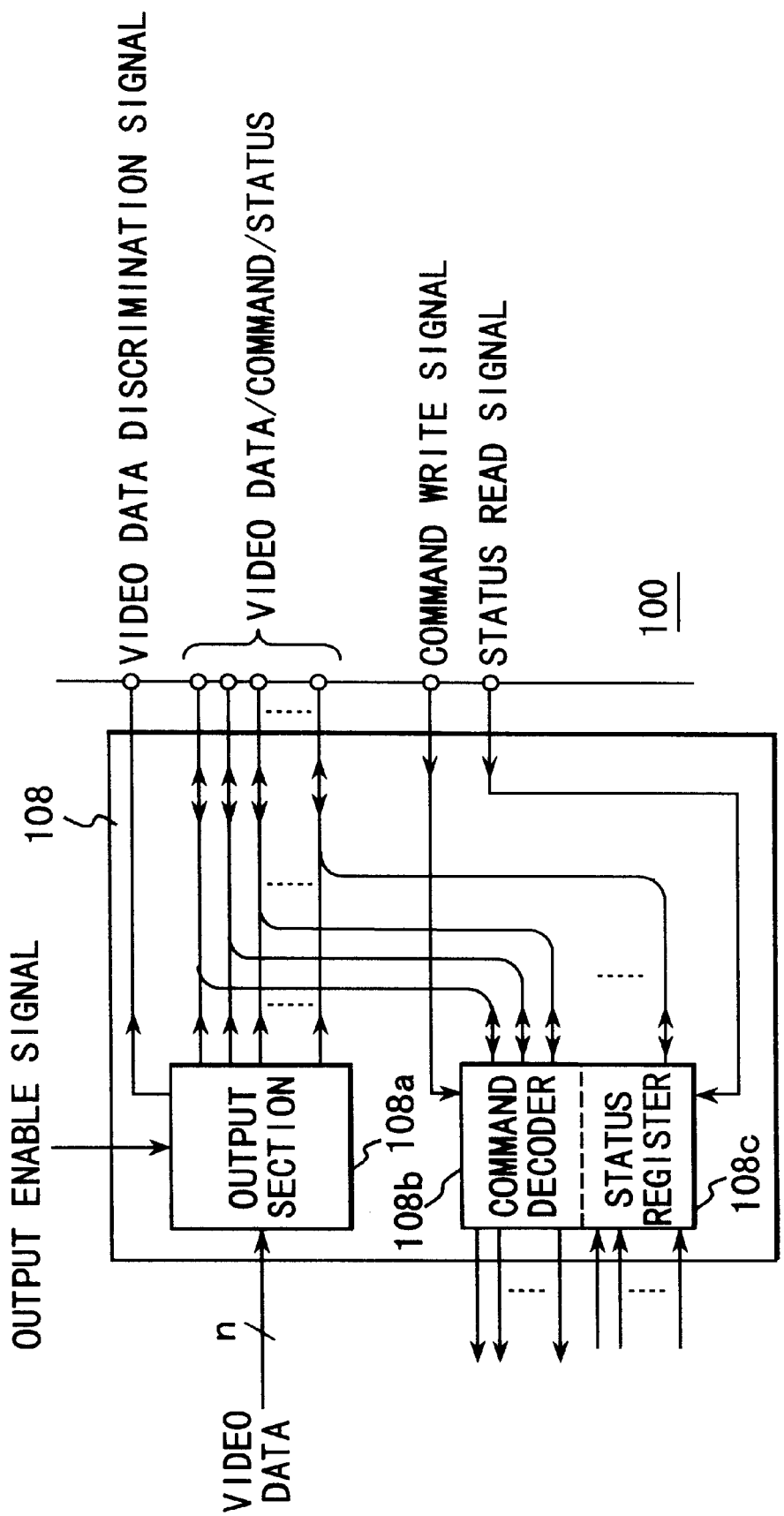
FIG. 66 is a block diagram showing still another interface section of a solid state image sensor.

FIG. 66 shows an image sensor 100 using the same signal lines as video data, command, and status signal lines. An interface section 108 has a status register 108c. The image sensor 100 has a status read signal terminal, to which a status read signal is input. The status read signal is input to the status register 108c. Upon reception of this signal, the status register 108c outputs held status information to the outside.

Figure 67:
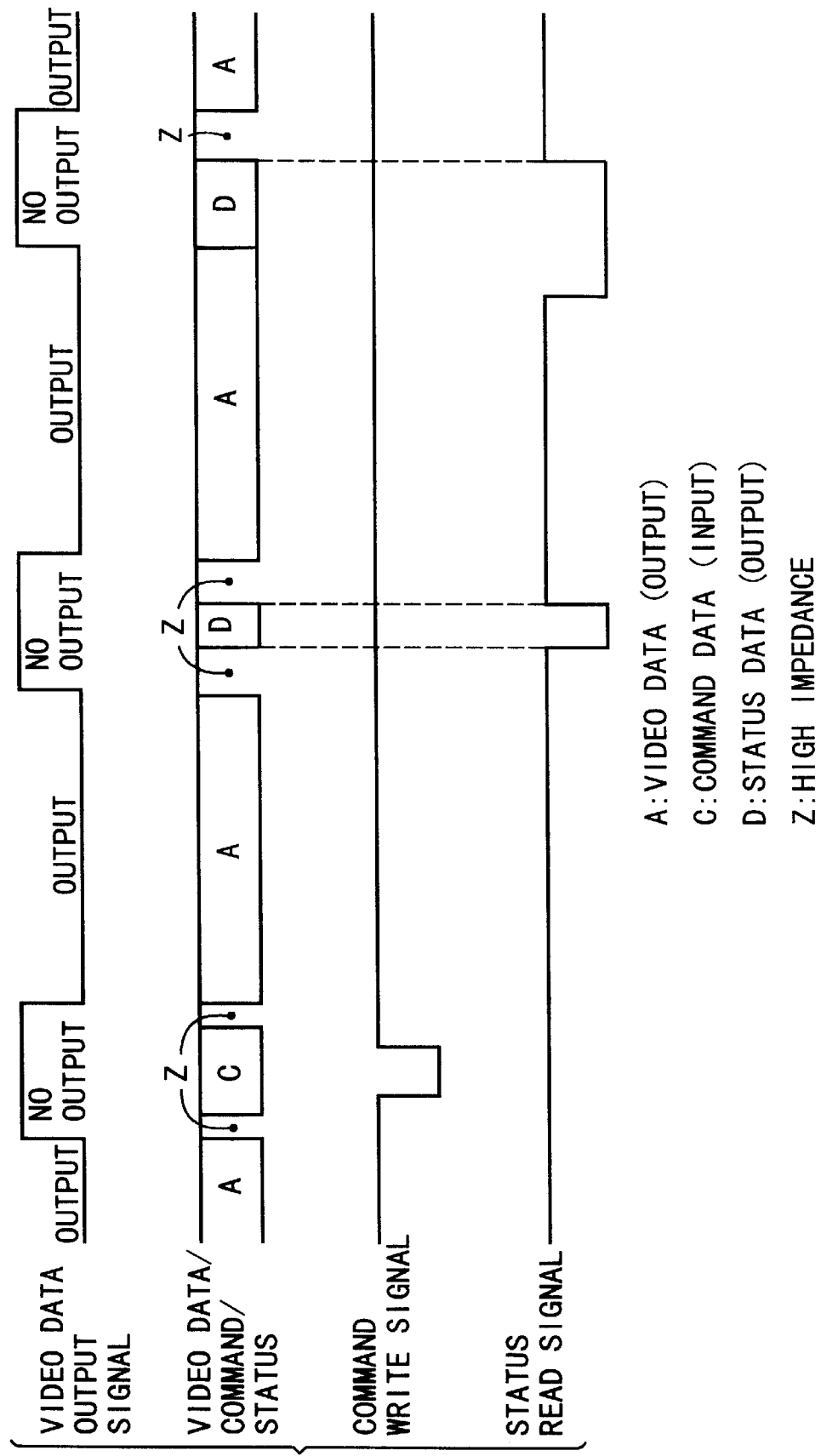
FIG. 67 is a timing chart of signals in the interface section in FIG. 66.

The image sensor 100 in FIG. 66 has a data discrimination line for indicating whether video data is being output, a command write signal line, and a status read signal line. With this structure, the image sensor 100 can write command data as well as video data and read status data through the common lines. FIG. 67 shows the operation timing in this case. As indicated by this timing, command data can be written or status data can be read out in an interval in which no video data is output, but a command write request and a status data readout request are canceled while video data is being output.

Figure 68:
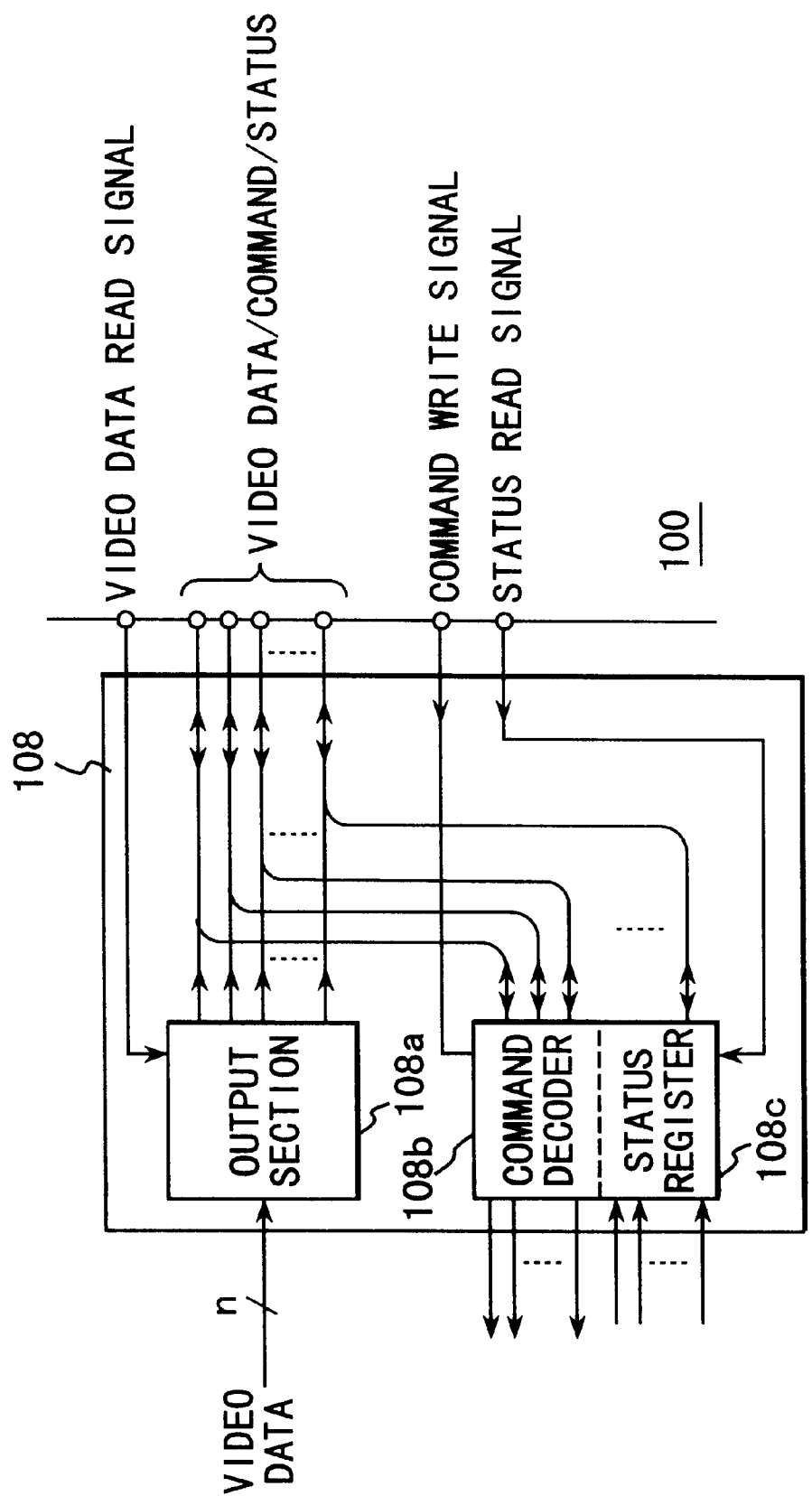
FIG. 68 is a block diagram showing still another interface section of a solid state image sensor.
Figure 69:
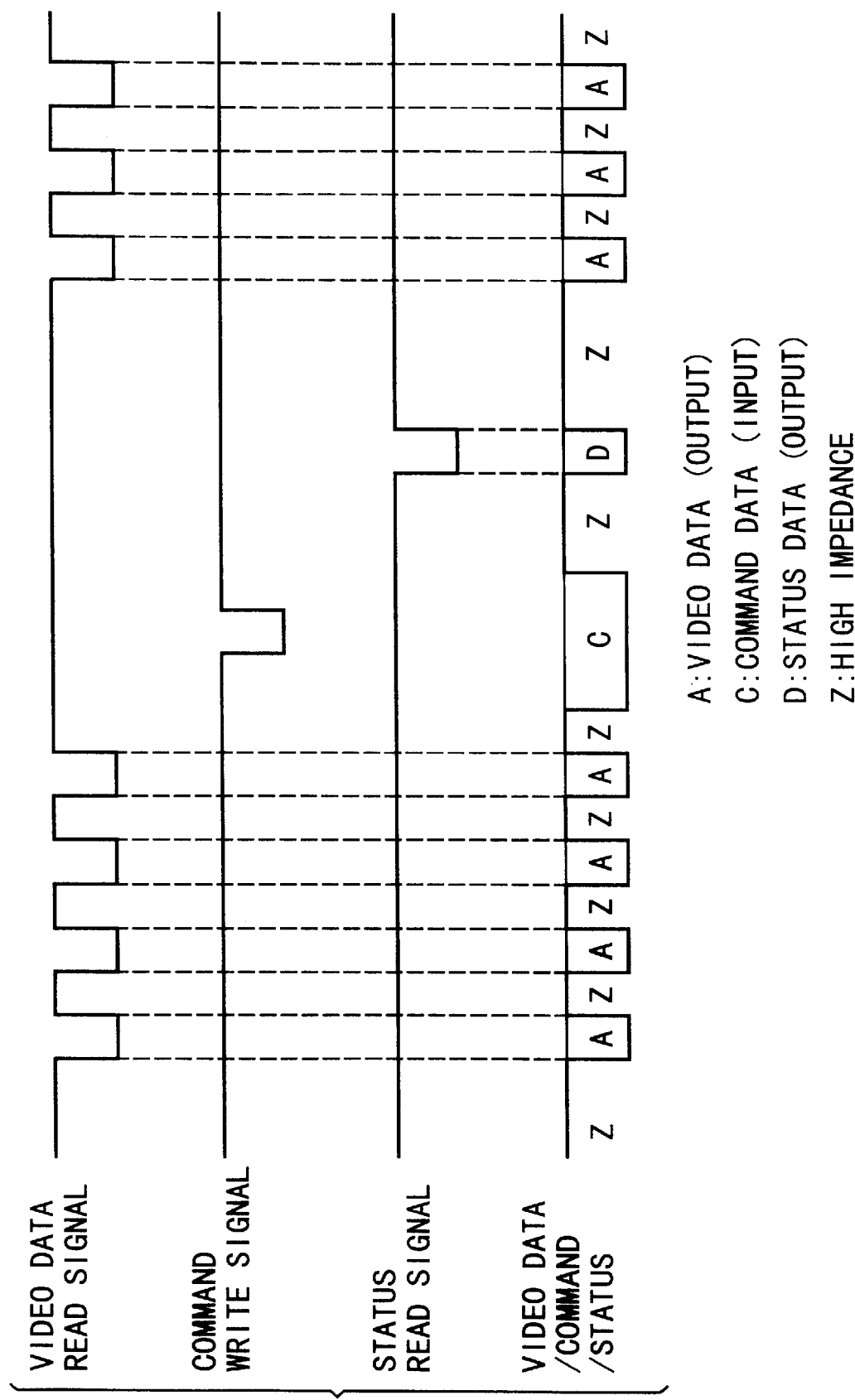
FIG. 69 is a timing chart of signals in the interface section in FIG. 68.

FIG. 68 shows an image sensor which allows video data read, command write, and status data read on the system side outside the image sensor 100. When a storage function is implemented in the image sensor 100, as described above, video data can be read out at an arbitrary time on the system side without any consideration for the operation timing of the image sensor 100. FIG. 69 shows the operation timing in this case. The data output of the image sensor is set at a high impedance in intervals other than the intervals in which data write and read requests are output. This structure is suited to a scheme of making accesses from a computer to the image sensor 100.

Figure 70:
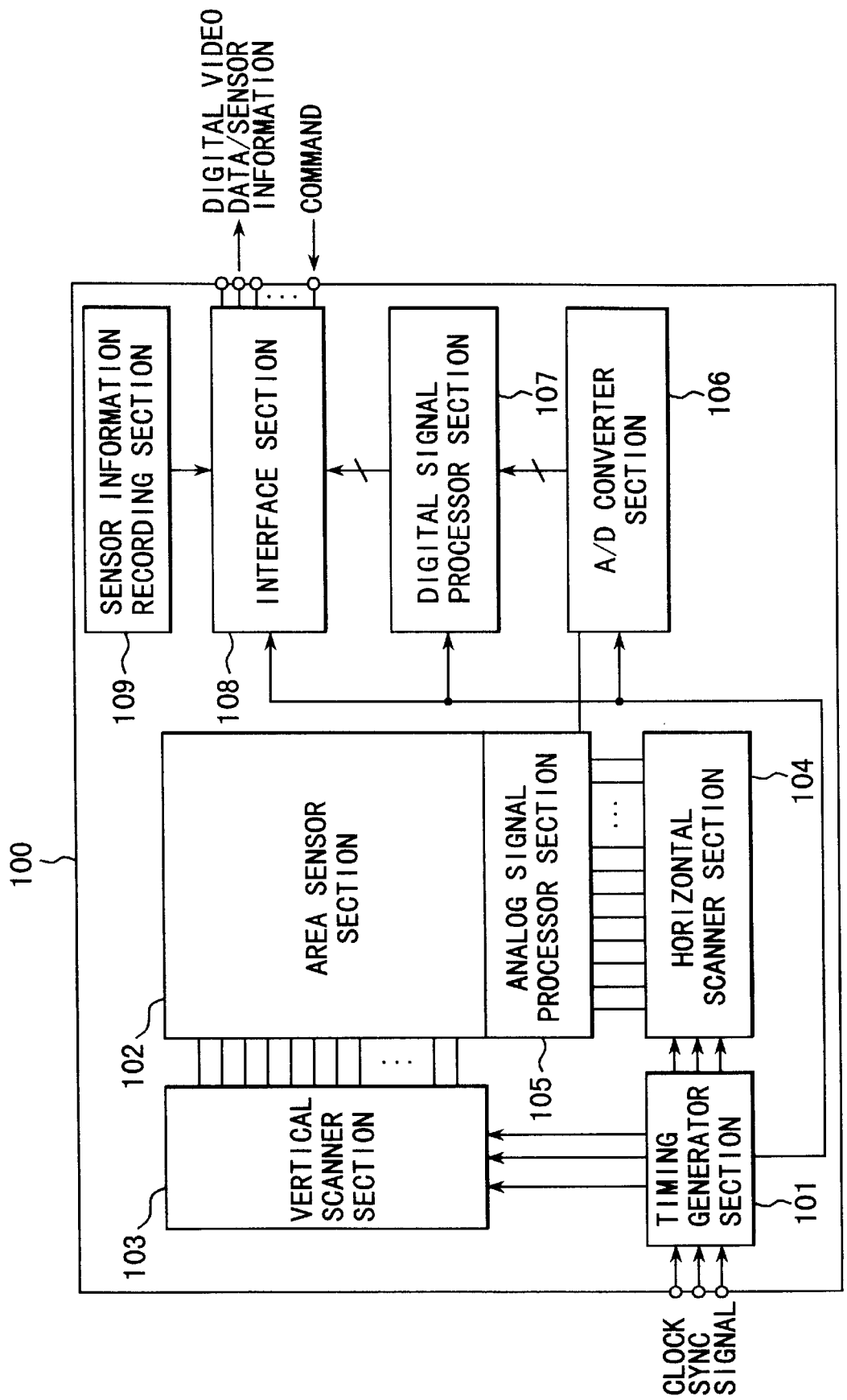
FIG. 70 is a block diagram showing a solid state image sensor according to another embodiment of the present invention.

FIG. 70 shows an image sensor 100 which incorporates a sensor information recording section 109 in which the characteristics and specifications of the image sensor itself are stored. These data can be read out from the section 109 through an interface section 108 from the outside of the image sensor 100. For example, the characteristics and specifications include the number of pixels of the image sensor 100, the aspect ratio of a pixel, the color filter arrangement, the signal processing method, the output data format, and the number of frames per second. The system can set the image sensor 100 and process output data on the basis of these pieces of information.

In the above embodiment, the image sensor having the basic structure shown in FIG. 1 has been described. However, the present invention can be applied to an image sensor 100 without an A/D converter section and a digital signal processor section 107. FIG. 71 shows the structure of this image sensor 100. According to this structure, a video signal is output as an analog signal, and the image sensor has digital input terminals for receiving commands.

Figure 72:
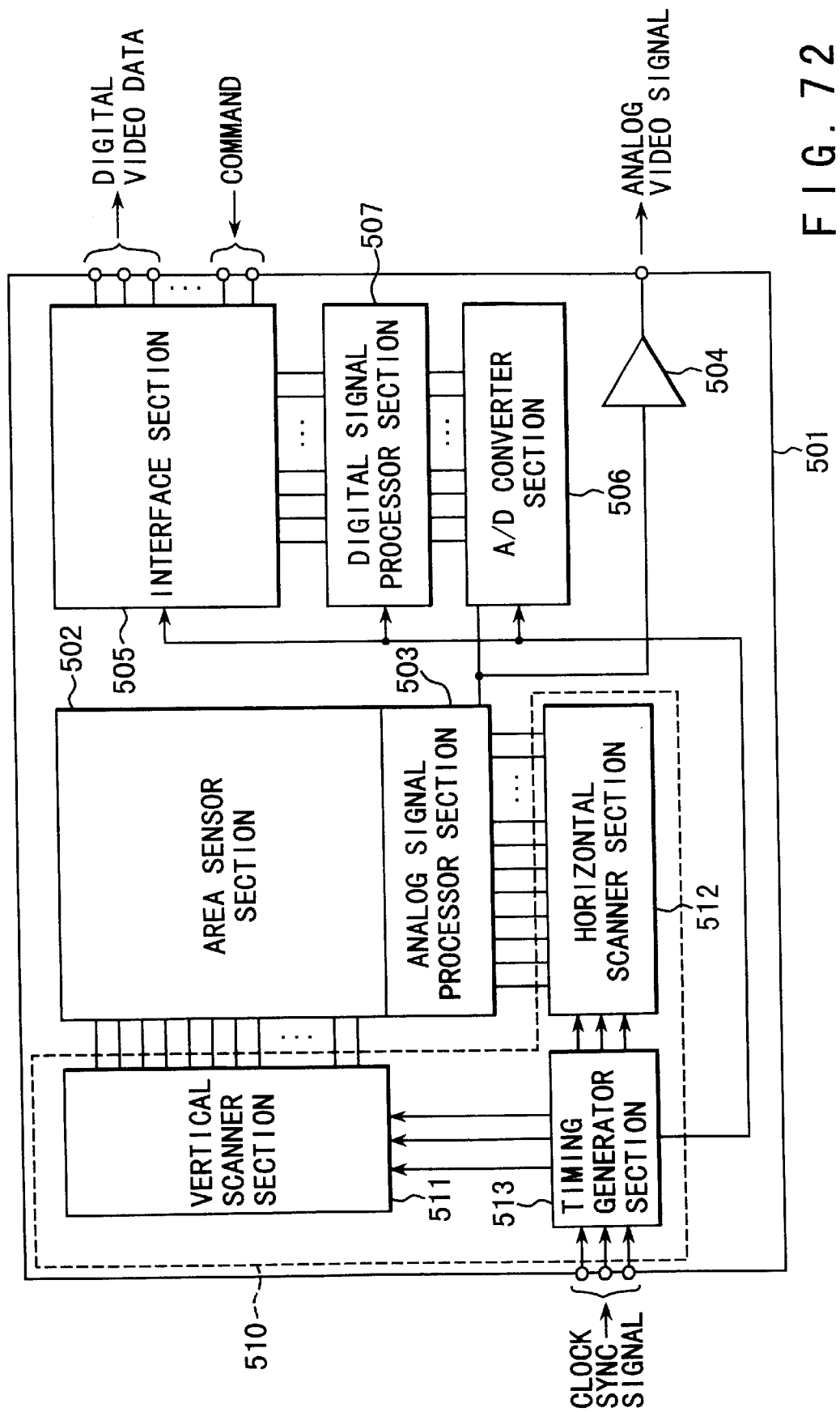
FIG. 72 is a block diagram showing a solid state image sensor according to still another embodiment of the present invention.

FIG. 72 shows an embodiment for outputting an analog video signal to an image sensor shown in FIG. 1, which is capable of applying to any of the above embodiments. The analog video signal is processed by an analog signal processor section and outputted to an external circuit via an output amplifier.

An example of control including switching of the image sensor output signal formats in accordance with a command will be described referring to the solid state image sensor of FIG. 72.

Figure 73:
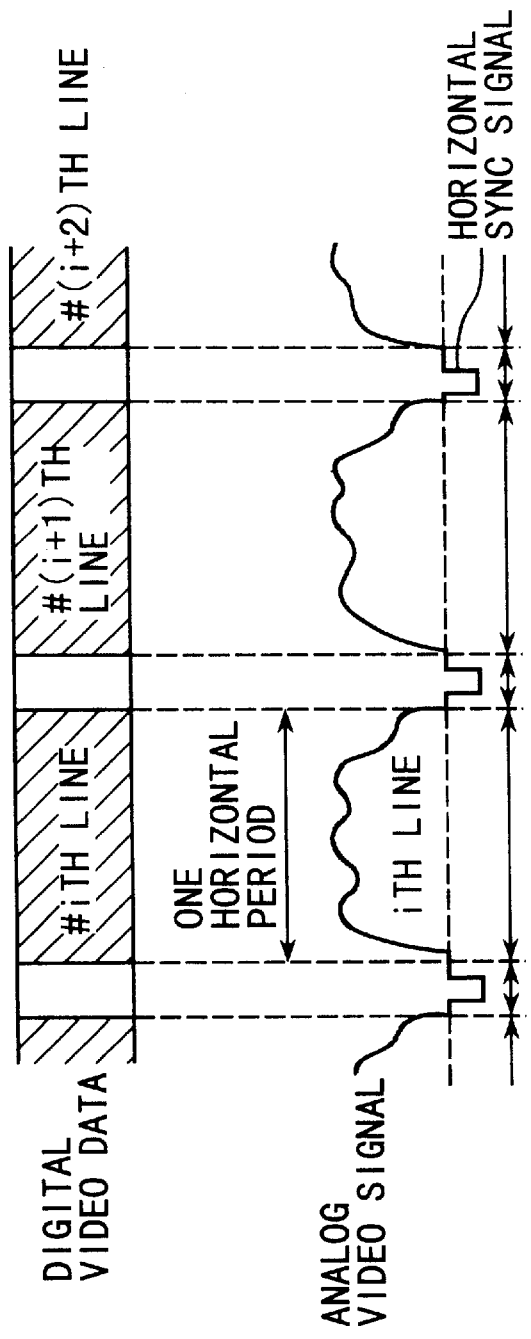
FIG. 73 is a timing chart for explaining a signal output in horizontal synchronization periods in the solid state image sensor according to still another embodiment of the present invention.

The output modes of this solid state image sensor include a blanking waveform mode having blanking portions and a non-blanking waveform mode having no blanking portion. These waveform modes can be switched in accordance with a command. FIG. 73 shows the mode having blanking portions. The waveform shown on the lower side in FIG. 73 is the analog video signal output from the output amplifier 504. The upper side in FIG. 73 indicates the digital video data output from the interface section 505. The above signal and data are plotted along the same time axis.

Figure 74:
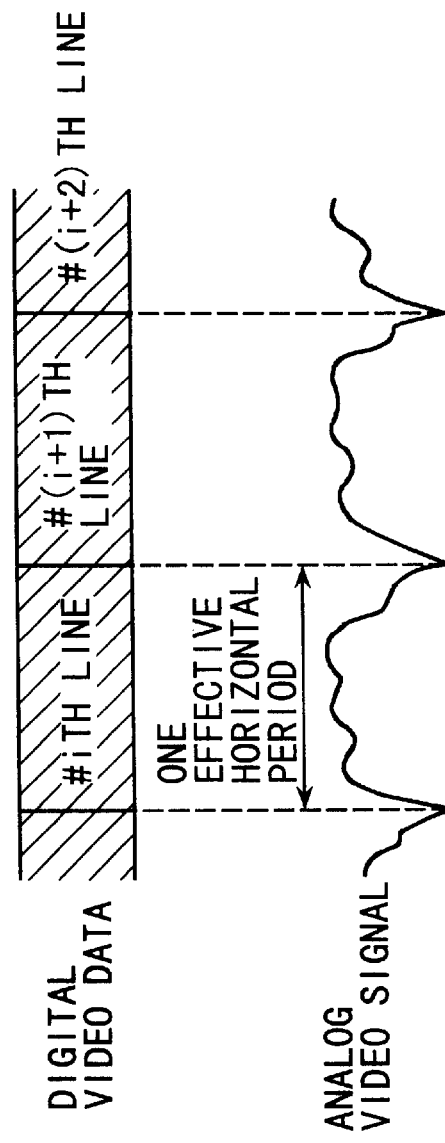
FIG. 74 is a timing chart for explaining a signal output when the signal output of the solid state image sensor in FIG. 73 is changed in accordance with a command.

In general, blanking portions are required as flyback periods for a scanning beam to output a video signal to a monitor. In addition, when an image is to be captured into a personal computer (to be referred to as a PC hereinafter) through a video capture board with analog input specifications, the input signal must comply with a video signal determined by the capture board. A signal having blanking portions is generally used as such a signal. When, however, the input signal is to be directly input as digital data to the PC, the input signal need not always have blanking periods in which no effective video data are present. In this case, therefore, time can be saved by omitting these blanking periods, leading to an increase in processing speed in subsequent processing. FIG. 74 shows the format of digital video data corresponding to the waveform obtained by omitting the blanking periods from the waveform shown in FIG. 73.

If a signal having blanking periods and a signal having no blanking period can be switched, the waveforms/formats can be switched in accordance with a system using the image sensor, and no dedicated image sensors are required, resulting in a reduction in cost. Even if the image sensor is to be used in the fixed mode having no blanking period, a conventional measuring instrument for a waveform with blanking periods can be used in a shipment test on the image sensor.

Figure 75:
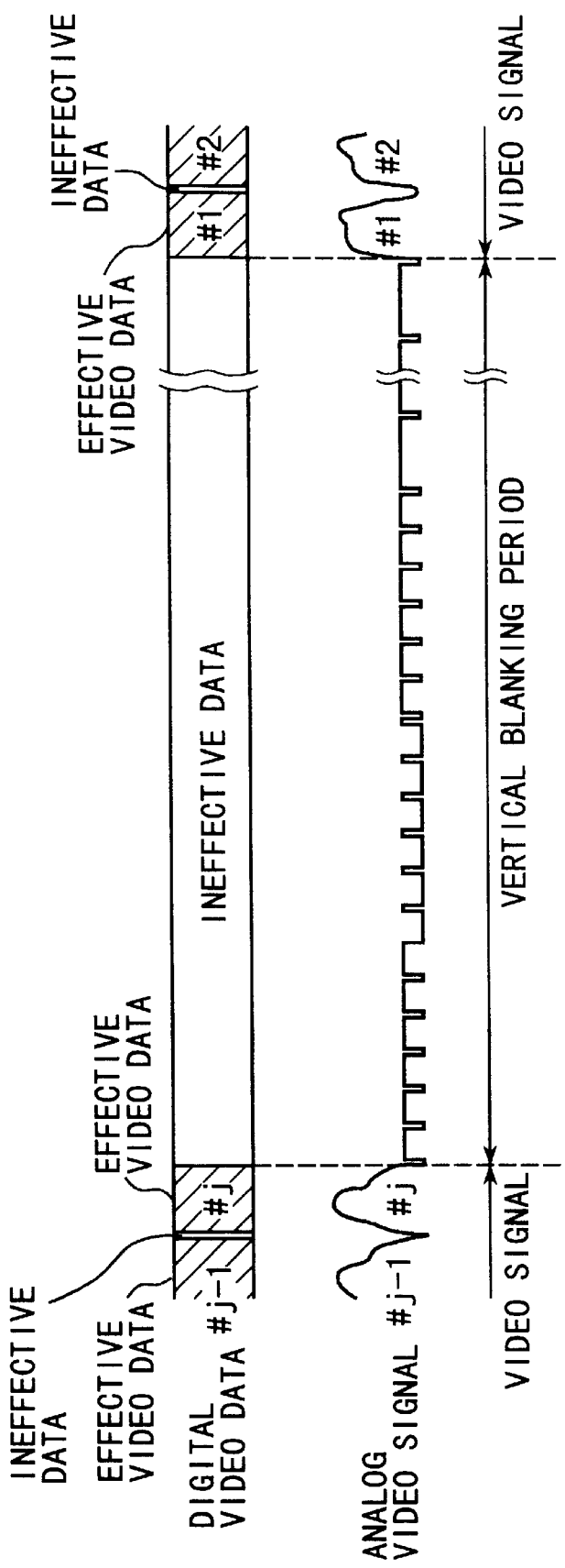
FIG. 75 is a timing chart for explaining a signal output in a vertical period in the solid state image sensor of the embodiment in FIG. 73.
Figure 76:
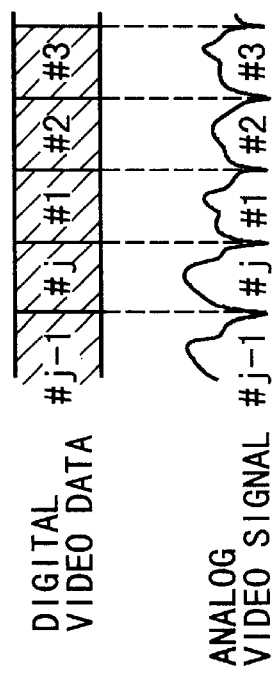
FIG. 76 is a timing chart for explaining a signal output when the signal output of the solid state image sensor in FIG. 75 is changed in accordance with a command.

FIGS. 75 and 76 respectively show vertical signal portions with and without blanking periods. The waveform on the lower side in FIG. 75 indicates the analog video signal output from the output amplifier 504. The upper side in FIG. 75 indicates the digital video data output from the interface section 505. The waveform on the lower side in FIG. 76 indicates the analog video signal having no vertical blanking portions. The upper side in FIG. 76 indicates the digital video data. To switch the blanking mode and the non-blanking mode, the image sensor may have a timing generator section 513, as shown in FIG. 77.

Figure 77:
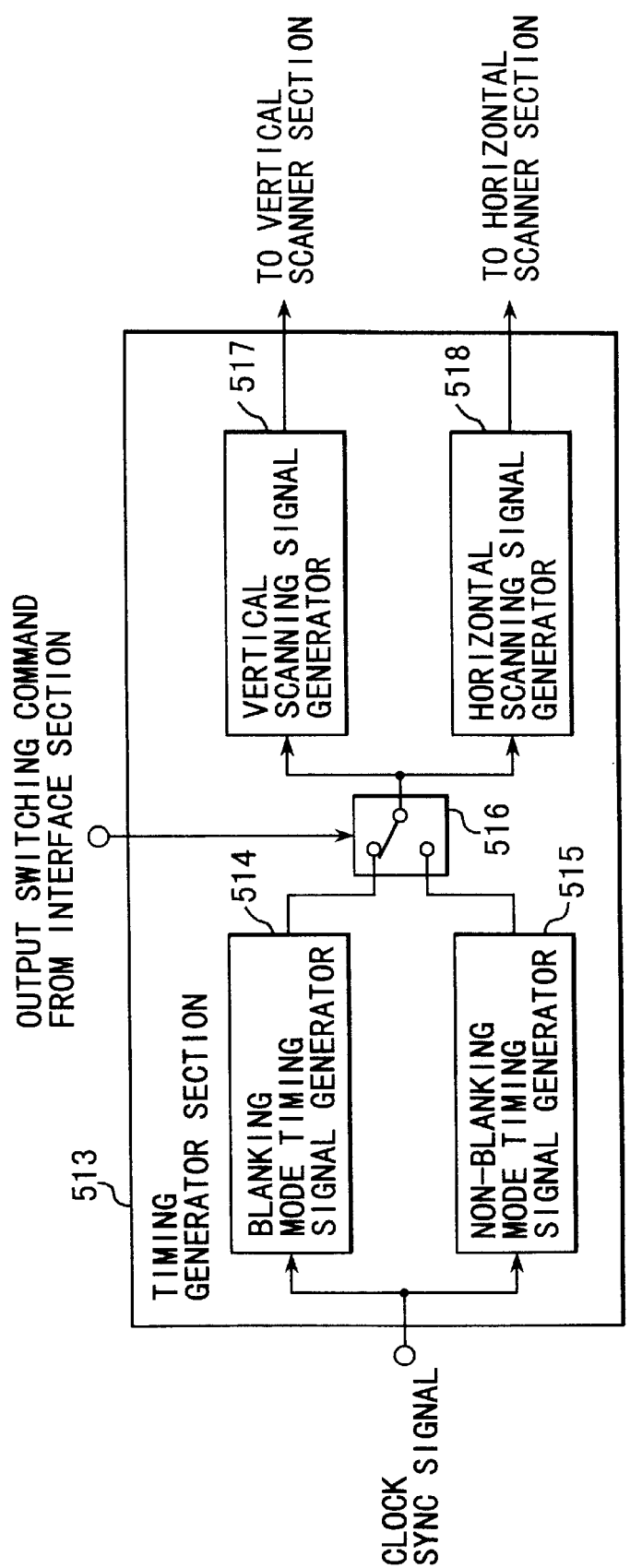
FIG. 77 is a block diagram showing a timing generator section for realizing a change by means of a command in the solid state image sensor of the embodiment in FIG. 73.

Referring to FIG. 77, the timing generator section 513 includes a blanking mode timing signal generator 514 for generating a blanking mode timing signal corresponding to the blanking mode on the basis of an input clock sync signal, a non-blanking mode timing signal generator 515 for generating a non-blanking mode timing signal corresponding to the non-blanking mode on the basis of an input clock signal, a switch 516 for switching the blanking mode timing signal and the non-blanking mode timing signal in accordance with a switching command from the interface section 505, a vertical scanning signal generator 517 for generating a vertical scanning signal in the set mode, and a horizontal scanning signal generator 518 for generating a horizontal scanning signal in the set mode. With this structure of the timing generator section 513, the mode of generating vertical and horizontal scanning signals in the blanking mode or the mode of generating vertical and horizontal scanning signals in the non-blanking mode can be selected. Note that the switching command from the interface section is the command supplied from the system using the image sensor to the image sensor. Alternatively, setting (H or L level) of a terminal of the image sensor may be used for this purpose.

Figure 78:
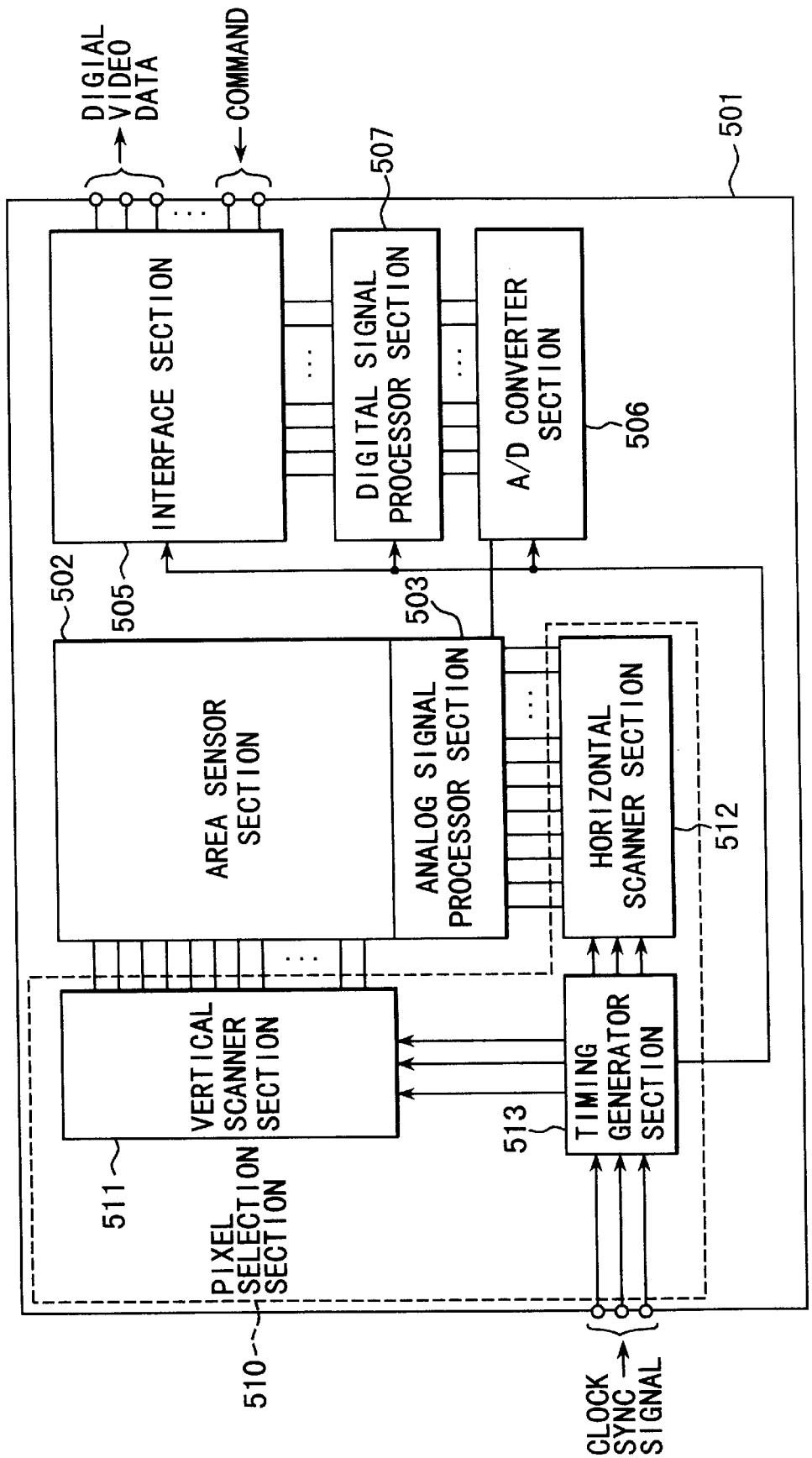
FIG. 78 is a block diagram showing another solid state image sensor associated with the embodiment in FIG. 73.

In the embodiment shown in FIGS. 73 to 77, the technique of setting the blanking mode and the non-blanking mode is applied to the image sensor in FIG. 72 which has both a digital output and an analog output. However, this technique is also effective for a sensor having either a digital output or an analog output. When only digital video data is output, the solid state image sensor shown in FIG. 78 is used. This image sensor has the same structure as that shown in FIG.

72 except that the output amplifier 504 and the analog video signal output terminal are omitted from the image sensor in FIG. 72. This solid state image sensor, therefore, outputs only video signals corresponding to the digital video data shown on the upper sides in FIGS. 73, 74, 75, and 76.

If only an analog video signal output is used, the solid state image sensor shown in FIG. 79 is used. Referring to FIG. 79, the solid state image sensor 501 is the same as the solid state image sensor shown in FIG. 72 except that the A/D converter section 506 and the digital signal processor section 507 are omitted. With this structure, the interface section 505 receives only external commands. In this case, the image sensor outputs only analog video outputs corresponding to the signals shown on the lower sides in FIGS. 73, 74, and 75. The analog video signals shown on the lower sides in FIGS. 73 and 75 may have no sync signals.

An embodiment in which a sync signal mode and a non-sync signal mode are switched in accordance with a command will be described next.

Figure 80:
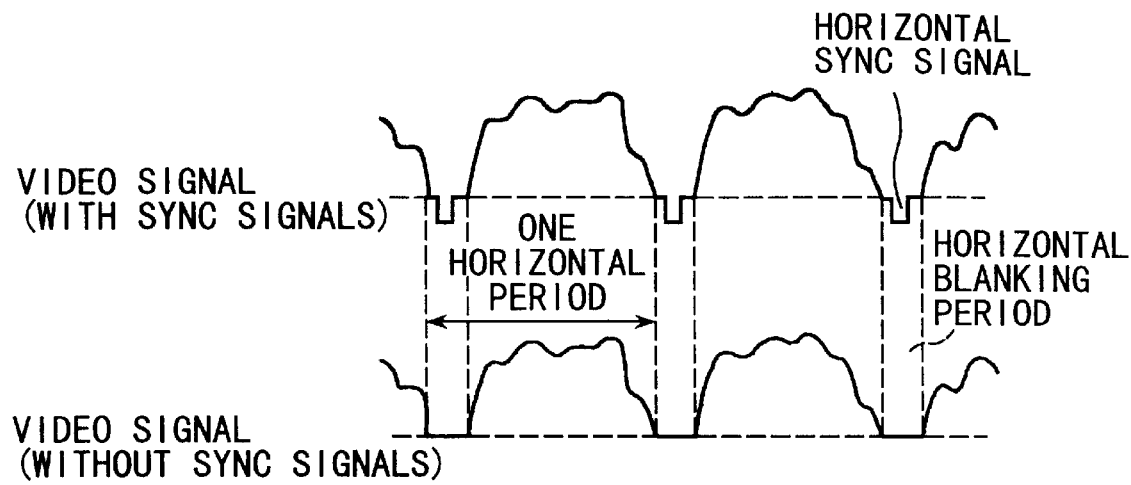
FIG. 80 is a timing chart for explaining how a sync signal is set in the solid state image sensor according to still another in accordance with a command.

As shown in FIG. 80, an image sensor can generate an analog video signal having sync signals and an analog video signal having no sync signals. Sync signals are required to provide a proper timing for a video signal between the transmitting and receiving devices. If another synchronization means is available, sync signals need not always be superimposed on the analog video signal. If these sync signals are omitted, the dynamic range can be used more effectively, resulting in increased S/N ratio. A sync signal combining section 519 is arranged between a analog signal processor section 503 and an output amplifier 504 of the solid state image sensor to select either an analog video signal having horizontal sync signals in horizontal blanking periods or an analog video signal having no horizontal sync signals in FIG. 80. The sync signal combining section 519 adds sync signals to an analog video signal in accordance with a switching command from an interface section 505. The sync signal combining section 519 in FIG. 81 can be applied to the image sensors having the output amplifiers 504 in FIGS. 72 and 79.

Figure 81:
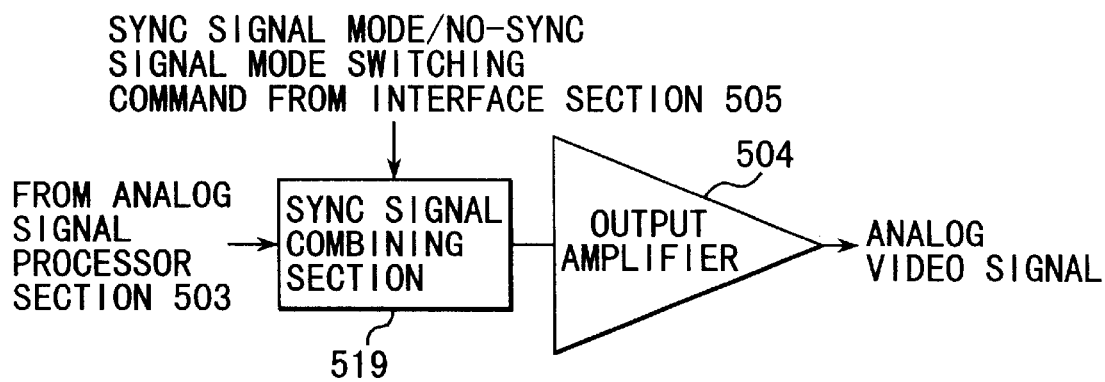
FIG. 81 is a block diagram showing an output section of a solid state image sensor which can realize sync signal setting by using a command in the embodiment in FIG. 80.
Figure 82:
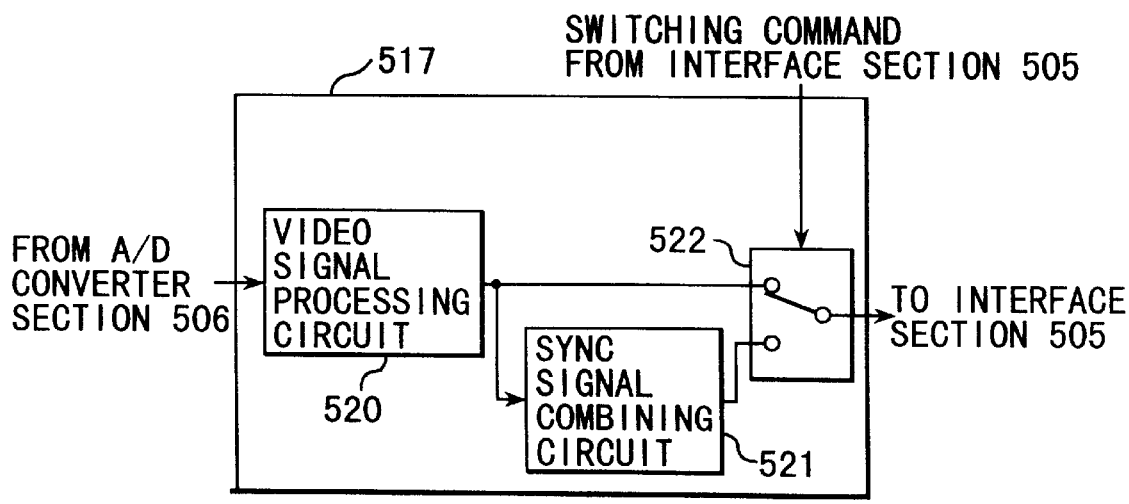
FIG. 82 is a block diagram showing a digital signal processor section which can realize sync signal setting by using a command in the embodiment in FIG. 80.

The sync signal mode or the non-sync signal mode may also be set for digital video data corresponding to the structure in FIG. 81. This setting can be realized by using a structure like the one shown in FIG. 82 for the digital signal processor section 507 in FIGS. 72 or 78. Referring to FIG. 82, the digital signal processor section 507 is constituted by a video signal processing circuit 520 for generating video data by performing signal processing for the digital video signal input from an A/D converter section 506, a sync signal combining circuit 521 for adding sync signals to this video data, and a switch 522 for switching video data having no sync signals and video data having sync signals in accordance with a switching command from the interface section 505.

Figure 83:
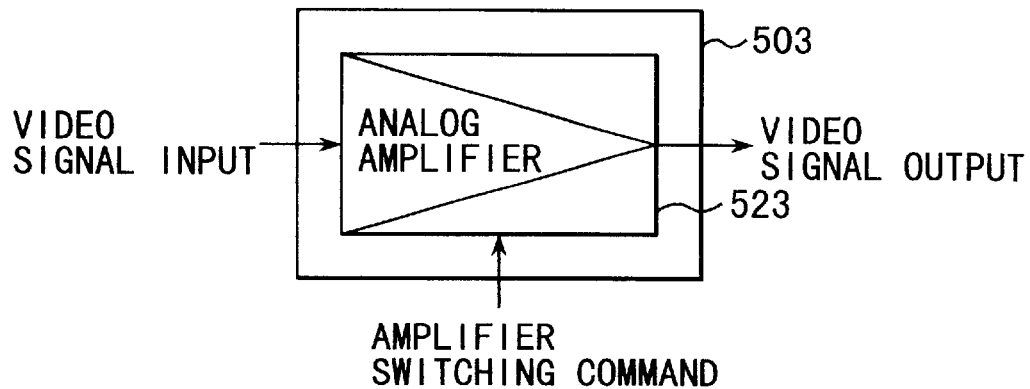
FIG. 83 is a block diagram showing an output section including an analog amplifier whose gain is set by a command in a solid state image sensor according to still another embodiment.

An embodiment in which the gains of the analog amplifier of a solid state image sensor can be switched in accordance with a command will be described next with reference to FIGS. 83 and 85.

In this embodiment, the gains of an analog amplifier 523 in an analog signal processor section 503 are switched in accordance with an external amplifier switching command. More specifically, each of the analog signal processor sections 503 shown in FIGS. 72, 78, and 79 includes an analog amplifier 513. As shown in FIG. 83, this analog amplifier is constituted by the gain changeable analog amplifier 523. The gain of this gain changeable analog amplifier can be changed in accordance with an external change command. With this change in gain, even when a video is input in a dark place, a clear image can be obtained.

The analog signal processor section 503 used in the structure shown in FIGS. 72 or 78 will be described below with reference to FIG. 84. According to this structure, the video signal output from an area sensor section 502 is subjected to noise reduction in a noise reduction circuit 524. The resultant signal is amplified by the analog amplifier 523 and input to a gamma correction circuit 525. After gamma correction in the gamma correction circuit 525, the video signal is clamped by a clamp circuit 526. The resultant signal is then output to an A/D converter section 506.

Figure 84:
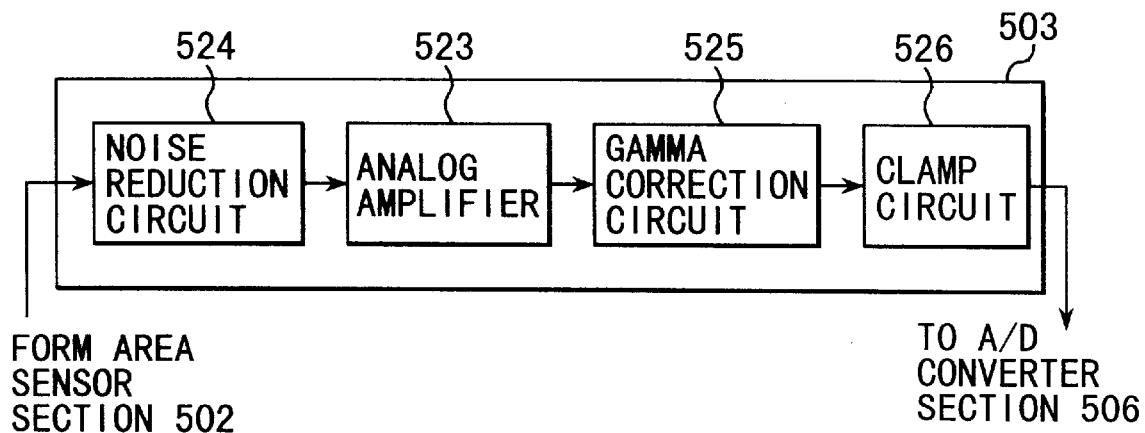
FIG. 84 is a block diagram showing the analog signal processor section of the solid state image sensor of the embodiment in FIG. 83.
Figure 85:
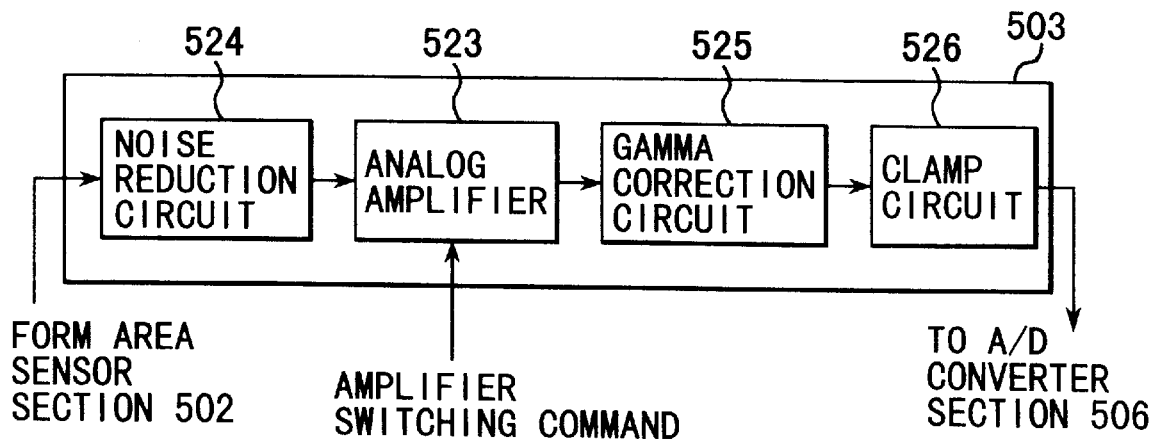
FIG. 85 is a block diagram showing another analog signal processor section for setting the gain of the analog amplifier in accordance with a command in the embodiment in FIG. 83.

When the analog signal processor section 503 in FIG. 84 is to be applied to an embodiment in which gain control is performed in accordance with a command, the analog signal processor section 503 has a structure like the one shown in FIG. 85. More specifically, when an amplifier switching command is input to the analog amplifier 523, the amplification gains of the analog amplifier 523 are switched. As a result, an analog video signal with a different amplification degree based on a different gain is output from the analog signal processor section 503. As this analog amplifier 523, an AGC (Auto Gain Control) amplifier as one type of analog amplifier may be used. When this AGC amplifier is to be used, the output level setting is changed. In addition, when the analog signal processor section 503 in FIG. 85 is applied to the solid state image sensor in FIG. 79, the same circuit structure as that shown in FIG. 78 is used except that the output of the analog signal processor section 503 is connected to the output amplifier 504.

An embodiment in which signal processing filters are switched in accordance with a command will be described next.

Figure 86:
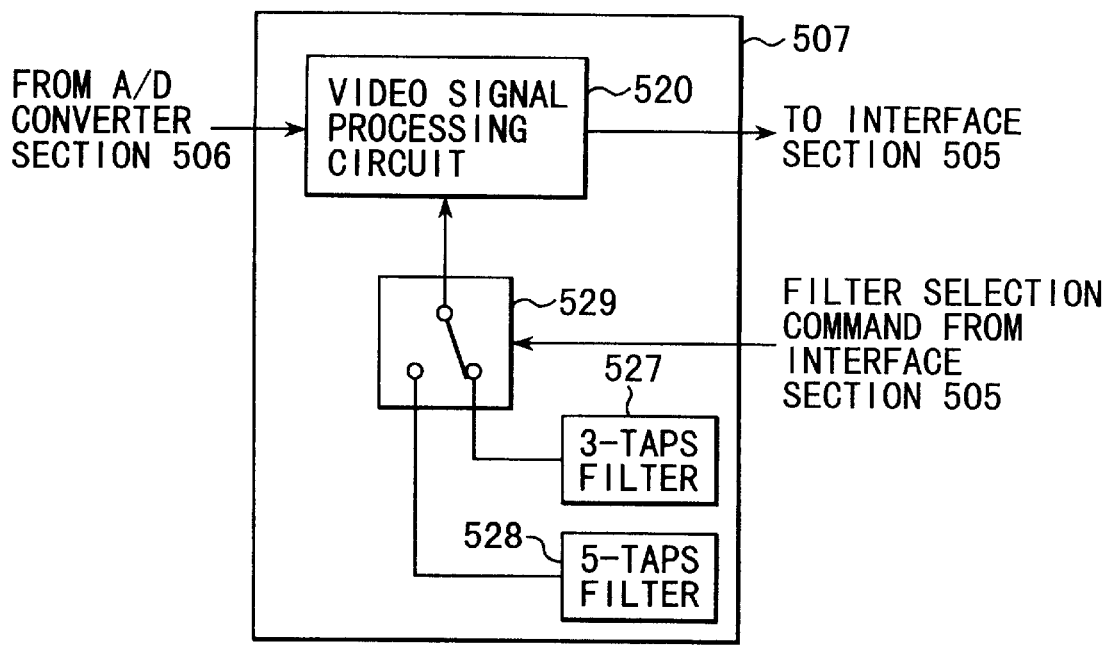
FIG. 86 is a block diagram showing a digital signal processor section which switches filters in accordance with a command in a solid state image sensor according to still another embodiment.

According to this embodiment, in a command switching structure, a command is used to switch filters used for signal processing in the digital signal processor section 507 in FIG. 72 or 78. As described above, the digital signal processor section can convert the video data input from the A/D converter section 506 into a video signal suited to a system. When, for example, the luminance signal, color difference signal, RGB signal, and the like of a video signal are to be converted, band-limitation filters are used in some case. If these filters are switched in accordance with each image, an improvement in image quality can be attained. For example, a digital signal processor section 507 of a solid state image sensor in FIG. 86 is made up of a video signal processing circuit 520, a 3-taps filter 527, a 5-taps filter 528, and a switch 529 for switching the filters 527 and 528 in accordance with a filter selection command from an interface section 505. Assume that filters with different dimensions, i.e., a 3-taps filter and a 5-taps filter, are prepared, as in this case. When priority is given to the processing speed, the 3-taps coefficient is selected. When priority is given to the image quality, the 5-taps coefficient is selected. With this operation, a filter corresponding to desired image quality can be used.

Figure 87:
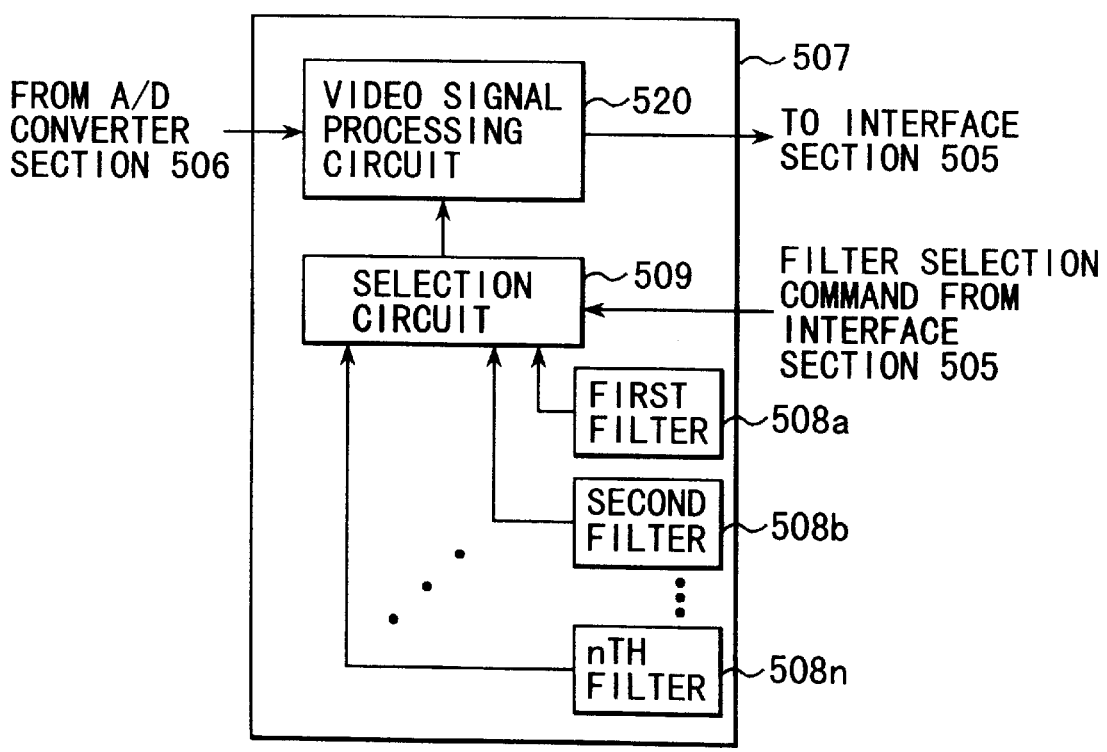
FIG. 87 is a block diagram showing the detailed structure of the digital signal processor section in FIG. 86.

In this case, two types of filters are used. However, a plurality of types of filters may be used, as shown in FIG. 87. More specifically, a digital signal processor section 507 includes a video signal processing circuit 520 for performing signal processing for the video signal input from an A/D converter section 506, first, second, . . . , nth filters 508a, 508b, . . . , 508n, and a selection. circuit 509 for selecting one of the filters 508a, 508b, . . . , 508n. In each of the structures shown in FIGS. 86 and 87, a filter can be selected in accordance with a filter selection command from the interface section.

Other filter switching operations may be performed as follows. Filters having the same number of taps but having different coefficients may be switched. A band-limitation filter for general image generation and a filter for special image generation such as contour extraction are switched. A one-dimensional filter, a two-dimensional filter, and a three-dimensional filter may be switched. In addition, a correction filter may be used to correct any pixel defect in the image sensor.

According to the above embodiments of the present invention, there is provided a high-performance image sensor which incorporates peripheral circuits as well as an image sensing function to perform various types of processing for video data, and allows the various types of processing to be executed upon designation using commands.

Figure 88:
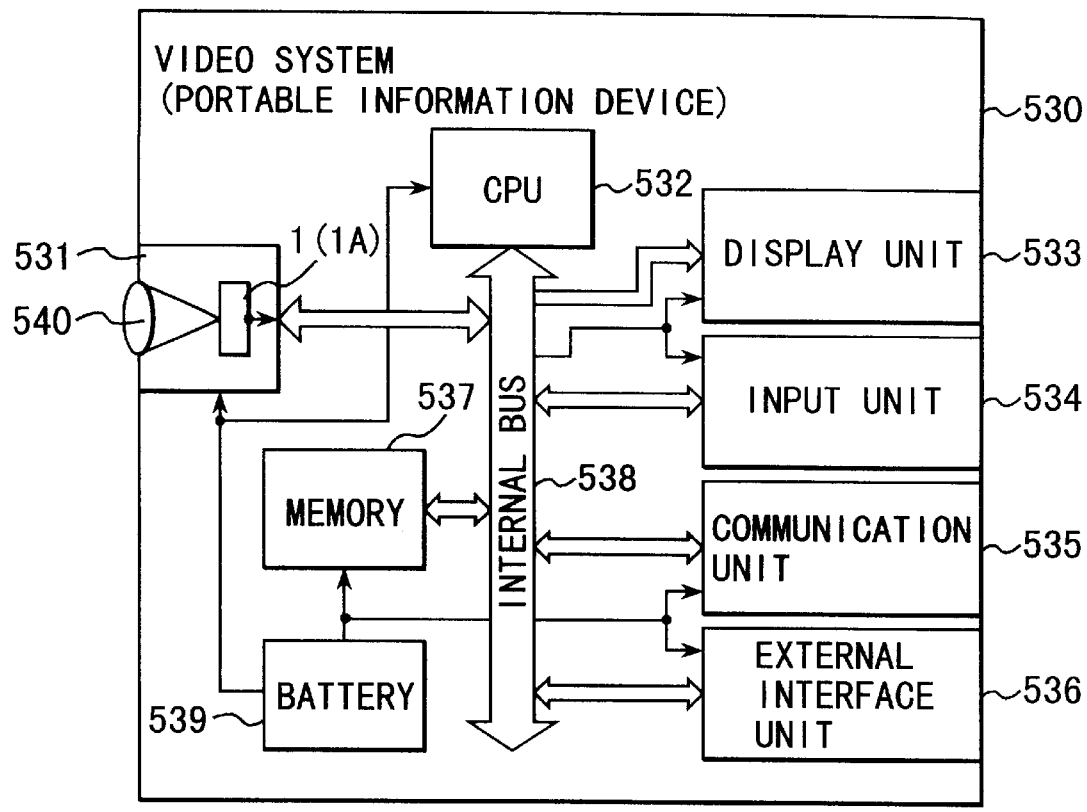
FIG. 88 is a block diagram showing a video system according to still another embodiment of the present invention, including a portable information device to which the solid state image sensor of the present invention is applied.

A video system using a solid state image sensor according to the embodiments described above will be described last with reference to FIG. 88. FIG. 88 is a block diagram showing a case in which a video system using an image sensor according to the present invention is applied to a portable information device. Referring to FIG. 88, a video system 530 is applied to, e.g., a portable information device, and includes a video input unit 531 including a solid state image sensor like the one used in each of the previous embodiments, a CPU (Central Processing Unit) 532 for performing various types of signal processing, communication control, and the like, a display unit 533 using, e.g., a liquid crystal display (LCD) and the like, an input unit 534 to which a data input device such as a keyboard or a mouse is connected, a communication unit 535 for communicating information with other devices through radio communication channels and the like, an external interface unit 536 allowing connection of the information device to an external device, a memory 537 for storing necessary video data, an internal bus 538 through which video data are transferred between the respective units, the CPU, and the memory, and a battery 539 for supplying necessary driving power to the respective constituent elements. The video input unit 531 has an optical system 540 for forming an optical image on a solid state image sensor 500. An image is input through this video input unit 531. The image sensor 500 of the video input unit 531 is connected to the internal bus 538 of the video system 530 serving as a portable information device. Upon reception of an instruction from the CPU 532, the image sensor 500 changes its output format.

As described above, the solid state image sensor can output data corresponding to a request from the image system to which the image sensor is applied, contributing to a decrease in the number of parts of the overall video system. In addition, since both an analog video signal output and a digital video data output in the embodiment of FIG. 72 can be extracted from the image sensor, the sensor can easily cope with the existing systems. That is, a highly versatile solid state image sensor can be provided. In addition, since an area sensor section and peripheral circuits can be mounted on the semiconductor chip, the cost of the image sensor itself can be reduced. Therefore, a high-performance image sensor can be provided, which can cope with a plurality of types of image systems and has various other advantages.

A CMOS sensor which can be applied to the above solid state image sensor will be described next.

Figure 89:
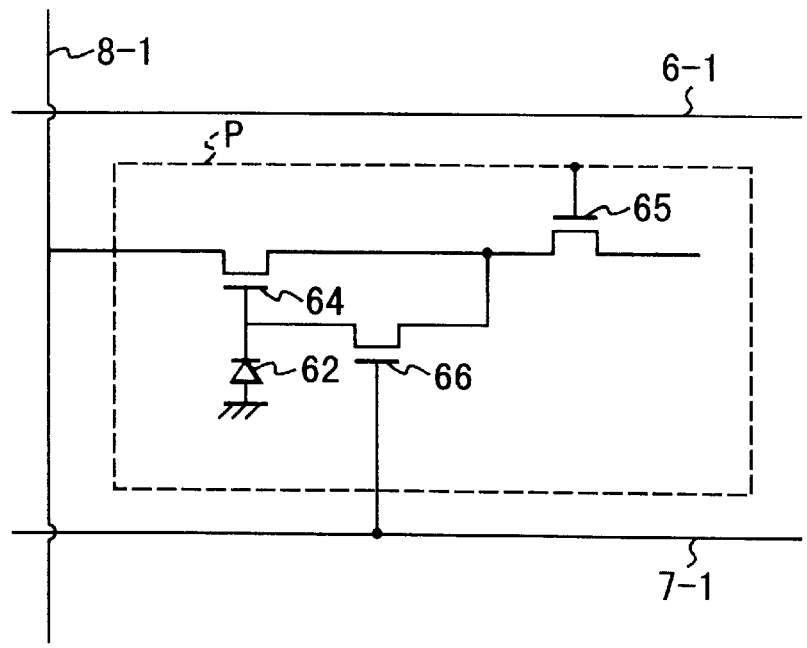
FIG. 89 is a circuit diagram showing the cell structure of a MOS type image sensor used in the solid state image sensor of the present invention.

FIG. 89 shows a unit cell (i.e., one pixel) of the CMOS sensor. This unit cell P is constituted by a photodiode 62, an amplification transistor 64, a vertical selection transistor 65, and a reset transistor 66. The cathode of the photodiode 62 for detecting incident light is connected to the gate of the amplification transistor 64 for amplifying a detection signal from the photodiode 62. The reset transistor 66, which performs a feedback operation, and the vertical selection transistor 65, which is connected to the drain of the amplification transistor 64 to select a horizontal line through which a signal is read out, are connected between the gate and drain of the amplification transistor 64.

Assume that in this structure, a reference voltage is applied to a vertical signal line 8 while the vertical selection transistor 65 is turned off and the reset transistor 66 is turned on. In this case, when electrons flow into the drain of the reset transistor 66 through the gate channel of the reset transistor 66, the drain voltage drops.

When the reset transistor 66 is turned on, since the drain and gate of the reset transistor 66 are electrically connected to each other, the gate voltage drops, and the quantity of incoming electrons decreases. Finally, the reference voltage applied to the source becomes almost equal to the channel potential. In this state, the channel potential becomes equal to the externally applied voltage. No variations arising from the specific structures of transistors used therefore appear.

According to this embodiment, the feedback transistor (reset transistor 66) is inserted between the gate and drain of the amplification transistor 64 to perform a feedback operation so as to apply a constant voltage to the source. With this operation, threshold variations can be corrected.

Figure 90:
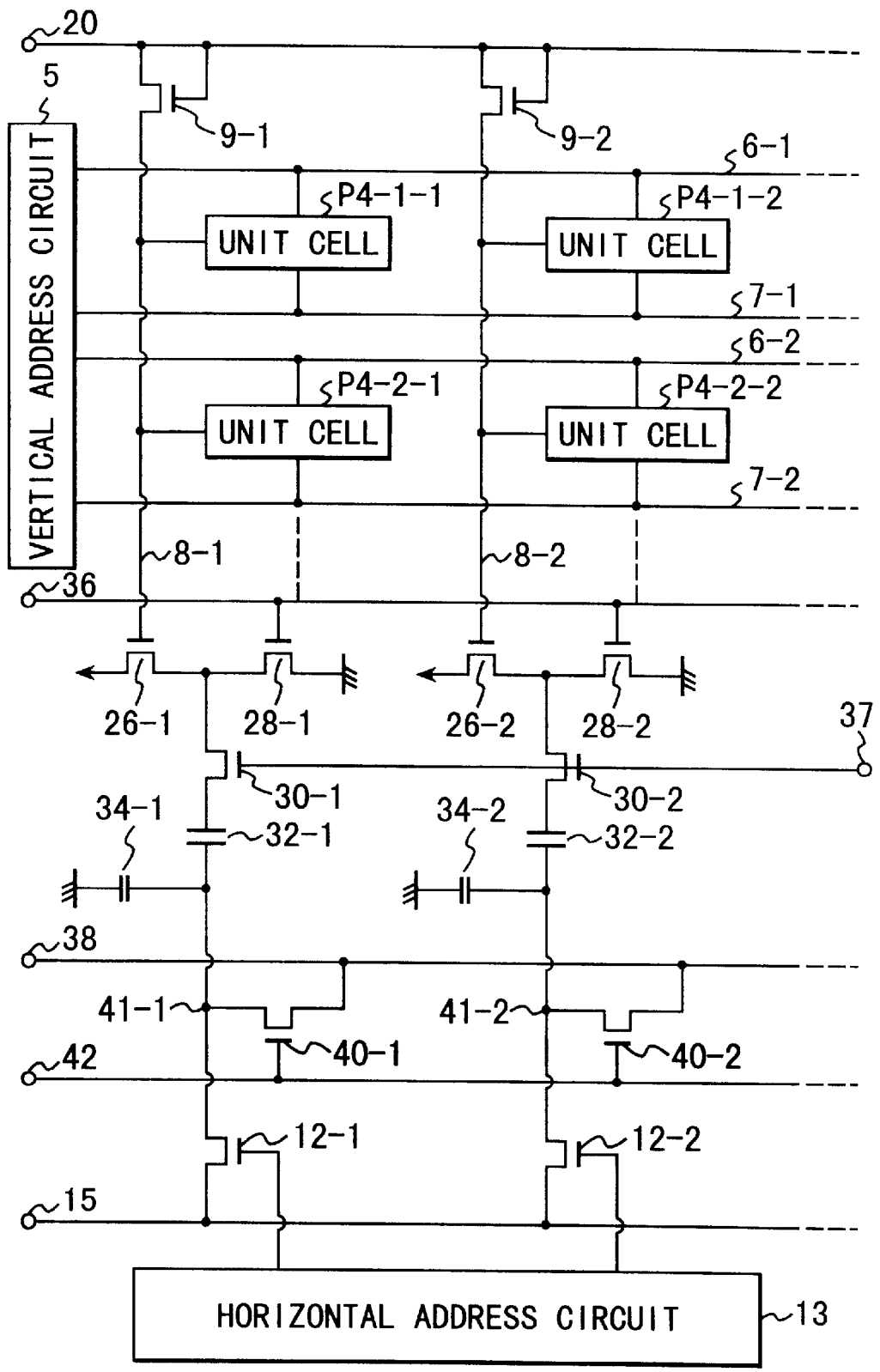
FIG. 90 is a circuit diagram for explaining a structure of a MOS type image sensor using the cell in FIG. 89.

FIG. 90 shows a CMOS sensor constituted by unit cells each identical to the one shown in FIG. 89. According to this sensor, unit cells P4-i-j are arranged in the form of a two-dimensional matrix. FIG. 90 shows only a 2×2 matrix. The actual sensor, however, includes several thousand× several thousand unit cells. Reference symbol i denotes a variable in the horizontal (row) direction; j, a variable in the vertical (column) direction.

Vertical address lines 6-1, 6-2, . . . extending horizontally from a vertical address circuit 5 as a component of a vertical scanning circuit section are respectively connected to the unit cells on the respective rows to determine horizontal lines through which signals are to be read out. Similarly, reset lines 7-1, 7-2, . . . extending horizontally from the vertical address circuit 5 are respectively connected to the unit cells on the respective columns.

The unit cells on the respective columns are respectively connected to vertical signal lines 8-1, 8-2, . . . arranged in the column direction. Each of load transistors 9-1, 9-2, . . . is connected to one end of a corresponding one of the vertical signal lines 8-1, 8-2, . . . . The gates and drains of the load transistors 9-1, 9-2, . . . are commonly connected to a drain voltage terminal 20.

The other end of each of the vertical signal lines 8-1, 8-2, . . . is connected to the gate of a corresponding one of MOS transistors 26-1, 26-2, . . . . The sources of the MOS transistors 26-1, 26-2, . . . are respectively connected to the drains of MOS transistors 28-1, 28-2, . . . . The MOS transistors 26-1, 26-2, . . . and 28-1, 28-2, . . . operate as a source follow circuit. The gates of the MOS transistors 28-1, 28-2, . . . are connected to a common gate terminal 36.

Each of the nodes between the MOS transistors 26-1, 26-2, . . . and the MOS transistors 28-1, 28-2, . . . is connected to one end of a corresponding one of clamp capacitances 32-1, 32-2, . . . through a corresponding one of sample/hold transistors 30-1, 30-2, . . . . A corresponding one of sample/hold capacitances 34-1, 34-2, . . . and a corresponding one of clamp transistors 40-1, 40-2, . . . are connected in parallel with the other end of each of the clamp capacitances 32-1, 32-2, . . . The other end of each of the sample/hold capacitances 34-1, 34-2, . . . is grounded. The other end of each of the clamp capacitances 32-1, 32-2, . . . is also connected to a horizontal signal lines 15 through a corresponding one of horizontal selection transistors 12-1, 12-2.

Figure 91:
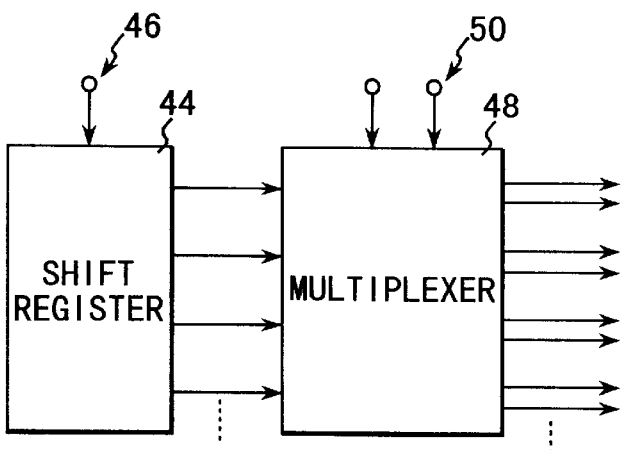
FIG. 91 is a block diagram showing the structure of a vertical address circuit.
Figure 92:
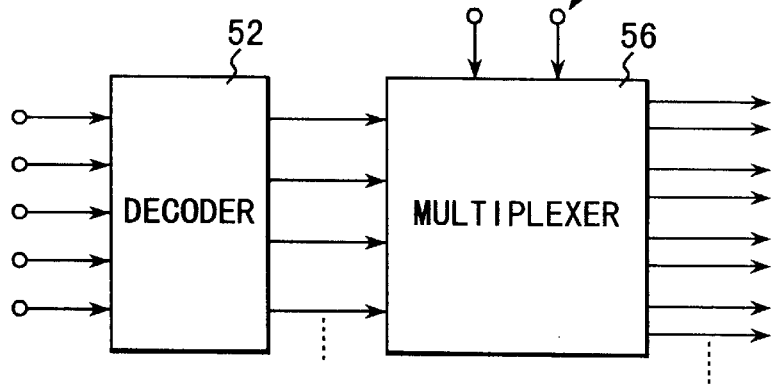
FIG. 92 is a block diagram showing the structure of another vertical address circuit.
Figure 93:
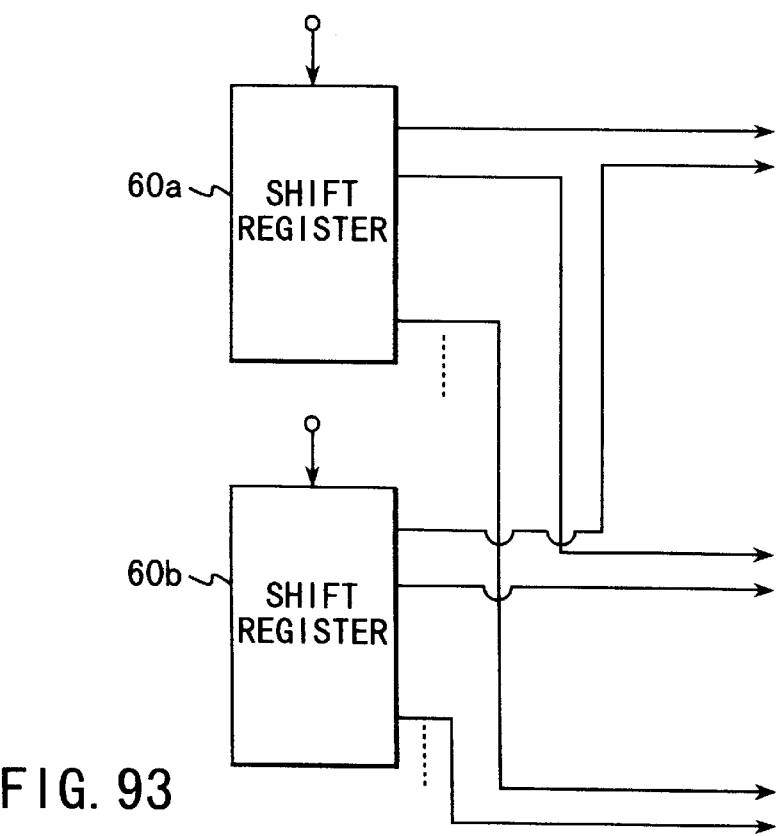
FIG. 93 is a block diagram showing the structure of still another vertical address circuit.

The vertical address circuit 5 is a circuit for shifting a plurality of signals, two signals in this case, together, and is realized by the circuit shown in FIGS. 91, 92, or 93. According to the circuit in FIG. 91, outputs from an address circuit 44 constituted by a shift register for sequentially shifting and outputting an input signal 46 from many output terminals are multiplexed with a 2-input signal 50 by a multiplexer 48. According to the circuit in FIG. 92, outputs from a decoder 52 for decoding encoded inputs 54 are multiplexed with a 2-input signal 58 by a multiplexer 56. According to the circuit in FIG. 93, the outputs of two address circuits 60a and 60b are bundled into control signal lines for the respective rows.

Figure 94:
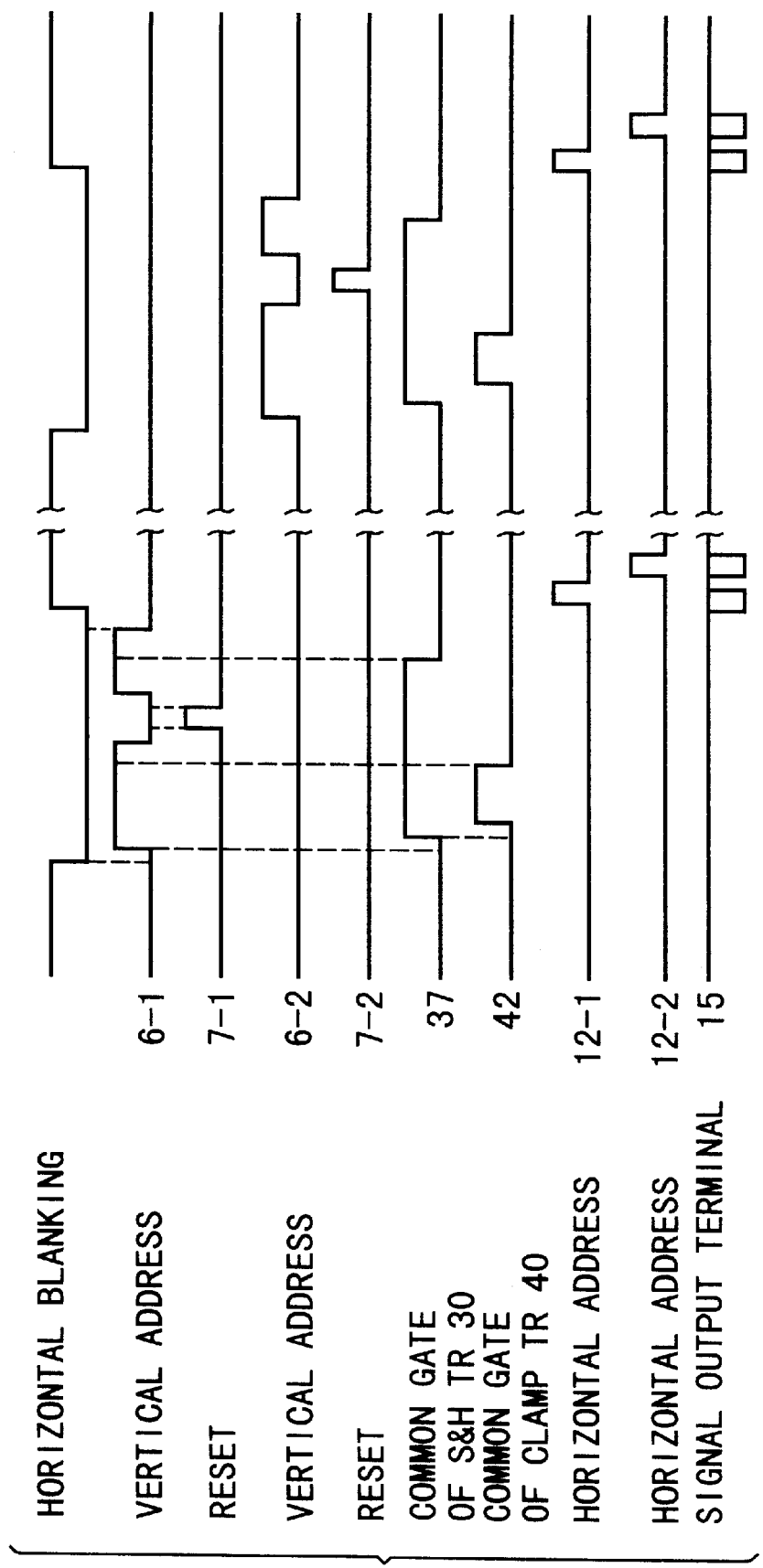
FIG. 94 is a timing chart for explaining the operation of the MOS type image sensor in FIG. 90.

The operation of the MOS type solid state image sensor having the above structure will be described next with reference to the timing chart of FIG. 94. Note that since the common drain terminal 20 of the load transistors 9, the common gate terminal 36 of the transistors 28 of the impedance conversion circuits, and the common source terminal 38 of the clamp transistors 40 are DC-driven, their operations are omitted from the timing chart.

When a high-level address pulse is applied to the vertical address line 6-1, the vertical selection transistors 65 of the unit cells P4-1-1, P4-1-2, . . . connected to the vertical address line 6-1 are turned on. As a result, the amplification transistors 64 and the load transistors 9-1, 9-2, . . . constitute a source follower circuit.

The common gate 37 of the sample/hold transistors 30-1, 30-2, . . . is set at high level to turn on the sample/hold transistors 30-1, 30-2, . . . . Thereafter, the common gate 42 of the clamp transistors 40-1, 40-2, . . . is set at high level to turn on the clamp transistors 40-1, 40-2, . . . .

Subsequently, the common gate 42 of the clamp transistors 40-1, 40-2, . . . is set at low level to turn off the clamp transistors 40-1, 40-2, . . . . With this operation, the signal plus noise components appearing on the vertical signal lines 8-1, 8-2, . . . are accumulated in the clamp capacitances 32-1, 32-2, . . . .

After the vertical address pulse is restored to low level, a reset pulse is applied to the reset line 7-1. As a result, the reset transistors 66 of the unit cells P4-1-1, P4-1-2, . . . connected to the reset line 7-1 are turned on, and the charges at the input terminals of output circuits 68 are reset.

When a high-level address pulse is applied to the vertical address line 6-1 again, the vertical selection transistors 65 of the unit cells P4-1-1, P4-1-2, . . . connected to the vertical address line 6-1 are turned on. As a result, the amplification transistors 64 and the load transistors 9-1, 9-2, . . . constitute a source follower circuit, and only noise components whose signal components are reset appear on the vertical signal lines 8-1, 8-2, . . . .

Since the signal plus noise components are accumulated in the clamp capacitances 32-1, 32-2, . . . , as described above, only voltage changes on the vertical signal lines 8-1, 8-2, . . . , i.e., only signal voltages without fixed pattern noise obtained by subtracting the noise components from the signal component pulse noise components, appear on clamp nodes 41-1, 41-2.

The common gate 37 of the sample/hold transistors 30-1, 30-2, . . . is set at low level to turn off the sample/hold transistors 30-1, 30-2, . . . . As a result, the voltages without noise which are appearing on the clamp nodes 41-1, 41-2, . . . are accumulated in the sample/hold capacitances 34-1, 34-2, . . . .

Horizontal address pulses are sequentially applied to the horizontal selection transistors 12-1, 12-2. As a result, the signals without noise which are output from the photodiodes 62 and accumulated in the sample/hold capacitances 34-1, 34-2, . . . are read out from the output terminal (horizontal signal line) 15.

Subsequently, the above operation is repeated with respect to the vertical address lines 6-1, 6-2, . . . in the same manner as described above, thereby extracting signals from all the cells arranged two-dimensionally.

The sequence of operation based on the timing shown in FIG. 94 will be described below. The following is the essential sequence:

"rise of vertical address pulse·rise of sample/hold pulse rise of clamp pulse"→"rise of reset pulse"→"fall of reset pulse"→"fall of sample/hold pulse"→"fall of vertical address pulse" Note that the sequence of the rise of the vertical address pulse, the rise of the sample/hold pulse, and the rise of the clamp pulse can be arbitrarily set. The above sequence is, however, preferable.

As described above, according to the operation shown in FIG. 94, since a voltage corresponding to the difference between the voltage set when a signal (plus noise) is present and the voltage set when no signal is present upon resetting of the gate of the amplification transistor appears on the clamp node 41, the fixed pattern noise caused by threshold variations in the amplification transistor 64 which cannot be eliminated by the feedback operation of the unit cell for some reason is compensated for. That is, the circuit constituted by the clamp transistor 30, the clamp capacitance 31, the sample/hold transistor 40, and the sample/hold capacitance 34 serves as a noise canceler.

Note that the noise cancelers of this embodiment are connected to the vertical signal lines 8 through the impedance conversion circuits 26 and 28 constituted by source follow circuits. That is, the vertical signal lines are connected to the gates of the transistors 26. Since the capacitances of these gates are very small, the amplification transistors 64 of the cells charge only the vertical signal lines 8-1, 8-2, . . . . For this reason, the time constant of each CR is small, and a steady state is quickly set. Therefore, the reset pulse application timing can be quickened, and noise cancellation can be performed within a short period of time.

FIG. 95 shows the overall circuit structure of the above CMOS sensor. According to this structure, a vertical address signal A1, . . . , Ai is input to a vertical address buffer BVA, and an output signal from this vertical address buffer is decoded by a vertical decoder circuit DV. A horizontal address signal Ai+1, . . . , An is input to a horizontal decoder DH through a horizontal address buffer DHA.

A cell matrix CM is addressed by the vertical decoder circuit DV to output pixel signals from the corresponding vertical cells to a noise canceler NC. The noise canceler NC performs noise cancel processing for the pixel signals read out from the cell matrix CM. In this case, when the horizontal address signal is input form the horizontal decoder circuit DH to the noise canceler NC, the video signal having undergone noise cancel processing is output from the CMOS sensor.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A solid state image sensor controlled by a command signal, comprising:

an area sensor having pixels arranged two-dimensionally;

an interface configured to receive the command signal;

a selector configured to select one of a plurality of readout schemes of reading out a pixel signal from the area sensor in accordance with the command signal from the interface;

a scanner configured to scan the area sensor in accordance with the scheme selected by the selector, to read out the pixel signal from the area sensor;

an analog signal processor configured to subject the pixel signal to signal processing and output a processed signal;

an analog-to-digital converter configured to convert the processed signal into a digital signal; and a digital signal processor configured to convert the digital signal into the digital video signal having a predetermined signal format;

wherein said area sensor, said selector, said scanner, said analog signal processor, said analog-to-digital converter, said digital signal processor, and said interface are mounted on a single chip.

2. A solid state image sensor according to claim 1, wherein said interface selects one of a video signal obtained by digitizing the pixel signal and a signal obtained by processing luminance and color difference signals of the pixel signal.

3. A solid state image sensor according to claim 1, wherein said interface externally outputs the digital video signal in accordance with the command signal.

4. A solid state image sensor according to claim 1, wherein said interface selects one of a motion video signal obtained by subjecting the digital video signal to a motion video processing and a still video signal obtained by subjecting the video signal to a still video processing.

5. A solid state image sensor according to claim 1, wherein said interface externally outputs the video signal in units of one frame in accordance with the command signal.

6. A solid state image sensor according to claim 1, which includes a changing device configured to change a frame rate of the digital video signal in accordance with the command signal.

7. A solid state image sensor according to claim 1, which includes a changing device configured to change an effective charge integration time for at least some of said pixels in accordance with the command signal.

8. A solid state image sensor according to claim 1, wherein said interface externally outputs the digital video signal by alternately outputting luminance and color difference signals of the pixel signal.

9. A solid state image sensor according to claim 1, wherein said interface has a common terminal used for receiving the command signal and externally outputting the digital video signal.

10. A solid state image sensor according to claim 1, wherein said interface has a common terminal used for receiving the command signal and externally outputting a status signal indicating a state of said solid state image sensor.

11. A solid state image sensor according to claim 1, wherein said interface has a common terminal used for receiving the command signal, externally outputting the digital video signal, and externally outputting a status signal indicating a state of said solid state image sensor.

12. A solid state image sensor according to claim 1, wherein said interface holds information indicating characteristics of said sensor, and allows the information to be read out in accordance with the command signal.

13. A video system comprising: a solid state image sensor according to claim 1; and a visual processing unit configured to perform visual information processing by using at least one of the digital video signal, the pixel signal, a status signal of said solid state image sensor, and characteristic information of said solid state image sensor.

14. A video system comprising:

a solid image sensor according to claim 1; and a camera-shake compensation device configured to detect camera-shake to obtain a camera shake signal, and to cancel a camera-shake component by arithmetically processing the camera-shake signal and a motion vector signal output from said solid state image sensor.

* * * * *

UNITED STATES PATENT AND TRADEMARK OFFICE
CERTIFICATE OF CORRECTION

PATENT NO. : 6,452,632 B1
DATED : September 17, 2002
INVENTOR(S) : Masafumi Umeda et al.

It is certified that error appears in the above-identified patent and that said Letters Patent is hereby corrected as shown below:

<u>Title page,</u>
Under the ABSTRACT, change "14 Claims" to -- 13 Claims --.

<u>Column 32,</u>
Lines 39-45, delete claim 14 in its entirety.

Signed and Sealed this

Eighth Day of April, 2003

JAMES E. ROGAN
*Director of the United States Patent and Trademark Office*